United States Patent
Shinohara et al.

(10) Patent No.: US 7,313,352 B2
(45) Date of Patent: Dec. 25, 2007

(54) IMAGE FORMING APPARATUS, METHOD OF CONTROLLING SAME, MACHINE-READABLE MEDIUM AND PROCESS CARTRIDGE

(75) Inventors: Tadashi Shinohara, Tokyo (JP); Katsuhiko Maeda, Tokyo (JP); Masakazu Oshita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 225 days.

(21) Appl. No.: 11/074,927

(22) Filed: Mar. 9, 2005

(65) Prior Publication Data

US 2005/0200689 A1    Sep. 15, 2005

(30) Foreign Application Priority Data

| Mar. 9, 2004 | (JP) | ............................ 2004-065626 |
| Mar. 18, 2004 | (JP) | ............................ 2004-077943 |
| Jun. 21, 2004 | (JP) | ............................ 2004-182338 |
| Jun. 30, 2004 | (JP) | ............................ 2004-194557 |
| Aug. 19, 2004 | (JP) | ............................ 2004-239274 |

(51) Int. Cl.
 *G03G 15/20* (2006.01)
(52) U.S. Cl. ...................................... 399/301; 399/111
(58) Field of Classification Search ................. 399/38, 399/39, 40, 49, 111, 297, 299, 300, 301
See application file for complete search history.

(56) References Cited

U.S. PATENT DOCUMENTS

| 5,995,717 | A | * | 11/1999 | Tanaka ........................ 358/1.9 |
| 5,995,802 | A | | 11/1999 | Mori |
| 6,163,327 | A | | 12/2000 | Mori |
| 6,330,404 | B1 | | 12/2001 | Munenaka |
| 6,626,101 | B2 | * | 9/2003 | Kajiwara et al. ........... 101/171 |
| 6,714,748 | B1 | * | 3/2004 | Nakayasu et al. ............. 399/72 |
| 6,829,465 | B2 | * | 12/2004 | Yamanaka et al. .......... 399/301 |
| 7,102,489 | B2 | * | 9/2006 | Motosugi et al. ........ 340/309.7 |

FOREIGN PATENT DOCUMENTS

| EP | 0816930 | A2 | 1/1998 |
| EP | 0818917 | A2 | 1/1998 |
| EP | 1020774 | A | 7/2000 |
| JP | 07-234612 | A | 9/1995 |
| JP | 11-065208 | | 3/1999 |
| JP | 11-119504 | A | 4/1999 |
| JP | 2000-155453 | A | 6/2000 |
| JP | 2001-290327 | A | 10/2001 |
| JP | 2002072610 | A | 3/2002 |
| JP | 2002-160398 | | 6/2002 |
| JP | 2002-207337 | | 7/2002 |
| JP | 2003-186278 | A | 7/2003 |

OTHER PUBLICATIONS

European Patent Office Search Report May 30, 2007, for corresponding European Patent Application No. 05251409.8-1522.

* cited by examiner

*Primary Examiner*—Hoan Tran
(74) *Attorney, Agent, or Firm*—Harness, Dickey & Pierce, P.L.C.

(57) ABSTRACT

In an image forming apparatus, a pattern forming unit forms a pattern for ameliorating image positional displacement, and a detecting unit detects the pattern. An ameliorating unit ameliorates an image positional displacement based on the pattern detected. If for example, the pattern cannot be detected, then e.g., monochrome printing is enabled, and a notifying unit notifies that the amelioration is not possible.

34 Claims, 42 Drawing Sheets

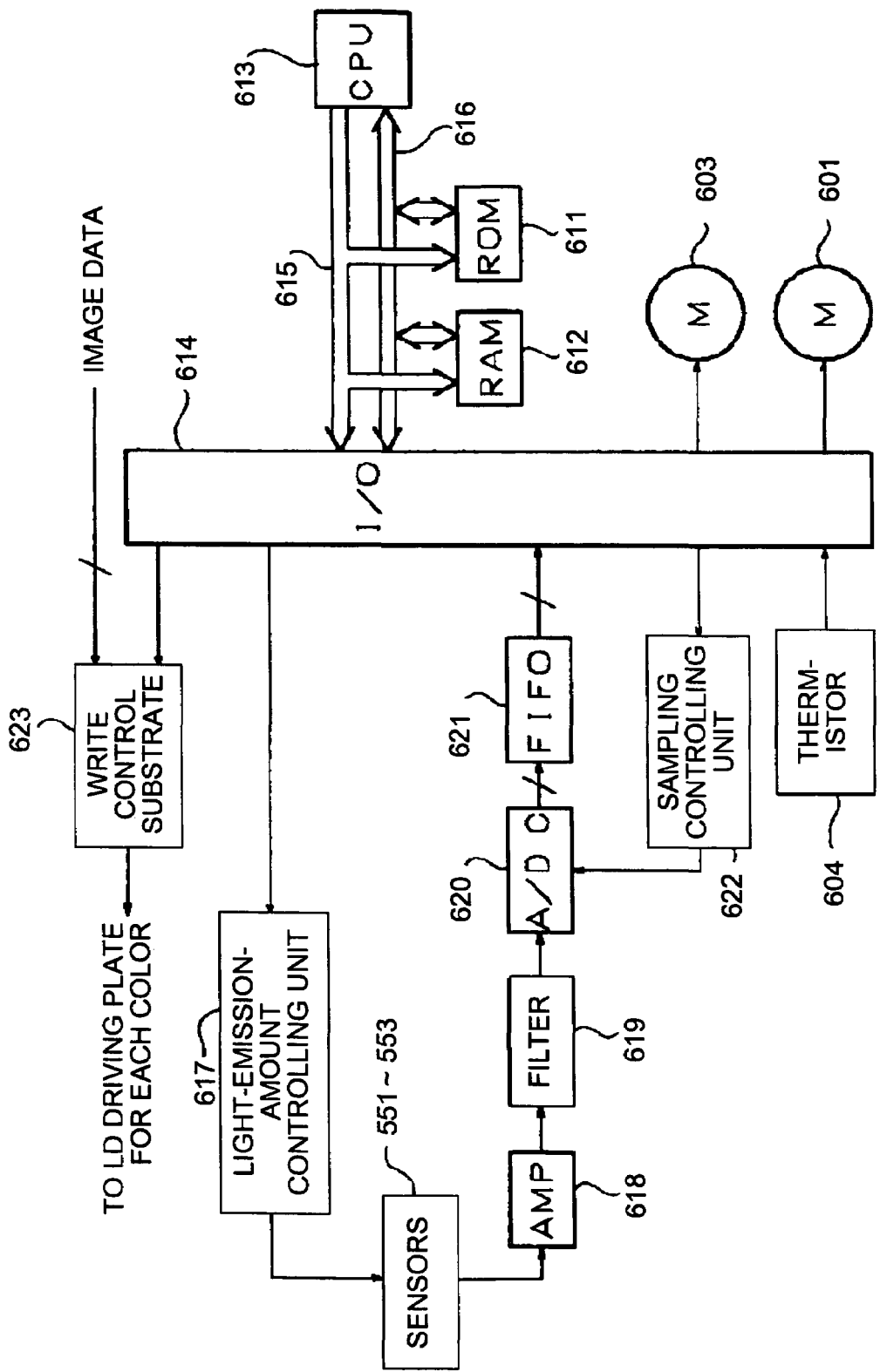

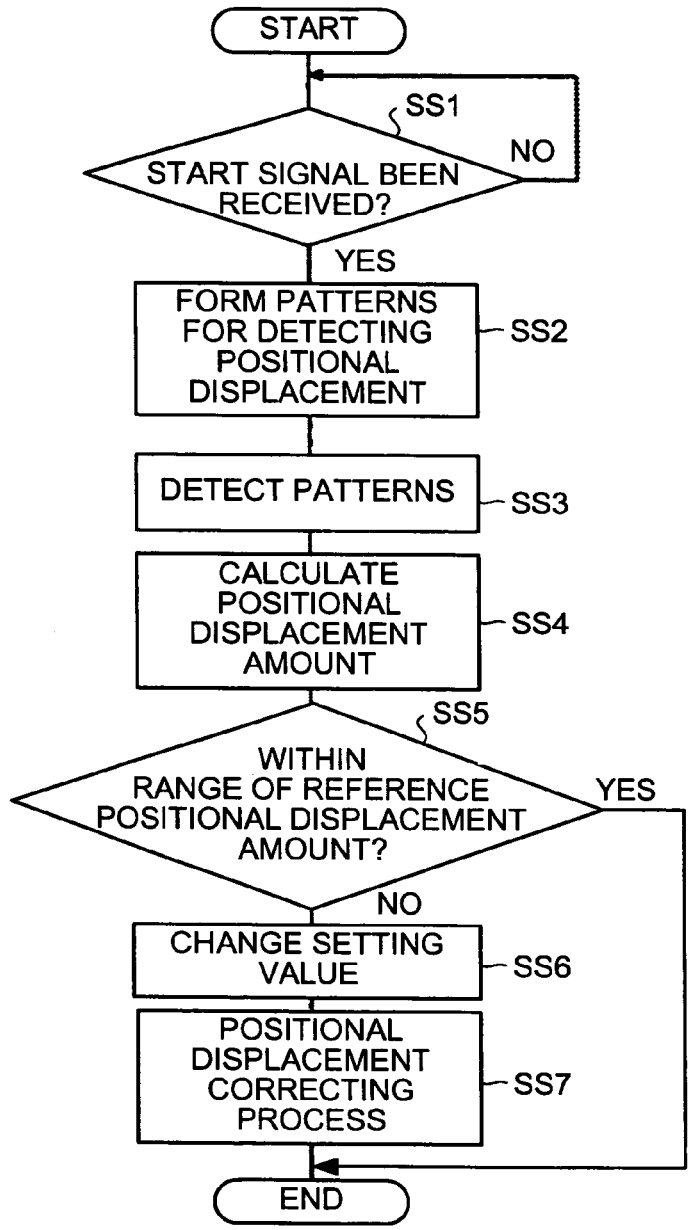
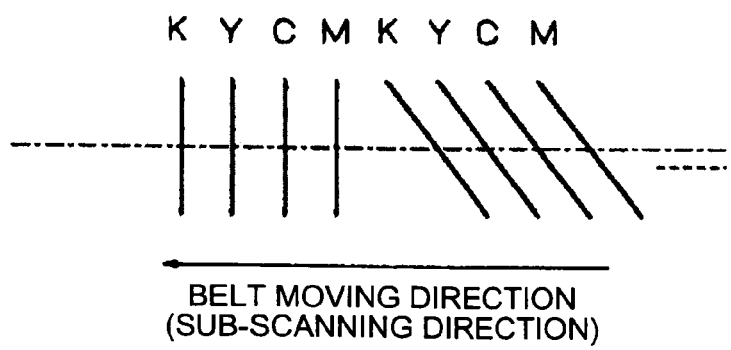

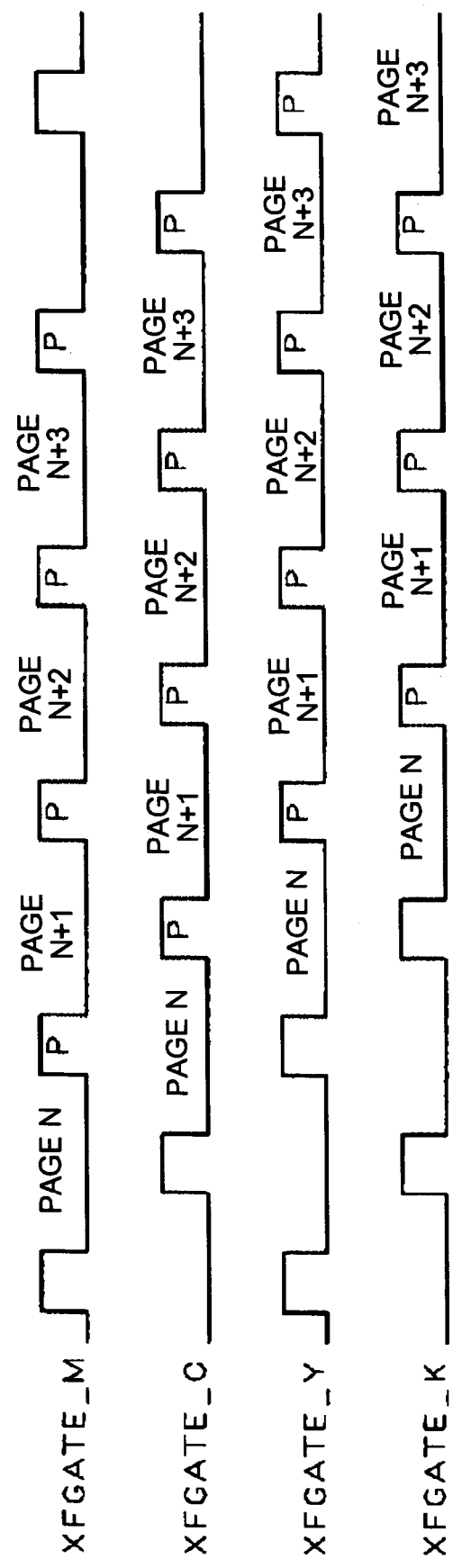

K, Y WRITING SIDE     K, Y END SIDE

BELT MOVING DIRECTION (SUB-SCANNING DIRECTION)

RELATION BETWEEN NUMBER OF SHEETS IN CONTINUOUS PRINTING AND SUB-SCANNING DISPLACEMENT AMOUNT

BELT MOVING DIRECTION
(SUB-SCANNING DIRECTION)

BELT MOVING DIRECTION
(SUB-SCANNING DIRECTION)

IMAGE FORMING APPARATUS, METHOD OF CONTROLLING SAME, MACHINE-READABLE MEDIUM AND PROCESS CARTRIDGE

PRIORITY STATEMENT

The present document incorporates by reference the entire contents of each of the following Japanese priority documents, No. 2004-065626 filed in Japan on Mar. 9, 2004, No. 2004-077943 filed in Japan on Mar. 18, 2004, No. 2004-82338 filed in Japan on Jun. 21, 2004, No. 2004-194557 filed in Japan on Jun. 30, 2004 and No. 2004-239274 filed in Japan on Aug. 19, 2004, respectively.

BACKGROUND

1. Description of the Related Art

In color image forming apparatus, a color image is formed by superimposing images of a plurality of colors. Therefore, if each image is not formed at a proper location, the images can not be superimposed properly, and, this leads to a color image that is degraded.

Some image forming apparatuses see, for example, Japanese Patent Laid-Open Publication Nos. 11-119504 and 2000-155453, have a function to correct the deviations in the positions of the images. Such deviations can occur due to various factors. These factors include machine assembly error, component inaccuracy, changes in environmental temperature, and changes in temperature inside the apparatus.

The image forming apparatus disclosed in Japanese Patent Laid-Open Publication No. 11-119504 includes an image-position-displacement detecting unit that detects positional deviation of respective images. An image forming position of one image is corrected through a manual operation, and the image forming positions of the remaining images are automatically corrected based on information from the image-position-displacement detecting unit.

On the other hand, in the image forming apparatus disclosed in Japanese Patent Laid-Open Publication No. 2000-155453, the correction of the positional deviation is not performed if the image to be formed is a monochrome image. This leads to reduction in the processing time.

Typical schemes for color image formation include a direct transfer scheme and an intermediate transfer scheme. In the direct transfer scheme, toner images of different colors formed on a plurality of photosensitive members are transferred directly onto a transfer paper. On the other hand, in the intermediate transfer scheme, toner images of different colors formed on photosensitive members are first overlaid onto an intermediate transfer member, and are then collectively transferred to the transfer paper. In either schemes, the photosensitive members are aligned facing the transfer paper or the intermediate transfer member. Therefore, such an image forming apparatus is called of tandem type, in which an electro-photographic process, such as forming and developing an electrostatic latent image of each of magenta (M), cyan (C), yellow (Y), and black (K), is performed for each photosensitive member, and then a transfer process is performed on running transfer paper in the direct transfer scheme, and a running intermediate transfer member in the intermediate transfer scheme.

In such a tandem-type color image forming apparatus, an endless belt is generally adopted. In the direct transfer scheme, a recording medium conveyor belt that runs while supporting the transfer paper serves as the endless belt. In the intermediate transfer scheme, an intermediate transfer belt that receives images from the photosensitive members and carries these images serves as the endless belt. Furthermore, in general, an image processing unit including four photosensitive members is placed at one side of the running endless belt. With such structure, in the tandem-type color image forming apparatus, it is important to accurately overlay toner images of different colors one another, to prevent the occurrence of unevenness in color. Therefore, a technique of registration of the respective color images plays an important role. Unevenness in each color is mainly caused by:

skew;
registration displacement in a sub-scanning direction;
scaling error in a main-scanning direction; and
registration displacement in the main-scanning direction.

To place colors in register, various schemes have been devised.

For example, Japanese Patent Laid-Open Publication No. 2001-290327 discloses a technology in which a toner pattern for color matching is formed for each color on an endless belt, a sensor detects a color displacement of a toner pattern of a color with respect to a toner pattern of a reference color, and a color controlling scheme is adopted in which, write timing by an optical writing device is adjusted depending on the detection result.

Here, the toner pattern scheme is described with reference to FIG. 57. FIG. 57 illustrates one example of toner patterns 701 for color matching formed on an endless belt 700, which is a recording-paper conveyor belt or an intermediate transfer belt. The toner patterns 701 include a straight-line pattern orthogonal to the moving direction of the endless belt 700, and an oblique line pattern formed for each of K, Y, C, and M. The toner patterns 701 are detected by sensors 702 to 704 aligned in a main-scanning direction, and measure a skew with respect to a reference color (in this case, black K), a registration displacement in a sub-scanning direction, a registration displacement in a main-scanning direction, and a scaling error in a main-scanning direction. From the measurement results, a main CPU calculates various amounts of displacement and correction for correcting displacement components.

A mirror provided inside the optical writing device reflects a laser beam of each color. A skew displacement is corrected by changing a tilt of the mirror. A stepping motor is used as a driving source for tilting the mirror. Registration displacements in the main-scanning direction and the sub-scanning direction are corrected by adjusting write timing. Furthermore, as a result of mark detection and calculation, when scaling in the main-scanning direction is displaced with respect to the reference color, a device such as a clock generator, capable of changing the frequency in extremely small steps, is used to change the scaling.

Japanese Patent No. 3450402 (hereinafter, (4)) discloses a color image forming apparatus that includes an image forming unit, and an environmental state detecting unit that detects environmental states including temperature and humidity near the image forming unit. When the detection results including the temperature and humidity detected by the environment state detecting unit exceed a predetermined value during continuous formation of a plurality of images, this apparatus causes a pattern image forming unit to form a predetermined pattern image, and then causes a pattern reading unit to read the predetermined pattern image formed, thereby performing registration control.

An image forming process of an image forming apparatus (color image forming apparatus) using the conventional technologies is as follows.

FIG. 53 illustrates the structure of a tandem-type color image forming apparatus in which image forming units are aligned along a conveyor belt. The apparatus is of direct transfer type without using an intermediate transfer member.

Four image forming units that each form an image of a different color (magenta M, cyan C, yellow Y, or black K) are aligned in line along a conveyor belt 802 that conveys transfer paper 801 as recording paper. The conveyor belt 802 is wound between a driving roller 803 for driving rotation, and a driven roller 804 for driven rotation, and is driven by the rotation of the driving roller 803 for rotation in a direction indicated by an arrow. A paper feeding tray 805 is provided below the conveyor belt 802, to accommodate the transfer paper 801. Of the accommodated transfer paper 801, one sheet on top is fed at the time of image formation, and is then attached on the conveyor belt 802 by electrostatic charging.

The attached transfer paper 801 is conveyed to a first image forming unit (magenta), where a magenta image is formed. The first image forming unit (magenta) includes a photosensitive drum 806M, a charging unit 807M disposed near the photosensitive drum 806M, an exposing unit (not shown), a developing unit 809M, and a photosensitive-drum cleaner 810M. The surface of the photosensitive drum 806M is uniformly charged by the charging unit 807M, and is exposed by the exposing unit to laser light 811M corresponding to an image of magenta, to form an electrostatic latent image. The laser light 811M is emitted from a laser light source 805A including laser diodes (LDs) corresponding to magenta, cyan, and yellow.

The electrostatic latent image formed is developed at the developing unit 809M to form a toner image on the photosensitive drum 806M. This toner image is transferred by a transfer unit 812M at a position where the photosensitive drum 806M comes in contact with the transfer paper 801 on the conveyer belt 802 (hereinafter, a transfer position), to form an image of single color (magenta) on the transfer paper 801.

The unnecessary toner remaining on the surface of the photosensitive drum 806M after transfer, is cleaned by the photosensitive-drum cleaner 810M to prepare for the next image formation.

The conveyor belt 802 conveys the transfer paper 801 with single color (magenta) transferred by the first image forming unit (magenta), to the second image forming unit (cyan). In the second image forming unit, a toner image (cyan) formed on a photosensitive drum 806C is transferred in a similar manner described above, and is overlaid on the transfer paper 801. The transfer paper 801 is further conveyed to a third image forming unit (yellow), and then a fourth image forming unit (black), in each of which a toner image similarly formed is transferred, to finally form a multi-color image.

After passing through the fourth image forming unit, the transfer paper 801 with the multi-color image formed thereon comes off from the conveyor belt 802, is fixed by a fixing unit 813, and is then delivered outside the color image forming apparatus.

Detection sensors 814, 815, and 816 are provided below the conveyor belt 802 of the color image forming apparatus body, for detecting a pattern of mark rows for positional displacement detection.

A center shaft of a paper feeding roller 900 is connected to an output shaft of a driving motor (not shown) via an electromagnetic clutch 910 (refer to FIG. 47). The paper feeding roller 900 is described further below. Paired resist rollers 901, one of which has a center shaft connected to the output shaft of the driving motor, are disposed approximately closely attached together. The paper feeding roller 900 and the paired resist rollers 901 separate and feed the transfer paper 801 onto the conveyer belt 802.

FIG. 54 illustrates part of a toner mark row 817 for positional displacement detection formed on the conveyer belt 802 of the color image forming apparatus shown in FIG. 53. FIG. 55 illustrates positional fluctuations by driving of the conveyor belt of the color image forming apparatus in shown FIG. 53. In FIG. 55, the horizontal axis is a time axis, while the vertical axis is a fluctuation amount axis.

Four straight lines of colors K, Y, C, and M (lines orthogonal to a conveying direction of the conveyor belt), and four oblique lines of these colors shown in FIG. 54 are taken as a set of marks, and eight such sets are disposed along the conveying direction to form the mark row 817. The mark row 817 including eight such sets of lines is positioned according to a positional fluctuation phase caused by driving speed fluctuations, such as those caused by the running of the belt in the sub-scanning direction (in a direction represented by an arrow 890). As shown in FIG. 55, the mark row 817 is formed in consideration of the phase, so that an error at the time of pattern formation and detection is as small as possible. By determining a correction amount from an average of the detection results, a high-quality image with less positional displacement in each color can be formed.

With eight straight lines and oblique lines of K, Y, C, and M being formed and then detected by the sensors 814, 815, and 816 aligned in the main-scanning direction, a skew, registration displacement in the sub-scanning direction, registration displacement in the main-scanning direction, and scaling error in the main-scanning direction with respect to the reference color (in this case, BK) can be measured. By shifting the image in a direction reverse to a direction of positional displacement by half a maximum amount of positional displacement detected by each sensor, correction can be performed so that the displacement amount caused by a scaling deviation in the main-scanning direction is made inconspicuous. A main CPU gives instructions for calculating various displacement and correction amounts, and correcting the various values. A cleaning unit cleans the pattern after detection.

Such positional displacement correction is conventionally performed upon instruction from a user menu, a service menu of the apparatus, or upon instruction from a printer driver. Such timing of positional displacement correction is referred to as timing B, while timing of positional displacement correction automatically performed by the color image forming apparatus is referred to as timing A, as disclosed in Japanese Patent Laid-Open Publication No. 2003-186278 (hereinafter, (5)).

However, the image forming apparatuses disclosed in Japanese Patent Laid-Open Publication No. 11-119504 and Japanese Patent Laid-Open Publication No. 2000-155453 discussed above have the following problems.

Consider the case where the image forming apparatus disclosed in Japanese Patent Laid-Open Publication No. 11-119504 is applied to a system in which a pattern for positional displacement correction is formed on the transfer belt, and is then detected by the sensor, and the displacement amount is measured based on a signal from the sensor and is then fed back to a correcting unit for correction of the positional displacement. In this case, the image concentration of the pattern for positional displacement correction has to be at a sensor-detectable level. The sensor cannot accurately detect the pattern if the pattern is faint, thereby making it impossible to perform positional displacement correction, and leading to degradation in image quality.

Furthermore, while an image positional displacement in color images degrades image quality, an image positional displacement in monochrome images may pose no problem. For example, even if positional displacement correction cannot be made, thereby significantly degrading image quality and requiring checking and repair, it may be desireable to avoid shutting down the apparatus until a service person comes, if such displacement does not affect outputs of monochrome images.

Still further, in the image forming apparatus disclosed in Japanese Patent Laid-Open Publication No. 2000-155453, image positional displacement is not performed for monochrome image formation. This is because image positional detection does not affect monochrome images irrespective of whether image positional displacement correction is performed. Thus, the processing time at the time of monochrome outputs reduces. There image positional displacement correction is performed only at the time of color outputs. However, if such correction cannot be made, and therefore the apparatus is stopped because image quality is too degraded, neither color images or monochrome images can be output.

Still further, according to Japanese Patent Laid-Open Publication No. 2001-290327, when the number of continuous printed sheets exceeds a predetermined number of sheets for register during continuous printing, a positional displacement correcting process is performed by changing an interval of conveying recording paper, so that the interval is longer than one cycle length of the photosensitive member, while the pattern for positional displacement detection for positional displacement correction is being formed.

However, as described above, when the interval of conveying recording paper is changed while the patterns for positional displacement detection are being formed, a paper conveying control and an electro-photographic process control have to be separately performed in timing, depending on whether the patterns are being formed. This leads to complexity in control, and a positional displacement due to the difference in timing of controls, thereby degrading the image.

Still further, in the conventional technologies described above, an interval between recording paper sheets is minimized as much as possible to increase productivity during continuous printing. Therefore, when positional displacement correction is required, a pattern having a long length, such as the pattern to be formed at the timing B, cannot be formed, and only a pattern having a short length can be used for positional displacement detection. This degrades detection accuracy to cause a positional displacement, thereby degrading the image.

SUMMARY

At least one embodiment of the present invention can solve at least one of the problems in the conventional technology.

An image forming apparatus according to an embodiment of the present invention may include: at least two image forming units, each of which forms a monochrome image of a different color, wherein the image forming apparatus forms a multicolor image by overlaying the monochrome images of at least the two colors on one another; a pattern forming unit that forms a pattern useful for image positional displacement correction; a detecting unit that detects a displacement of the pattern unit, provided for each color, that ameliorates an image positional displacement based on the pattern detected; and a notifying unit that notifies of amelioration results. If, for example, the pattern for image positional displacement correction cannot be detected, then, e.g., monochrome printing is enabled, and the notifying unit notifies that amelioration is not possible.

An embodiment of the present invention provides a method corresponding to what is done by the apparatus discussed above. And an embodiment of the present invention provides a machine-readable medium having instructions recorded thereon execution of which by a machine causes the machine to control such a method to be carried out.

BRIEF DESCRIPTION OF THE DRAWINGS

The accompanying drawings are intended to depict example embodiments of the present invention and should not be interpreted to limit the scope thereof. The accompanying drawings are not to be considered as drawn to scale unless explicitly noted.

FIG. 24 is a block diagram of a structure of a control system of the color image forming apparatus (color laser printer) according to an embodiment of the present invention;

FIG. 25 is a flowchart of a process of detecting a positional displacement at the time of continuous printing according to an embodiment of the present invention;

FIG. 26 is a plan view of a pattern for positional displacement detection P1, formed on a recording-medium conveyer belt according to an embodiment of the present invention;

FIG. 27 is a timing chart of a process of forming the pattern for positional displacement detection P1 during continuous printing according to an embodiment of the present invention;

DETAILED DESCRIPTION OF EXAMPLE EMBODIMENTS

Example embodiments of the present invention are explained in detail below with reference to the accompanying drawings. Other embodiments, not explicitly called out below, for brevity, nonetheless are contemplated.

Figure 1:
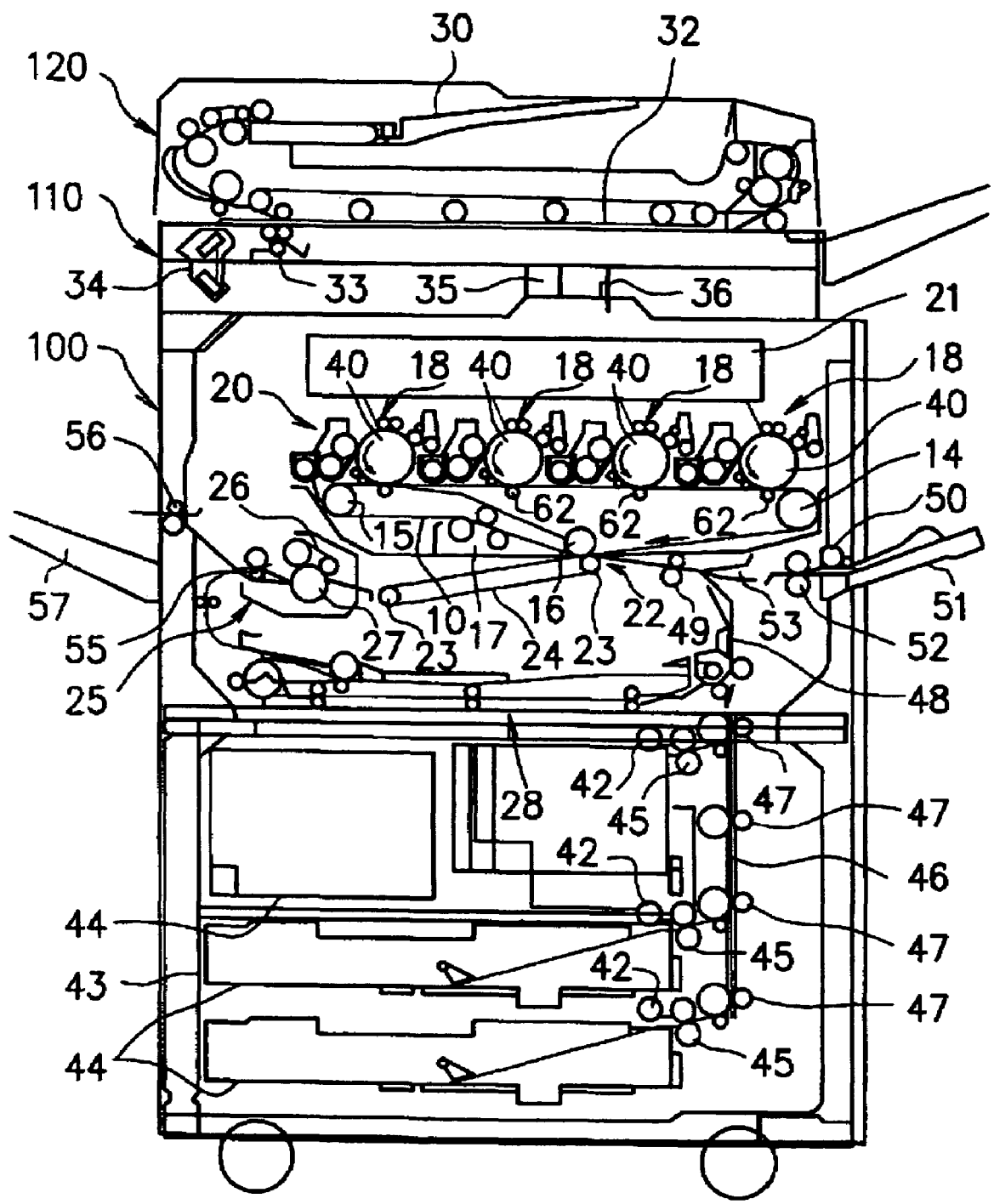
FIG. 1 illustrates a structure of an electro-photography apparatus to which an image forming apparatus according to an embodiment of the present invention is applied.

FIG. 1 illustrates a structure of an electro-photography apparatus to which an image forming apparatus according to an embodiment of the present invention is applied.

A printer 100 of the electro-photography apparatus includes an intermediate transfer unit at the center. The intermediate transfer unit includes an intermediate transfer belt 10, which is an endless belt. The intermediate transfer belt 10 is a multi-layered belt with a base layer having an elastic layer. The base layer is made of fluororesin having a small elasticity or a rubber material having a large elasticity with a material resistant to extension, such as canvas. The elastic layer has a smooth coat layer formed by coating the surface of the fluorine-type rubber or acrylonitrile-butadiene copolymer rubber with material such as fluorine-type resin.

The intermediate transfer belt 10 hangs across three supporting rollers 14, 15, and 16, and is driven for clockwise rotation. An intermediate-transfer-member cleaning unit 17 that removes residual toner from the intermediate transfer belt 10 after image transfer, is provided on the left of the second supporting roller 15.

An image forming device 20 is provided over the intermediate transfer belt 10 between the first supporting roller 14 and the second supporting roller 15 along a moving direction of the intermediate transfer belt. The image forming device 20 includes, for each of black (K), yellow (Y), magenta (M) and cyan (C), a photosensitive unit 40, a charger unit 18, a developing unit, and a cleaning unit. The image forming device 20 can be removably mounted on the printer body.

A writing unit 21 that emits laser light for image formation on a photosensitive drum of each photosensitive unit, is provided above the image forming device 20.

A secondary transfer unit 22 is provided below the intermediate transfer belt 10. The secondary transfer unit 22 includes a secondary transfer belt 24, which is an endless belt, hanging between two rollers 23, and which is structured to press the intermediate transfer belt 10 upward onto the third supporting roller 16. The secondary transfer belt 24 causes the image on the intermediate transfer belt 10 to be transferred to a recording medium, e.g., a sheet of paper. Beside the secondary transfer unit 22 is a fixing unit 25 that fixes the image transferred on the paper sheet. The paper sheet with the toner image transferred thereon is fed to the fixing unit 25. The fixing unit 25 has a fixing belt 26, which is an endless belt, pressed with a heating and pressure roller 27.

Below the secondary transfer unit 22 and the fixing unit 25, a sheet reversing unit 28 is disposed for reversing and conveying the paper sheet immediately after the image is formed on a front surface of the paper sheet, for recording another image on a back surface.

Upon pressing of a start switch on an operating section unit, a document, if any, placed on a document feeding pad 30 of an automatic document feeding apparatus (ADF) 120 is conveyed onto a contact glass 32. If no document is present on the ADF, a scanner of an image reading unit 110 is driven to read a document manually place on the contact glass 32, thereby driving a first carriage 33 and a second carriage 34 for read scanning.

Then, light is emitted from a light source on the first carriage 33 toward the contact glass. Also, reflected light from the document surface is reflected by a first mirror on the first carriage 33 toward the second carriage 34, and is then reflected by a mirror on the second carriage 34 through an image-forming lens 35 to form an image on a charge-coupled device (CCD) 36, which is a read sensor. Based on an image signal from the read sensor 36, recording data of each of colors K, Y, M, and C is generated.

Furthermore, after pressing the start switch, upon instruction from a personal computer or the like for image output, or upon instruction for facsimile output, the intermediate transfer belt 10 is driven for rotation. Also, preparation for image formation starts in each unit of the image forming device 20, and an image forming sequence for each color is then started, in which exposure laser light that is modulated based on the recording data of each color is emitted onto the photosensitive drum of each color. During an image forming process for each color, toner images of the respective colors are transferred and overlaid on one another onto the intermediate transfer belt 10 to form one image. A paper sheet is conveyed so that its tip enters the secondary transfer unit 22 simultaneously with the time when the tip of the toner image enters the secondary transfer unit 22. Thus, the toner image on the intermediate transfer belt 10 is transferred to the paper sheet. The paper sheet with the toner image transferred thereto is conveyed to the fixing unit 25, where the toner image is fixed onto the paper sheet.

The process of transferring the paper sheet to the secondary transfer unit 22 is described in detail. A paper feeding unit 43 includes plurality of paper feeding trays 44 that are provided in stages. First, one of paper feeding rollers 42 of a paper feeding table is selectively driven for rotation, to reel out paper sheets from one of the paper feeding trays 44. Then, only one of the paper sheets is separated at a separating roller 45, forwarded to a conveyer roller unit 46, and is then conveyed by conveyer rollers 47 to a conveyer roller unit 48 in the printer 100. Then, after the paper sheet is pushed by the conveyor roller unit 48 until it is stopped at a resist roller 49, the paper sheet is transferred to the secondary transfer unit 22 at the timing described above.

Paper feeding can be performed by inserting paper sheets in a manual paper feeding tray 51. In such a case, a paper feeding roller 50 is driven for rotation. Then, one of the paper sheets on the manual paper feeding tray 51 is separated and drawn into a manual paper feeding path 53 and, as described above, the single paper sheet is then pushed until it is stopped at the resist roller 49.

A switching nail 55 guides the paper sheet that is ejected after the fixing process at the fixing unit 25, to an ejection roller 56 and is stacked on a paper delivery tray 57.

Alternatively, the paper sheet is guided by the switching nail 55 to the sheet reversing unit 28, so that the paper sheet is reversed, and then guided again to the transfer position. After an image is recorded on the back surface, the ejection roller 56 ejects the paper sheet onto the paper delivery tray 57.

After image transfer, an intermediate-transfer-member cleaning unit 17 removes residual toner from the intermediate transfer belt 10, in preparation for the next image formation.

In general, the resist roller 49 is often grounded during use. However, a bias voltage can be applied to the resist roller 49 to remove paper powder of the paper sheets. For example, a bias is applied by using a conductive rubber roller, such as a roller having diameter of 18 millimeter (mm), and its surface being coated with conductive acrylonitrile butadiene rubber (NBR) having a thickness of 1 mm. An electrical resistance is equivalent to a volume resistance of the rubber material, which is of the order of 109 ohm-centimeters (Ωcm). The surface of the paper sheet, after passing through the resist roller 49 applied with a bias in such a manner as described above, is slightly negatively charged.

Therefore, transfer conditions of the transfer to the paper sheet from the intermediate transfer belt 10 may have to be changed from those with no voltage being applied to the resist roller 49. The intermediate transfer belt 10 has a voltage on the order of −800 volt (V) being applied to a side where toner is transferred (front side), and a voltage on the order of +200 V being applied by transfer rollers 62 to the back surface of the paper sheet.

Figure 2:
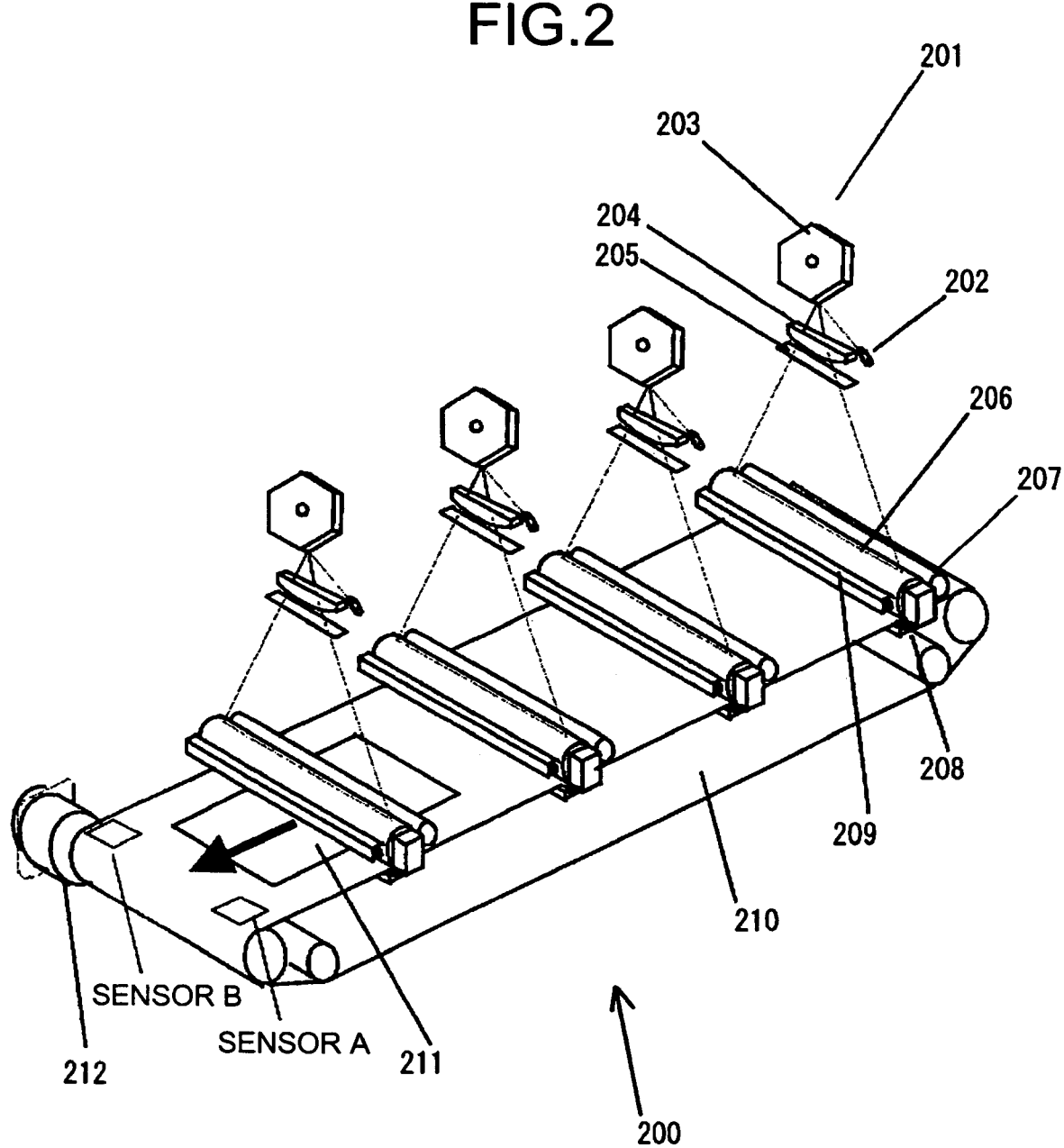
FIG. 2 illustrates a structure of the image forming apparatus according to an embodiment of the present invention.

FIG. 2 illustrates a structure of a four-drum-type, so-called tandem-type, color image forming apparatus. To form a color image by overlaying images of four colors, that is, yellow (Y), magenta (M), cyan (C), and black (BK), an image forming apparatus 200 includes four image forming units and four light beam scanning devices 201. Each image forming unit includes a photosensitive member 209, a developing unit 207, a charging unit 206, and a transfer unit 208.

An image of a first color is formed on a recording paper 211 conveyed by a transfer belt 210 in a direction indicated by an arrow, and then images of second, third, and fourth colors are sequentially transferred. Thus, a color image with images of four colors being overlaid on one another is formed on the recording paper 211, and the image on the recording paper 211 is then fixed by a fixing device (not shown).

In the image forming unit for each color, the photosensitive member 206 is surrounded by the charging unit 209, the developing unit 207, the transfer unit 208, a cleaning unit (not shown), and a static eliminator (not shown). Through charge, exposure, development, and transfer in a normal electro-photographic process, an image is formed on the recording paper 211.

Figure 3:
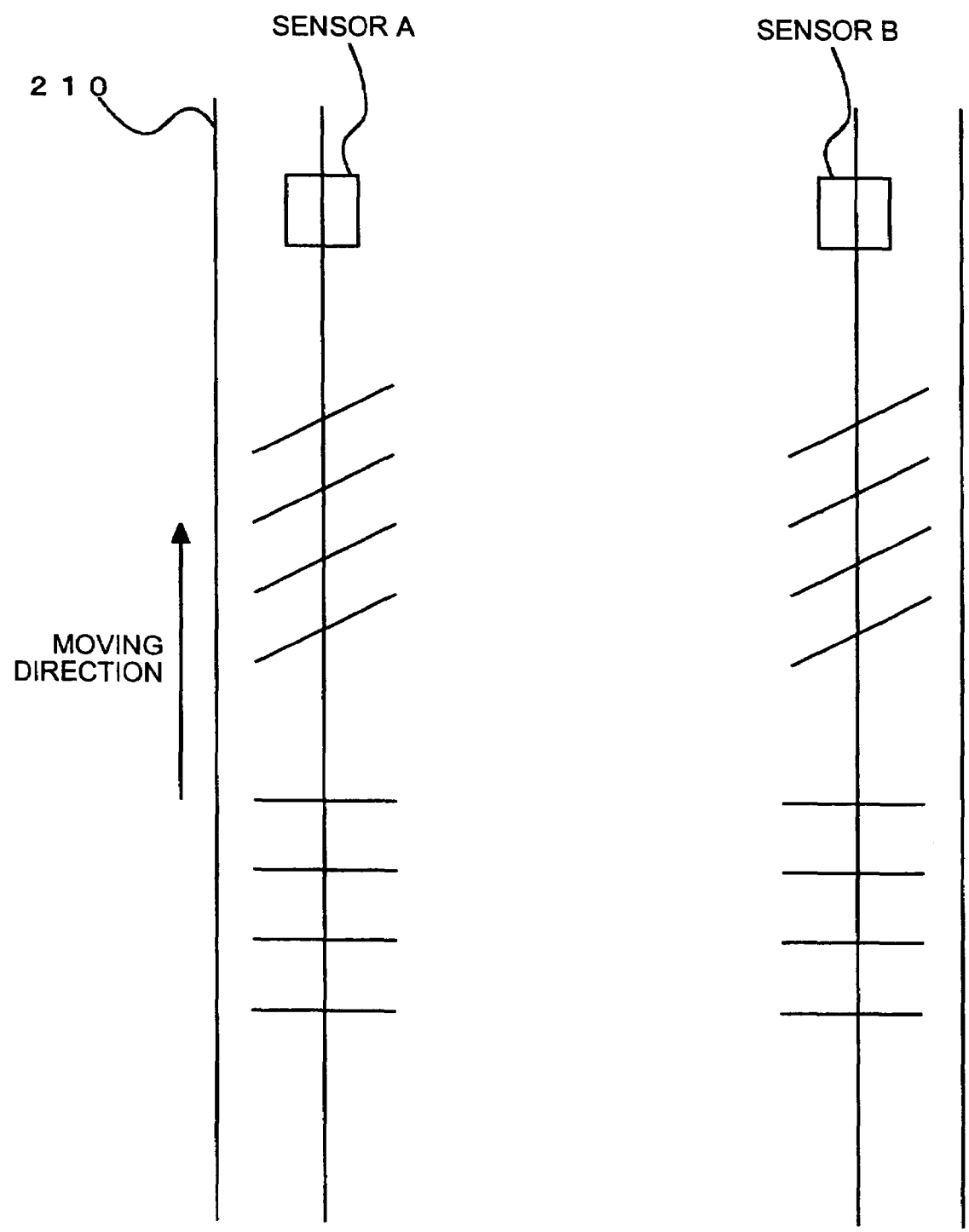
FIG. 3 illustrates a pattern for correcting image positional displacement according to an embodiment of the present invention.

The image forming apparatus is provided with sensors A and B for detecting a pattern for image positional displacement amelioration (if not correction). The sensors A and B are reflection-type optical sensors and detect the pattern for image positional displacement amelioration if not correction (oblique-line patterns, and straight-line patterns that are orthogonal to a moving direction of the transfer belt 210, as shown in FIG. 3). An image positional displacement in the main-scanning direction and the sub-scanning direction for the respective colors, and image scaling in the main-scanning direction are ameliorated (if not corrected) based on the detection by the sensors A and B. Hereafter, it should be understood that correction, etc., is being used broadly so as to include amelioration, etc., respectively.

A light beam scanning device 201 is provided with an LD unit 202 that selectively emits a light beam upon driving and modulation according to image data. The light beam emitted from the LD unit 202 is polarized by a polygon mirror 203 that rotates by a polygon motor, and, after passing through an fθ lens 204 and then a Barrel Toroidal Lens (BTL) 205, is reflected by a mirror (not shown) for use in scanning the photosensitive member 206. The BTL performs focusing in the sub-scanning direction (light-gathering function and position correction in the sub-scanning direction, such as optical face angle error).

Also, a synchronization detection sensor (not shown) is provided ahead of an image writing position of a non-image writing area in the main-scanning direction. Upon receiving the light beam polarized by the polygon mirror 203, the synchronization detection sensor outputs a synchronization detection signal for deciding a timing of the start of writing in the main-scanning direction.

The pattern for correcting image positional displacement, formed on the transfer belt 210, shown in FIG. 3 is described next.

An image of oblique lines and straight lines is formed on the transfer belt 210 at a reference timing for each color. As the transfer belt 210 moves in the direction indicated by the arrow, oblique lines and straight lines of each color are detected by the sensor A and the sensor B, and are then sent to a printer controlling unit 230 (shown in FIG. 4), where an amount (time) of displacement with respect to BK is calculated for each color. A detection timing of the oblique lines is changed with a displacement of the position of the image in the main-scanning direction. Also, by detecting both ends of each oblique line, image scaling fluctuations in the main-scanning direction can also be detected. A detection timing of the straight lines is changed with a displacement of the position of the image in the sub-scanning direction.

The calculated time is compared with a reference time to calculate, for each color, a displacement amount in the main-scanning direction, a scaling error in the main-scanning direction, and a displacement amount in the sub-scanning direction with respect to BK, which is taken as a reference. The image writing position in the main-scanning direction is corrected by changing it in units of cycles of a clock VCLK. The image scaling in the main-scanning direction is corrected by allowing a frequency of a clock WCLK from a write clock generating unit 224 (shown in FIG. 4) to be changed. The image writing position in the sub-scanning direction is corrected by changing it in units of cycles (line) of a synchronization detection signal /DETP.

Figure 4:
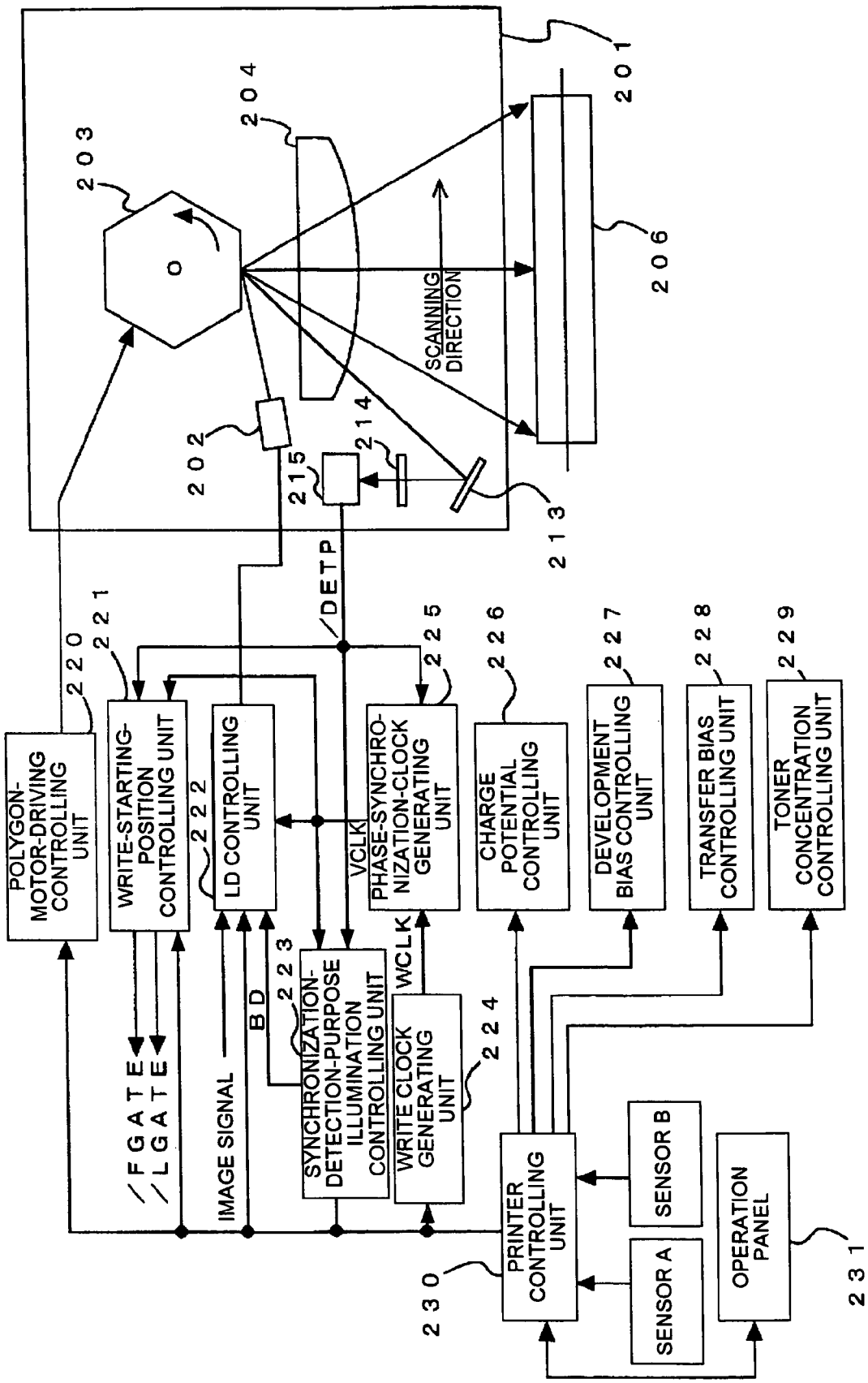
FIG. 4 illustrates a structure of an image formation controlling unit according to an embodiment of the present invention.

The image formation controlling unit is described next with reference to FIG. 4.

On an image writing side at an end of a light beam scanning device 201 in the main-scanning direction, a synchronization detection sensor 215 is provided to detect a light beam. The light beam passing through the fθ lens 204 is reflected by a mirror 213, and is collected by a lens 214 to enter the synchronization detection sensor 215.

When the light beam passes through the sensor 215, a synchronization detection signal /DETP is output from the sensor 215 to a phase-synchronization-clock generating unit 225, a synchronization-detection-purpose illumination controlling unit 223, and a write-starting-position controlling unit 221. The phase-synchronization-clock generating unit 225 generates a clock VCLK from the clock WCLK generated by the write clock generating unit 224 and a synchronization detection signal /DETP, the clock VCLK being in synchronization with /DETP, and sends the generated clock VCLK to an LD controlling unit 222, the synchronization-detection-purpose illumination controlling unit 223, and the write-starting-position controlling unit 221.

First, to detect the synchronization detection signal /DETP, the synchronization-detection-purpose illumination controlling unit 223 forcefully illuminates the LD by turning ON an LD forceful illumination signal BD. After detecting the synchronization detection signal /DETP, the synchronization-detection-purpose illumination controlling unit 223 generates, from the synchronization detection signal /DETP and the clock VCLK, an LD forceful illumination signal BD for illuminating the LD at a timing at which the synchronization detection signal /DETP can be reliably detected to the extent that flare light does not occur, and then sends the generated synchronization detection signal /DETP to the LD controlling unit 222.

The LD controlling unit 222 controls the illumination of the LD according to the synchronization-detection-purpose forceful illumination signal and the width of a pulse signal generated from an image signal, in synchronization with the clock VCLK. Then, a laser beam is emitted from the LD unit 202, polarized by the polygon mirror 203 and, after passing through the fθ lens 204, is used for scanning on the photosensitive member 206.

The polygon-motor-driving controlling unit 220 controls the rotation of the polygon motor, based on a control signal from the printer controlling unit 230, to a reference number of rotations.

Signals of the pattern for image positional displacement correction read by the sensor A and the sensor B are sent to the printer controlling unit 230, where an amount (time) of displacement with respect to BK is calculated for each color. Then, to correct write starting positions in the main-scanning direction and the sub-scanning direction, correction data is sent to the write-starting-position controlling unit 221, thereby allowing timings of a main-scanning gate signal /LGATE and a sub-scanning gate signal /FGATE to be changed. Also, to correct the image scaling, frequency setting data is sent to the write clock generating unit 224, thereby allowing the frequency of the clock WCLK to be changed.

The printer controlling unit 230 is connected to a charge potential controlling unit 226, a development bias controlling unit 227, a transfer bias controlling unit 228, and a toner concentration controlling unit 229, all of which perform control upon instruction form the printer controlling unit 230. Also, the printer controlling unit 230 is connected to an operation panel 231 for allowing display and data inputs.

Figure 5:
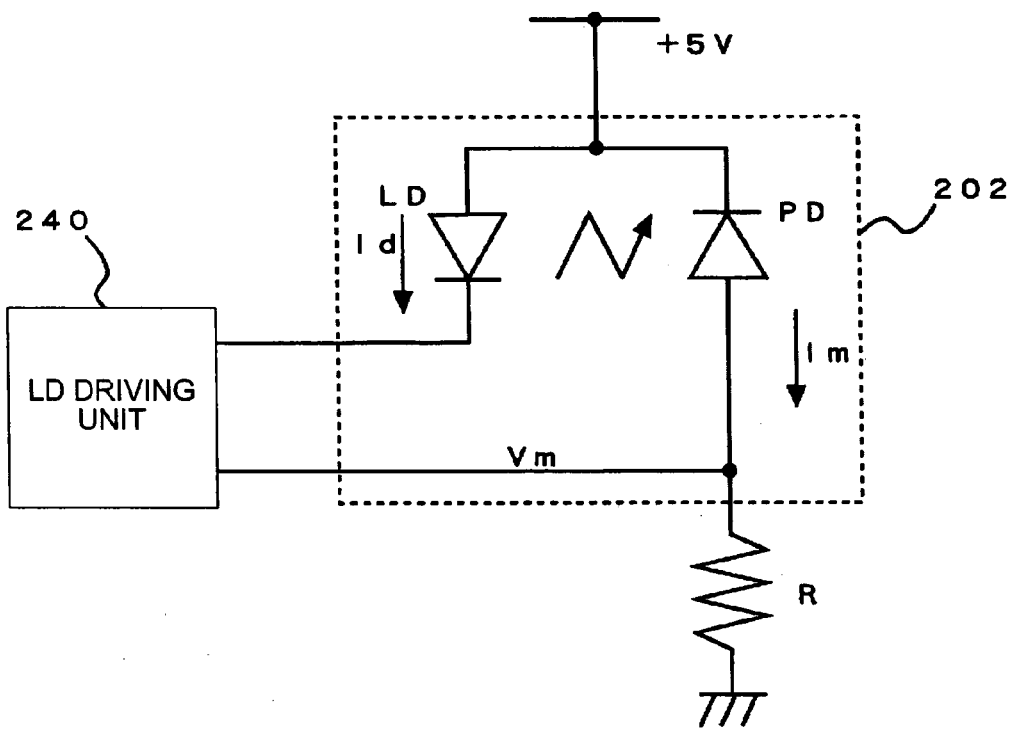
FIG. 5 illustrates a structure of an LD according to an embodiment of the present invention.

The structure of the LD is described next, with reference to FIG. 5.

The LD includes a laser diode (LD) and a photodiode (PD). To illuminate the LD with a light amount based on an instruction from the printer controlling unit 230, an LD driving unit 240 controls an LD current Id, so that a monitor voltage Vm at the PD is kept constant (Auto Power Control (APC) operation). To change the light amount, Vm is changed upon instruction from the printer controlling unit 230. The LD current Id is controlled to keep Vm constant.

Figure 6:
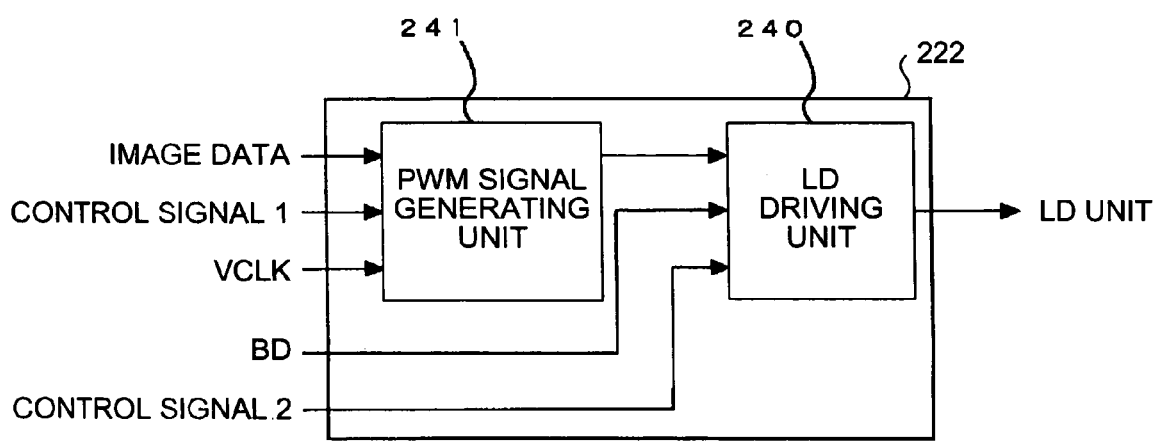
FIG. 6 illustrates a structure of an LD controlling unit according to an embodiment of the present invention.

The structure of the LD controlling unit 222 is described next, with reference to FIG. 6.

The LD controlling unit 222 is divided into a PWM signal generating unit 241 that controls the illumination time of the LD, and an LD driving unit 240 that controls the illumination of the LD. The PWM signal generating unit 241 outputs a PWM signal to the LD driving unit 240, based on the image data and a control signal 1 from the printer controlling unit 230. The LD driving unit 240 illuminates the LD for a period of time defined by the control signal 1.

Also, by sending the LD forceful illumination signal BD from the synchronization-detection-purpose illumination controlling unit 223 to the LD driving unit 240, the LD is illuminated for a period of time defined by the LD forceful illumination signal BD. The light amount at the time of illuminating the LD is set by a control signal 2 from the printer controlling unit 230.

The image data may have a width of one bit or a width of plural bits (equal to or larger than two bits). For example, if the image data has a width of one bit, the apparatus may be structured to allow generating a given pulse width. Alternatively, the pulse width may be selected and output based on the control signal 1 (selection signal) from the printer controlling unit 230. If the image data has a width of plural bits (equal to or larger than two bits), the apparatus may be structured to allow generating a pulse width corresponding to the image data. Alternatively, the apparatus may be structured to allow changing the pulse width corresponding to the image data, based on the control signal (selection signal) from the printer controlling unit 230.

Figure 7:
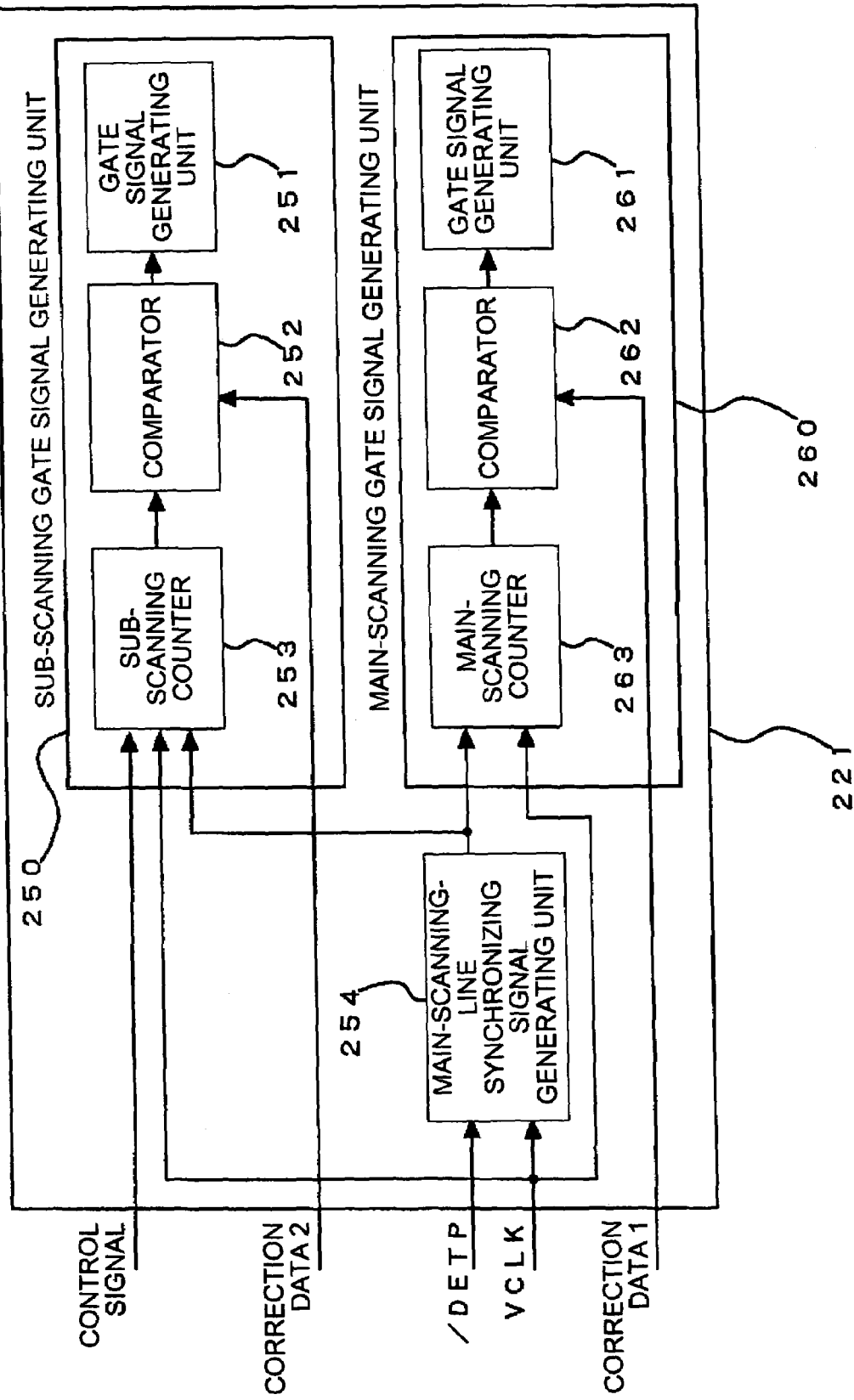
FIG. 7 illustrates a structure of a write-starting-position controlling unit according to an embodiment of the present invention.

The structure of the write-starting-position controlling unit 221 is described next, with reference to FIG. 7.

The write-starting-position controlling unit 221 is divided into a main-scanning-line synchronizing signal generating unit 254, a main-scanning gate signal generating unit 260, and a sub-scanning gate signal generating unit 250. The main-scanning-line synchronizing signal generating unit 254 generates a signal /LSYNC for operating a main-scanning counter 263 in the main-scanning gate signal generating unit 260, and a sub-scanning counter 253 in the sub-scanning gate signal generating unit 250. The main-scanning gate signal generating unit 260 generates a signal /LGATE for determining a timing of capturing an image signal (an image writing timing in the main-scanning direction). The sub-scanning gate signal generating unit 250 generates a signal /FGATE for determining a timing of capturing an image signal (an image writing timing in the sub-scanning direction).

The main-scanning gate signal generating unit 260 includes the main-scanning counter 263 that operates based on /LSYNC and VCLK, a comparator 262 that compares a counter value with correction data 1 from the printer controlling unit 230 and outputs the comparison result, and a gate signal generating unit 261 that generates /LGATE based on the comparison result output from the comparator 262.

The sub-scanning gate signal generating unit 250 includes the sub-scanning counter 253 that operates based on the control signal from the printer controlling unit 230, /LSYNC, and VCLK, a comparator 252 that compares a counter value with correction data 2 from the printer controlling unit 230 and outputs the comparison result, and a gate signal generating unit 251 that generates /FGATE based on the comparison result output from the comparator 252.

The write-starting-position controlling unit 221 allows correction of the write position in units of cycles of the clock VCLK, that is, in units of dots, in the main-scanning direction, and in units of cycles of /LSYNC, that is, in units of lines, in the sub-scanning direction.

Figure 8:
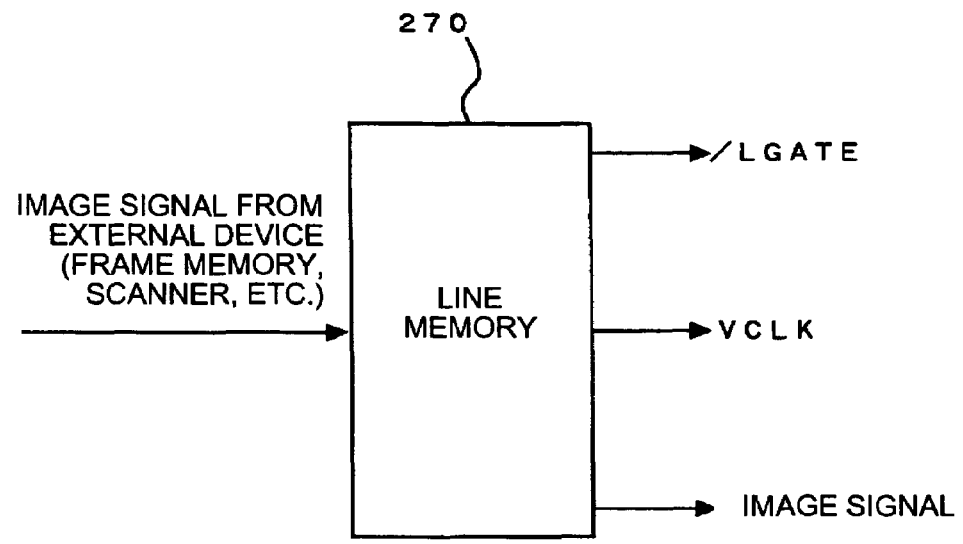
FIG. 8 is an example of a stage before the image forming controlling unit according to an embodiment of the present invention.

An example of a stage before the image forming controlling unit is described next, with reference to FIG. 8.

In that stage, a line memory 270 receives an image data captured by an external device such as a frame memory or a scanner, at the timing defined by /FGATE, and then outputs the image signal in synchronization with VCLK for a period during which /LGATE is in an "L" (valid) state. The LD is illuminated at that timing when the image signal output is sent to the LD controlling unit 222.

Therefore, changing the correction data that the printer controlling unit 230 sets in the comparator, changes timings of /LGATE and /FGATE, thereby causing a change in the timing of the image signal, and also causing a change in the image write starting position in the main-scanning direction and the sub-scanning direction.

Figure 9:
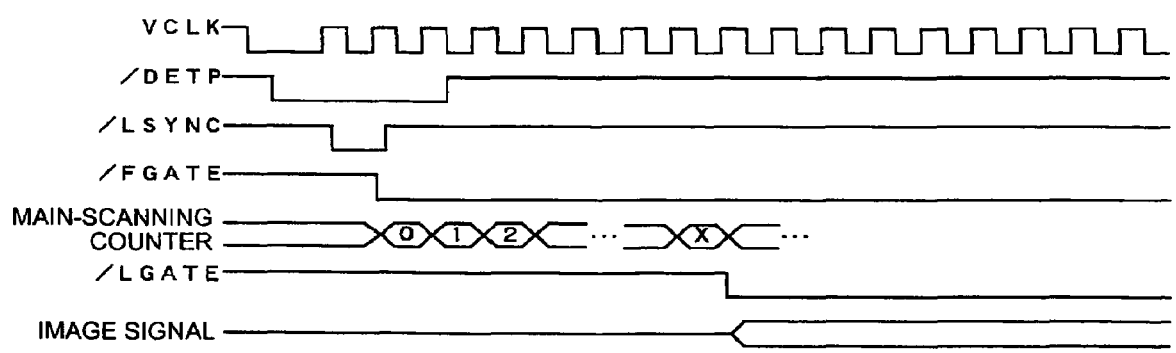
FIG. 9 is a timing chart of the write-starting-position controlling unit according to an embodiment of the present invention.

A timing of the write-starting-position controlling unit 221 is described next, with reference to a timing chart shown in FIG. 9. The counter is reset by /LSYNC, to count up with VCLK. When the counter value reaches a value of the correction data set by the printer controlling unit 230 (in this case, "X"), the comparison result is output from the comparator, and the gate signal generating unit thereby causes /LGATE to enter an "L" (valid) state. The /LGATE signal enters an "L" state for a portion of an image width in the main-scanning direction. In the case of sub-scanning, unlike main-scanning described above, /LSYNC is used for counting-up.

Next, the structure and operation of the image forming apparatus and the process cartridge according to various example embodiments of the present invention are described.

Figure 10:
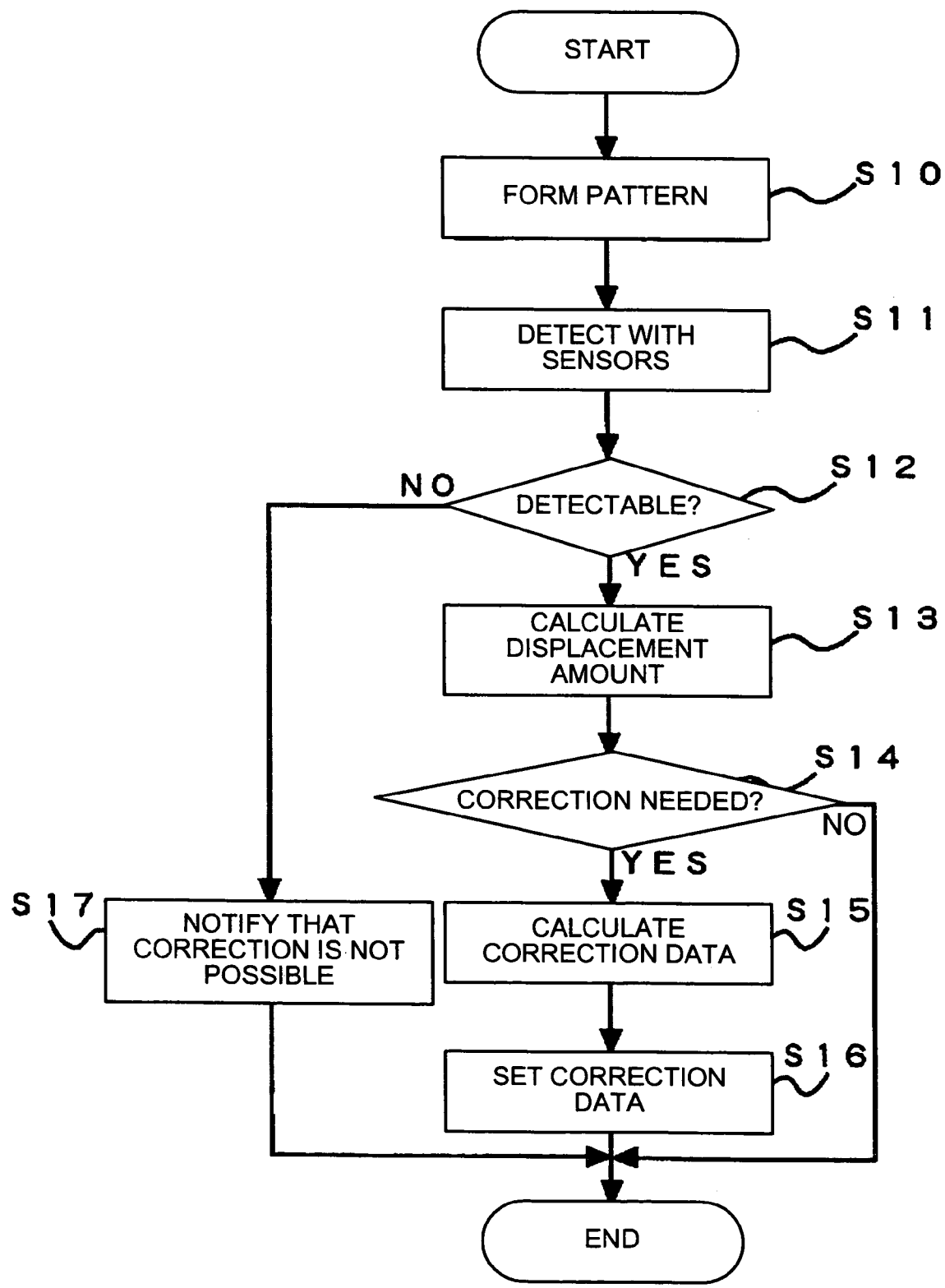
FIG. 10 is a flowchart of a process of correcting an image positional displacement according to an embodiment of the present invention.

FIG. 10 is a flowchart of a process of correcting an image positional displacement according to an embodiment of the present invention.

In FIG. 10, with BK (black) as a reference, the main-scanning image position, the sub-scanning image position, and the main-scanning image scaling for each of the other colors are corrected. Therefore, detection is performed on all colors, whereas correction is performed on colors other than BK.

First, a pattern is formed (step S10). Here, a pattern for image positional displacement correction is formed on the transfer belt 210. Next, detection is performed with the sensors (step S11). Here, the pattern for image positional displacement correction formed on the transfer belt 210 is detected with the sensors. Next, at the time of sensor detection, it is determined whether the level of detecting the pattern for image positional displacement correction can detect the pattern for image positional displacement correction (step S12).

If the pattern is detectable (Yes at step S12), the displacement amount is calculated (step S13). Here, the printer controlling unit 230 detects the main-scanning displacement amount, the sub-scanning displacement amount, and the main-scanning scaling error amount with respect to BK. Next, it is determined whether correction is needed (step S14). Here, the correction accuracy is in units of dots or in units of lines. Therefore, correction is needed when the displacement amount is equal to or more than half a dot or a line.

If correction is not needed (No at step S14), the procedure ends. If the correction is needed (Yes at step S14), correction data is calculated (step S15), and then the correction data is set (step S16).

Here, first, the main-scanning gate signal generating unit 260 is set with the correction data 1 to generate /LGATE, while the sub-scanning gate signal generating unit 250 is set with the correction data 2 to generate /FGATE.

As for correction of the main-scanning scaling error, it is determined whether the scaling error detected is at a level for correction. This determination is also based on the scaling correction accuracy.

When the image scaling is corrected, a setting value for the frequency required for correcting the image scaling is calculated and set to the write clock generating unit 224, thereby generating a clock WCLK.

If the pattern is not detectable (No at step S12), image positional displacement correction cannot be performed. Therefore, the printer controlling unit 230 controls an error notification (indicating that correction is not possible) to be shown on the operation panel 231, thereby causing an output of a full-color image to be stopped. In such a context, the printer controlling unit 230 and the operation panel 231 together can be described, e.g., as forming at least part of a notifying unit. However, as for monochrome or monocolor outputs, such image positional displacement poses little (if no) problem, and therefore the printer controlling unit 230 enables output of the full-color image. For an undetectable color, a flag indicating that image formation is not performed is set, which thereby disables full-color image formation at the time of normal image formation, but allows a monochrome image forming operation using colors other than the undetectable color. In the context of such enablement and/or disablement, the printer controlling unit 230 can be described, e.g., as at least part of an amelioration unit. Thus, the apparatus is not completely out-of-order until a service person comes for repair.

Also, with undetectable color(s) being displayed on the operation panel 231 for allowing selection of which color to use for monochrome printing, the user can arbitrarily determine the output color with ease.

Furthermore, as for a fax image, the user may set a priority order and, based on the priority order, cause an image output using detectable colors.

Figure 11:
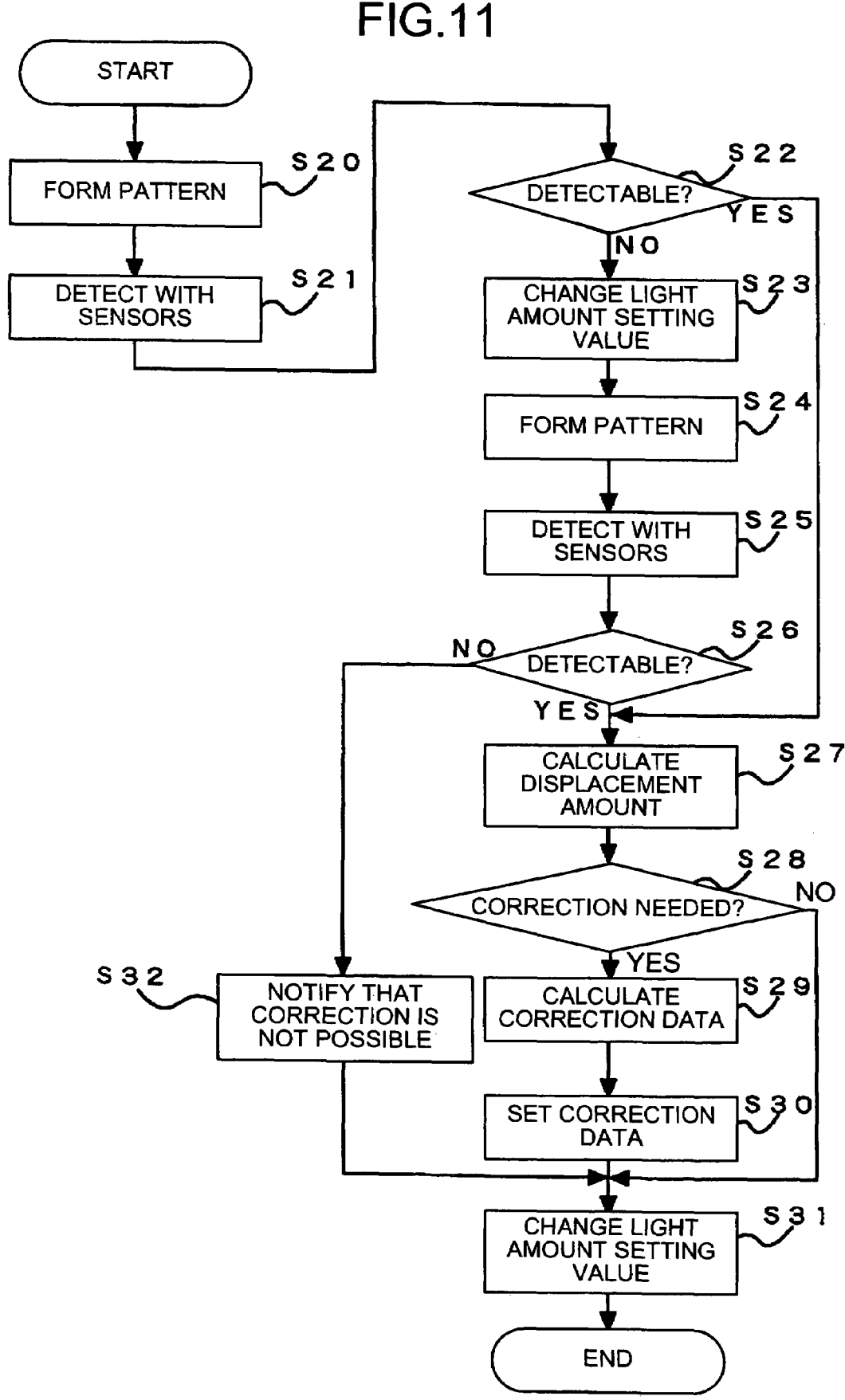
FIG. 11 is a flowchart of a process of correcting an image positional displacement according to an embodiment of the present invention.

FIG. 11 is a flowchart of a process of correcting an image positional displacement according to an embodiment of the present invention.

In FIG. 11, when the pattern for image positional displacement correction is not detectable, conditions for image formation are changed, and then detection of the pattern for image positional displacement correction is tried again.

First, a pattern is formed (step S20). Here, a pattern for image positional displacement correction is formed on the transfer belt 210. Next, detection is performed with the sensors (step S21). Here, the pattern for image positional displacement correction formed on the transfer belt 210 is detected with the sensors. Next, at the time of sensor detection, it is determined whether the level of detecting the pattern for image positional displacement correction can detect the pattern for image positional displacement correction (step S22).

If the level of detecting the pattern for image positional displacement correction cannot detect the pattern for image positional displacement correction (No at step S22), the light amount setting value is changed (step S23). Changing the light amount setting value is performed by, for example, changing the light amount of the LD. Then, the pattern for image positional displacement correction is formed on the transfer belt 210 (step S24), and the pattern for image positional displacement correction is detected (step S25). If the pattern for image positional displacement correction is not detectable with the sensors even after changing the light amount setting value, an error display (indicating that correction is not possible) is shown on the operation panel 231, thereby causing an output of a full-color image to be stopped.

Here, the processes in steps S27 to S30 are similar to those in steps S13 to S16 described above, and hence, are not described herein.

In FIG. 11, the light amount setting value of the LD is changed. Alternatively (and/or in addition thereto), the illuminating time of the LD (PWM), a development bias voltage, or a transfer current may be changed.

Alternatively, (see below), before performing a process of forming a pattern for image positional displacement correction, the current toner concentration can be checked. If the toner concentration is lower than a reference value, a toner replenishing operation is performed, and then a pattern forming operation is performed.

Figure 12:
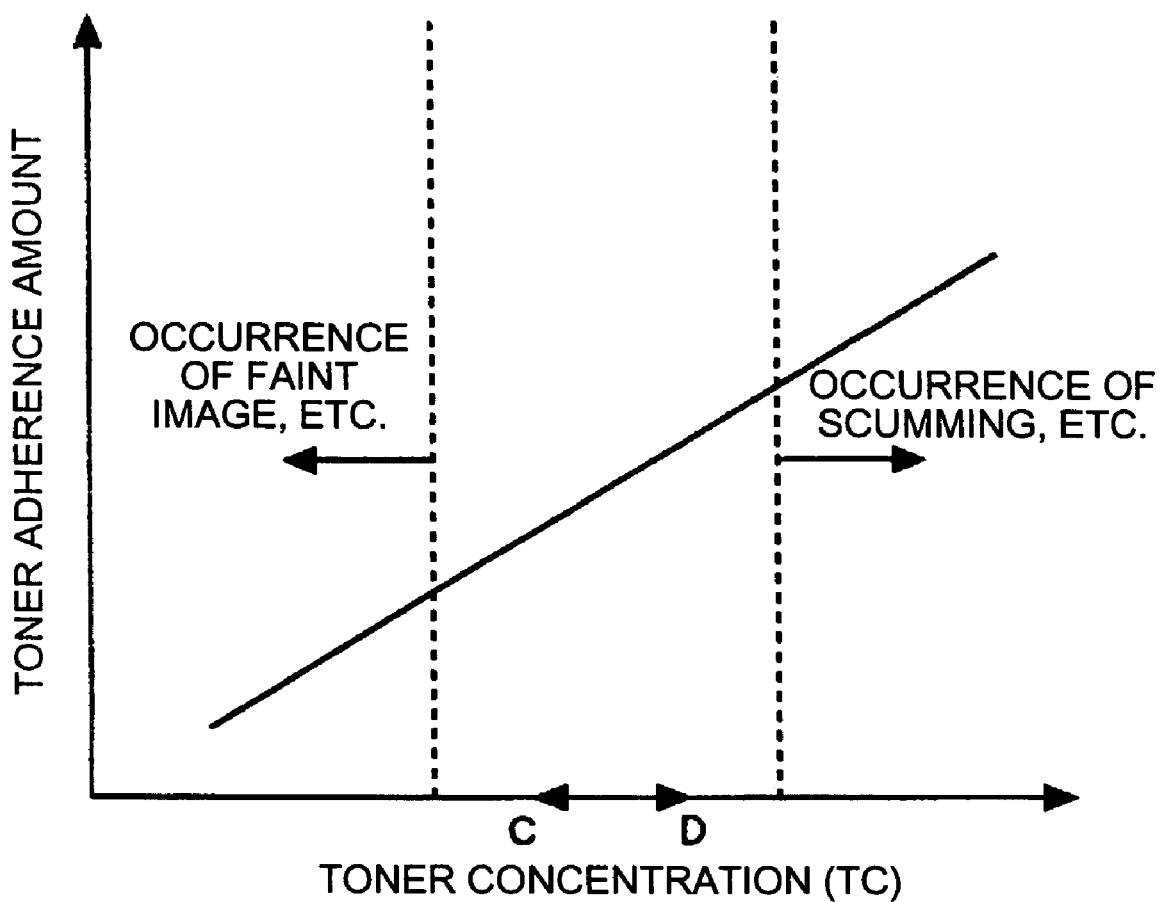
FIG. 12 is a graph showing a relation between a toner concentration and an amount of toner adherence according to an embodiment of the present invention.

FIG. 12 illustrates a relation between a toner concentration and an amount of toner adherence according to an embodiment of the present invention.

In the graph shown in FIG. 12, the horizontal axis represents the toner concentration (TC), while the vertical axis represents the amount of toner adherence. If the toner concentration is too low, a faint image occurs. If the toner concentration is too high, scumming or the like occurs. Therefore, the toner concentration is controlled to be normally between C and D.

When the density of the pattern for image positional displacement correction is too low to be detectable, the toner concentration is near C or lower. Therefore, to form a pattern for image positional displacement correction, the toner is replenished to temporarily increase the toner concentration, thereby increasing the density of the pattern for image positional displacement correction.

Figure 13:
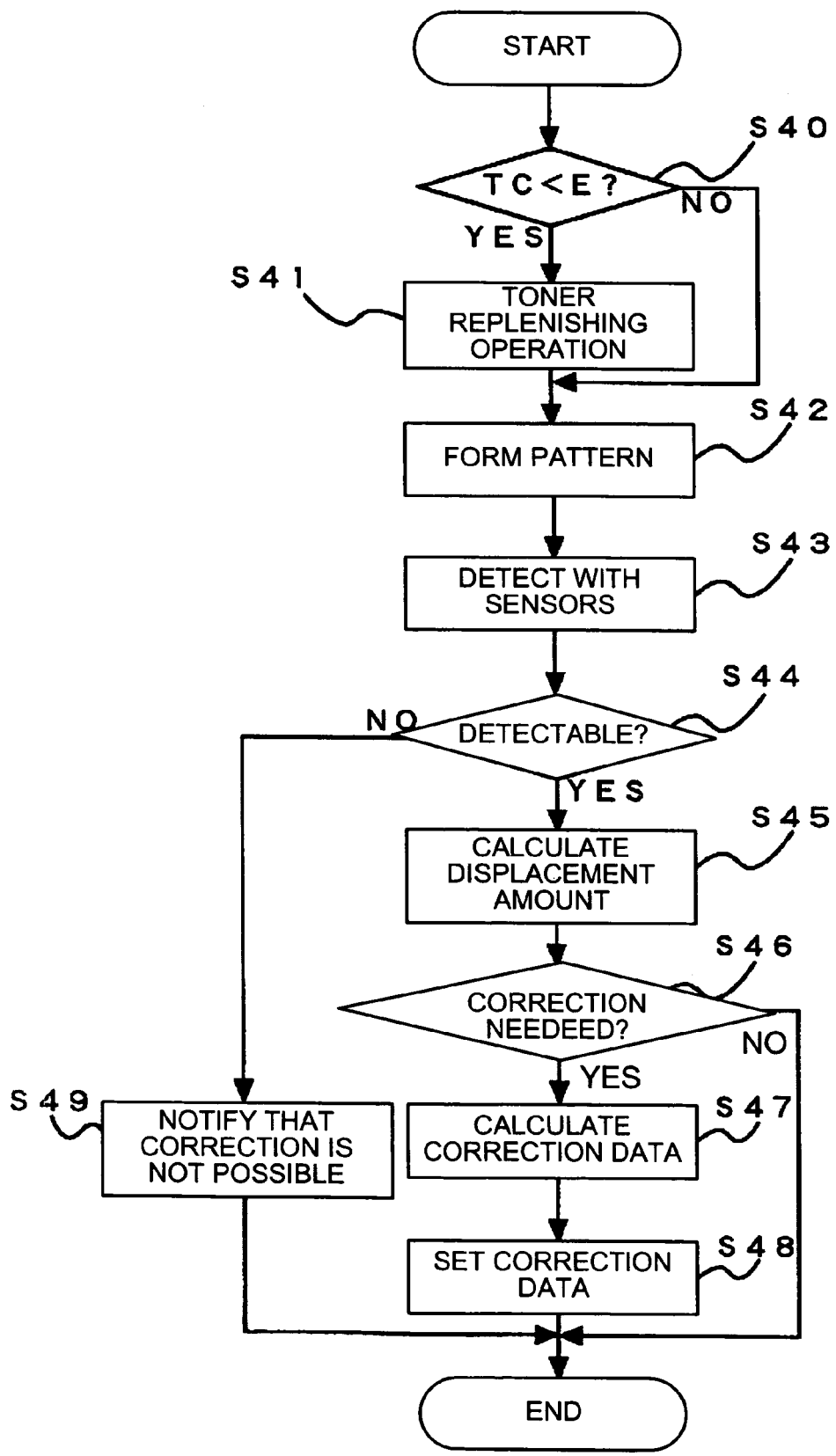
FIG. 13 is a flowchart of a process of correcting an image positional displacement according to an embodiment of the present invention.

A process of correcting an image positional displacement according to an embodiment of the present invention is described next, with reference to a flowchart in FIG. 13.

First, as shown in the graph of FIG. 12, the toner concentration (TC) is controlled to be between C and D. Here, by using an intermediate value E between C and D as a criterion value, it is determined whether the toner concentration (TC) is lower than the criterion value E (step S40). If the toner concentration (TC) is lower than the criterion value E (Yes at step S40), a toner replenishing operation is performed (step S41).

Here, the processes in steps S42 to S49 are similar to those in steps S10 to S17 described above, and hence, are not described herein.

A process of correcting an image positional displacement according to an embodiment of the present invention is described next, with reference to a flowchart in FIG. 14.

Figure 14:
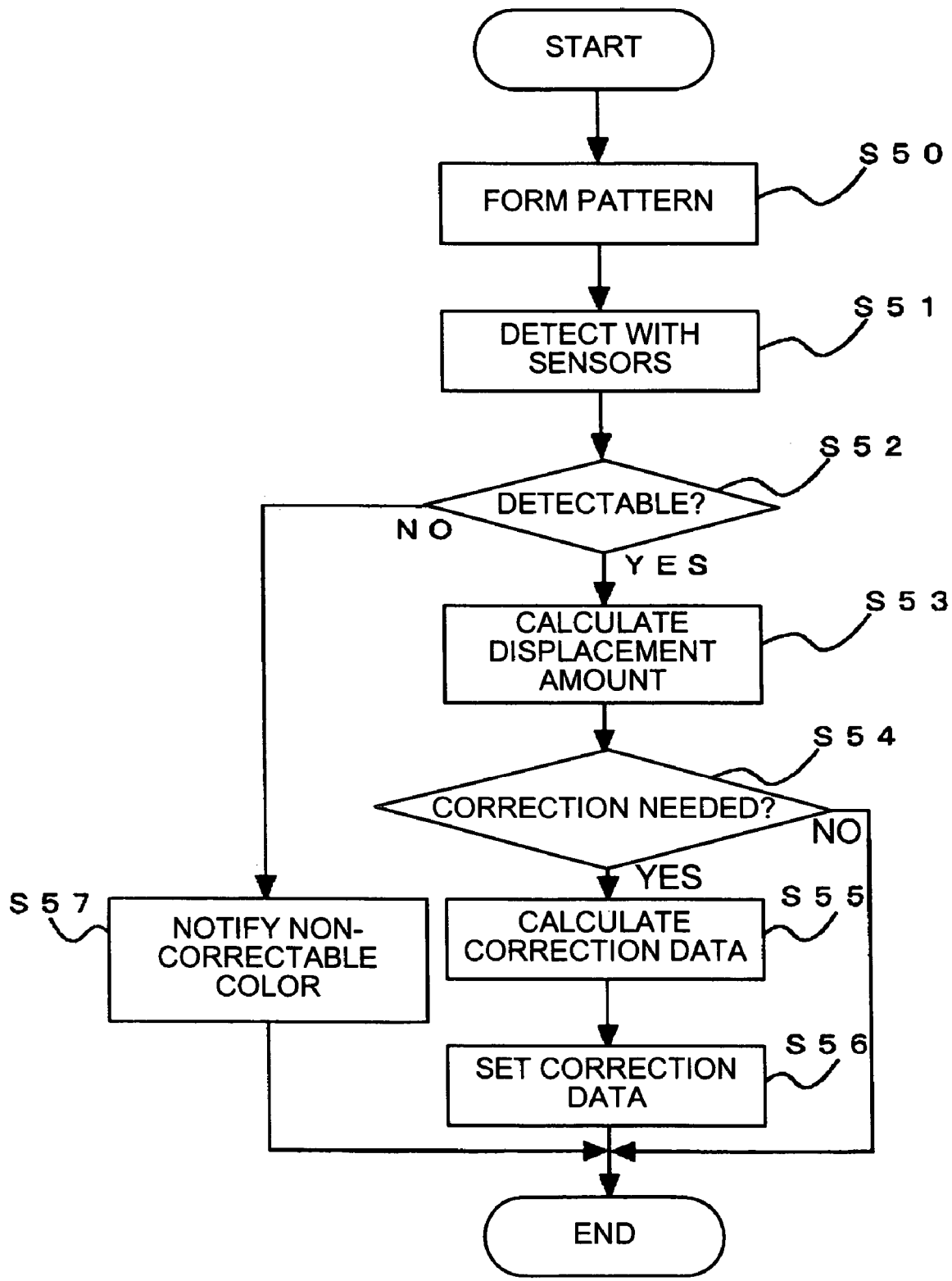
FIG. 14 is a flowchart of a process of correcting an image positional displacement according to an embodiment of the present invention.

In FIG. 14, correction is performed for a detectable color. An error is displayed for a color that is not detectable (and therefore, not correctable).

In step S52, it is determined whether the level of detecting the pattern for image positional displacement correction can detect the pattern for image positional displacement correction. If the level cannot detect (No at step S52), it is notified that the color is not correctable (step S57). Here, the undetectable color is displayed on the operation panel 231, thereby causing an output of a full-color image to be stopped. But, an output of a monochrome image or an image of a combination of a plurality of colors is enabled for the corrected color. Also, the detectable color(s) may be displayed on the operation panel 231, thereby allowing selection of which color to use for monochrome printing, or selection of which colors to use in combination for printing. Thus, the user can arbitrarily determine the output color(s) with ease.

Here, the processes in steps S50 to S56 are similar to those in steps S10 to S16 described above, and hence, are not described herein.

A process of correcting an image positional displacement according to an embodiment of the present invention is described next, with reference to a flowchart in FIG. 15.

Figure 15:
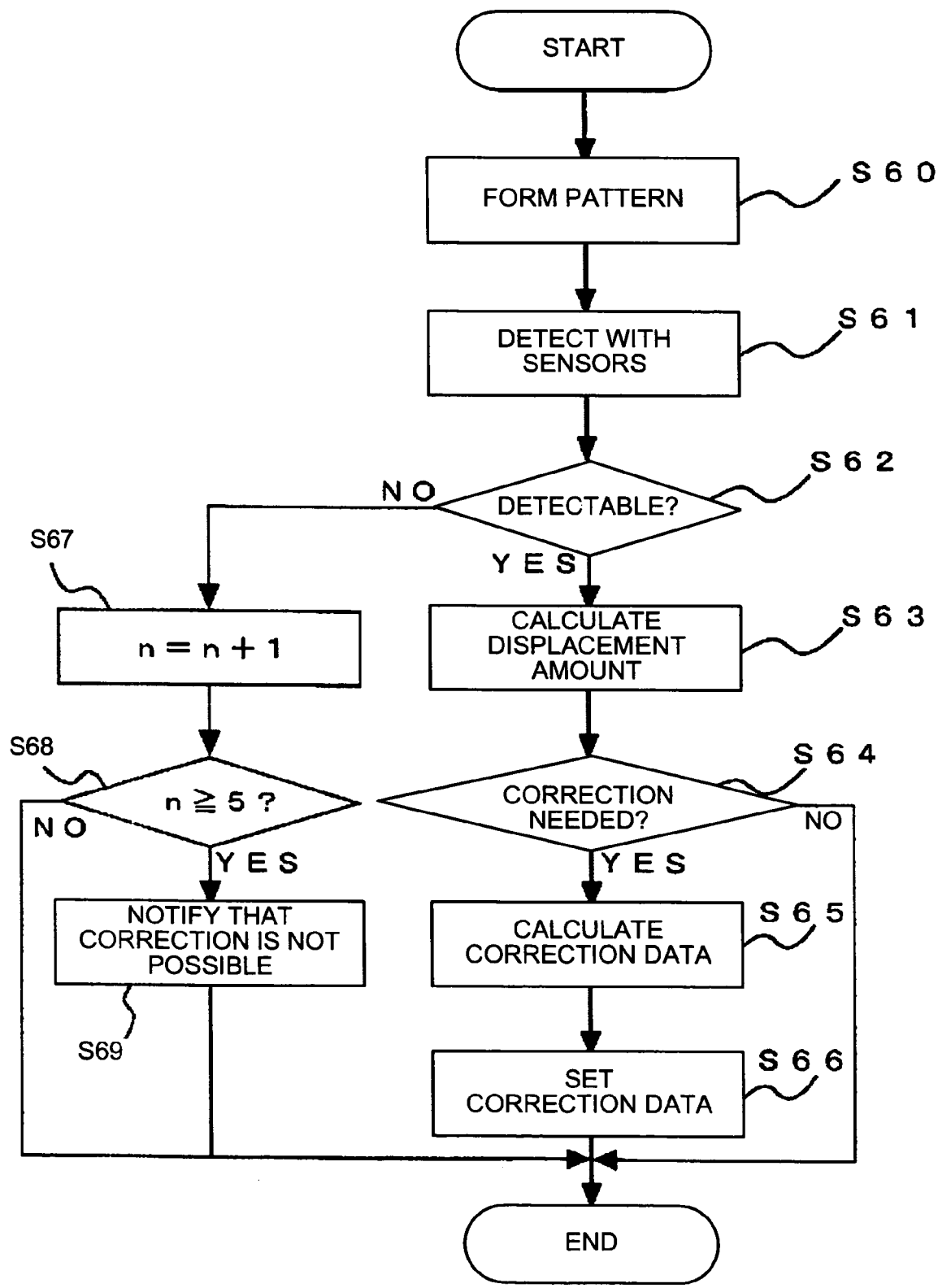
FIG. 15 is a flowchart of a process of correcting an image positional displacement according to an embodiment of the present invention.

In FIG. 15, the number of times the pattern for image positional displacement correction cannot be detected is counted. After a threshold number of times or more, an error indicating that correction is not possible is displayed on the operation panel 231, thereby causing an output of a full-color image to be stopped.

In step S62, it is determined whether the level of detecting the pattern for image positional displacement correction can detect the pattern for image positional displacement correction. If the level cannot allow detection (No at step S62), n=0 (the number of detection NG=0) is set when the power is turned ON, and the number of detection NG is counted (step S67). Then, it is determined whether NG is equal to or more than five (step S68). If NG is equal to or more than five (Yes at step S68), it is notified that correction is not possible (step S69), and then the procedure ends. If the number of detection NG is not equal to or more than five (No at step S68), the procedure ends immediately.

In FIG. 15, error is determined with n=5. However, alternatively, the number of times for determining error may be determined from the number of times correction cannot be made and the actual state of image position displacement. Even if the number is the same, five successive NGs and five intermittent NGs may be used for comparison. Successive NGs affects the image more, and the possibility that the apparatus is out of order is higher. Intermittent NGs may indicate a sporadic detection error. Therefore, with successive NG times, a failure of the apparatus can be detected more reliably, thereby at least reducing (if not preventing) an influence on the image.

Here, the processes in steps S60 to S66 are similar to those in steps S10 to S16 described above, and hence, are not described herein.

Not only, as described above, could an error display be provided, but also the user can select printing of the undetected color(s) (and also full-color printing, as alternative). Depending on the level of image positional displacement, the user may allow printing even with an image positional displacement. To allow printing in such case, printing selection is provided, thereby fulfilling the need from all users.

A structure of a process cartridge according to an embodiment of the present invention is described next, with reference to FIG. 16.

The process cartridge has integrally connected therein a photosensitive member, a charging unit, a developing unit, and a cleaning unit. The process cartridge is an independent unit, and can be removably mounted on the image forming apparatus shown in FIG. 2.

Figure 16:
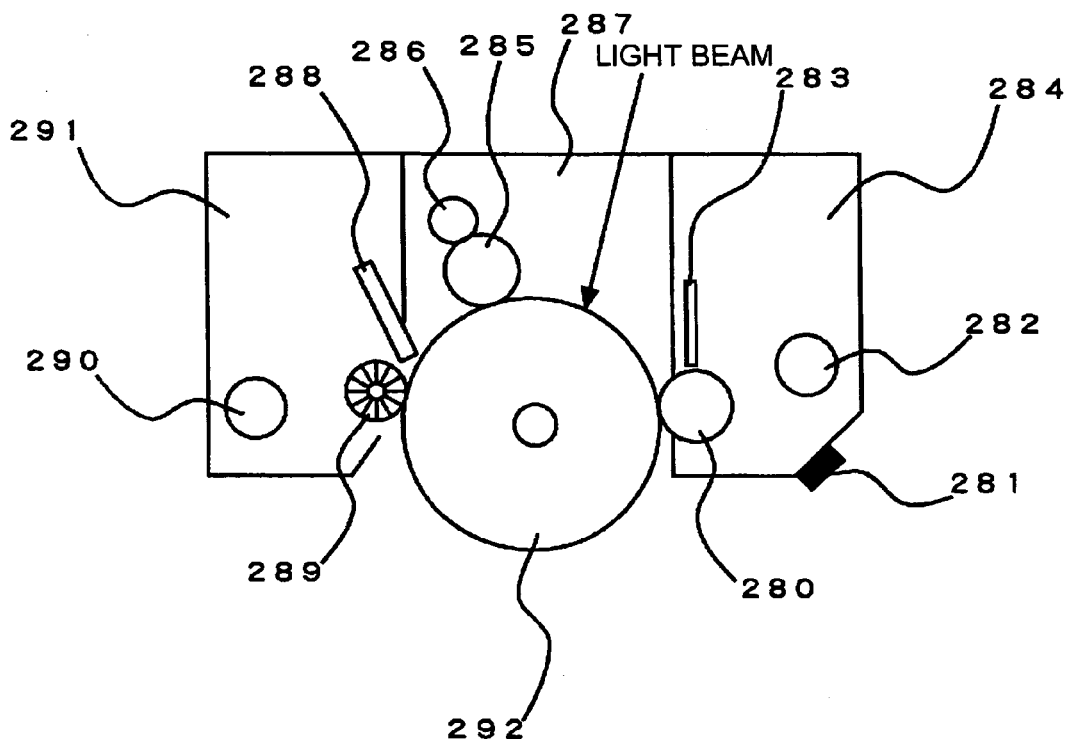
FIG. 16 illustrates a structure of a process cartridge according to an embodiment of the present invention.

The process cartridge shown in FIG. 16 includes a developing unit 284, a charging unit 287, a cleaning unit 291, and a photosensitive drum 292. The developing unit 284 includes a developing roller 280, a toner concentration sensor 281, a conveyer screw 282, and a development doctor blade 283.

The charging unit 287 includes a charging roller 285 and a charging cleaning roller 286. The cleaning unit 291 includes a cleaning blade 288, a cleaning brush 289, and a waste toner conveyer coil 290.

Next, the operation of the process cartridge is described.

Toner conveyed from a toner cartridge (not shown) to the developing unit 284 is mixed with developer by the conveyer screw 282, and is then conveyed to the developing roller 280. The development doctor blade 283 regulates an amount of adherence of the mixed agent on the developing roller 280, and the agent is then supplied to the photosensitive drum 292. Also, the toner concentration sensor 281 in the developing unit 284 detects a toner concentration in the agent, and controls the toner concentration.

The charging roller 285 charges the photosensitive drum 292. The charging roller 285 rotates in a direction opposite to the rotating direction of the photosensitive drum 292, and uniformly charges the surface of photosensitive drum 292. The cleaning roller 286 provided above the charging roller 285 is attached to the charging roller 285, and cleans the charging roller 285.

The cleaning blade 288 and the cleaning brush 289 in the cleaning unit collect the toner that is not transferred and remains on the photosensitive drum 292. The cleaning blade 288 is provided in a counter direction to the photosensitive drum 292, and is attached to the photosensitive drum 292. The cleaning brush 289 rotates in a direction opposite to the rotating direction of the photosensitive drum 292, and collects non-transferred toner with the cleaning blade 288, and forwards the collected toner to the waste toner conveyer coil 290. Waste toner is conveyed from the waste toner conveyer coil 290 to a waste toner delivery opening, and is then collected in a waste toner bottle (not shown).

Next, a structure of a process cartridge according to an embodiment of the present invention is described with reference to FIG. 17.

Figure 17:
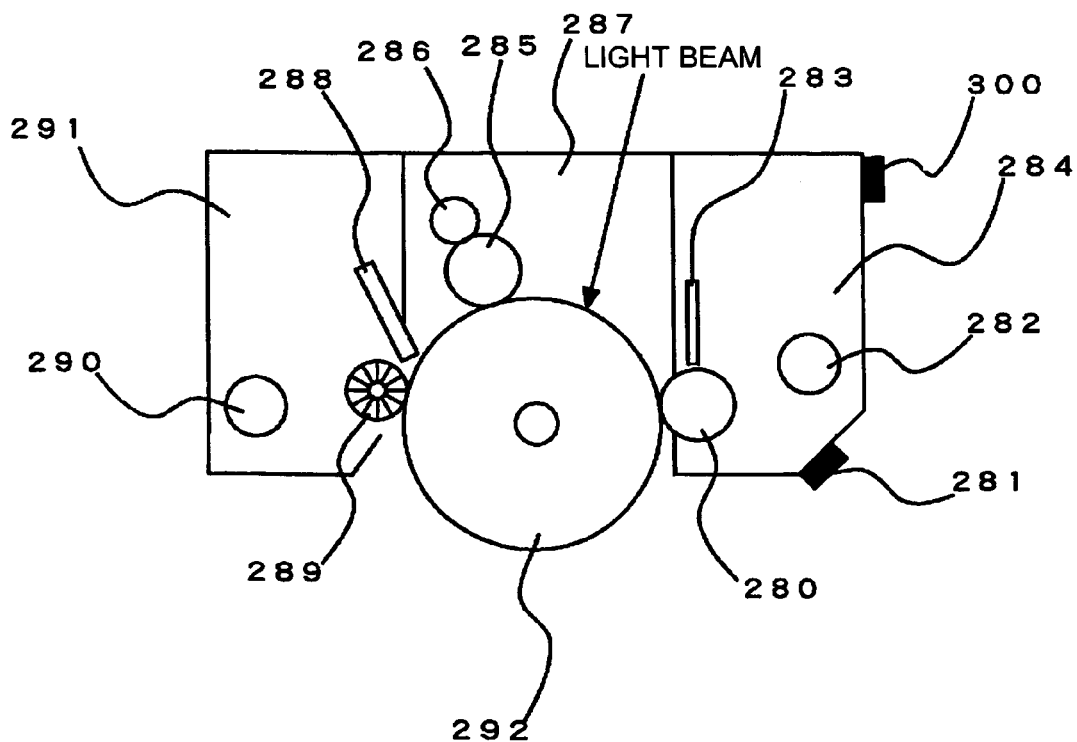
FIG. 17 illustrates a structure of a process cartridge according to an embodiment of the present invention.

In FIG. 17, a memory is provided to a process cartridge for storing a result of image positional displacement correction.

Detection results regarding a color, of which the pattern for image positional displacement correction cannot be detected, are stored in a memory 300 of a corresponding process cartridge. Thus, if the process cartridge has any error, its error record stored in the memory 300 is valid even when the process cartridge is mounted on another apparatus.

If the process cartridge is replaced, image positional displacement correction is performed again. If the pattern is detectable, a record indicating that printing is possible, is stored. Thus, the apparatus can resume normal operation.

Also, by storing a history of correction result, such as the number of NG times, it is possible to determine whether correction is possible based on the number NG.

Figure 18:
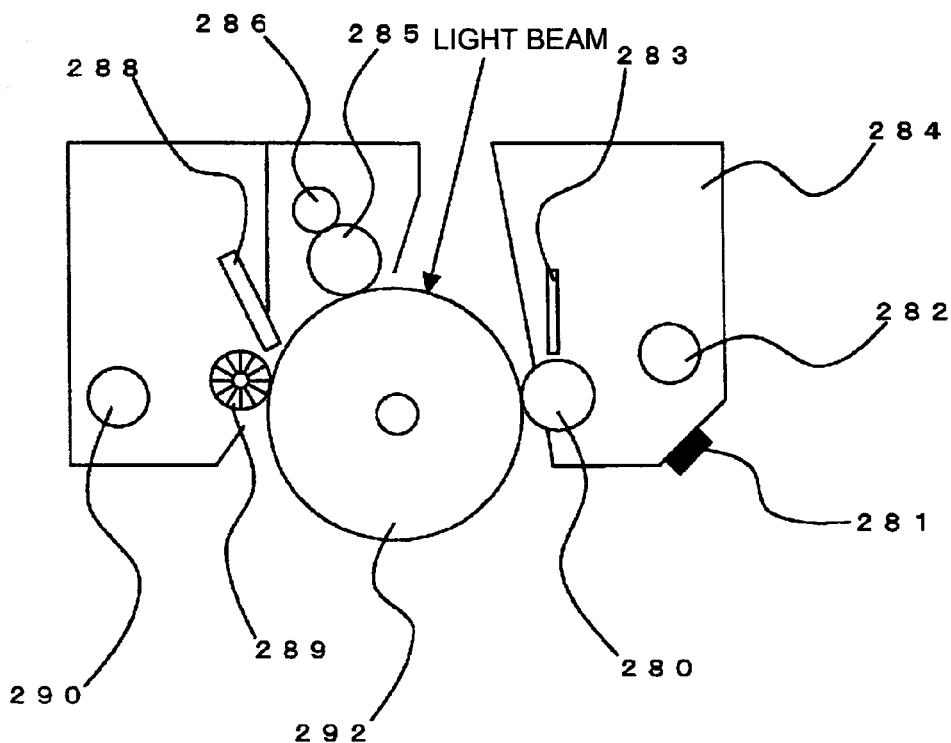
FIG. 18 illustrates a structure of a process cartridge according to an embodiment of the present invention.

Next, a structure of a process cartridge according to an embodiment of the present invention is described with reference to FIG. 18.

In such a process cartridge, a photosensitive unit and the developing unit 284 are independently provided. The photosensitive unit and the developing unit 284 can be removably mounted on the image forming apparatus 200 shown in FIG. 2.

The operation of such a process cartridge is as described for the process cartridge of FIG. 16, and hence, explanation thereof is omitted here.

Next, a structure of a process cartridge according to a tenth embodiment of the present invention is described with reference to FIG. 19.

Figure 19:
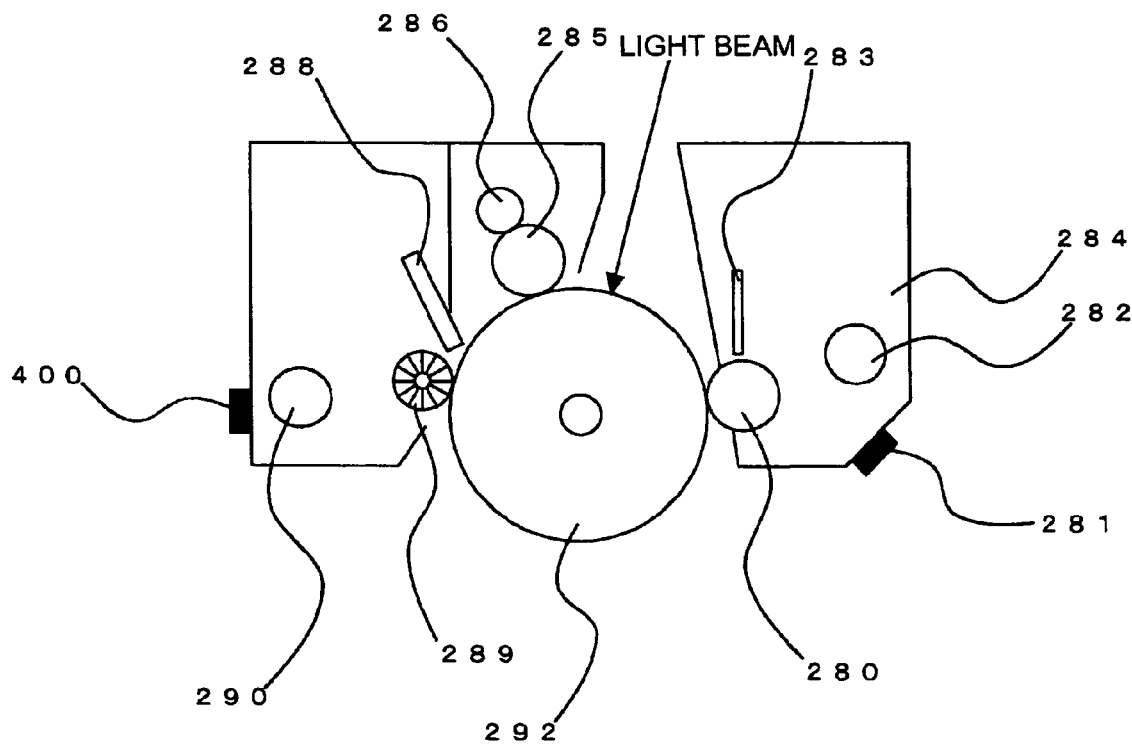
FIG. 19 illustrates a structure of a process cartridge according to an embodiment of the present invention.

In FIG. 19, a memory 400 is provided to the photosensitive unit, for storing the result of image positional displacement correction. Detection results regarding a color, of which the pattern for image positional displacement correction cannot be detected, are stored in the memory 400 of a corresponding photosensitive unit. Thus, if the photosensitive unit has any error, its error record is valid even when the photosensitive unit is mounted on another apparatus.

If the photosensitive unit is replaced, image positional displacement correction is performed again. If the pattern is detectable, a record indicating that printing is possible, is stored. Thus, the apparatus can resume normal operation.

Also, by storing a history of correction result, such as the number of NG times, it is possible to determine whether correction is possible, based on the number NG.

Figure 20:
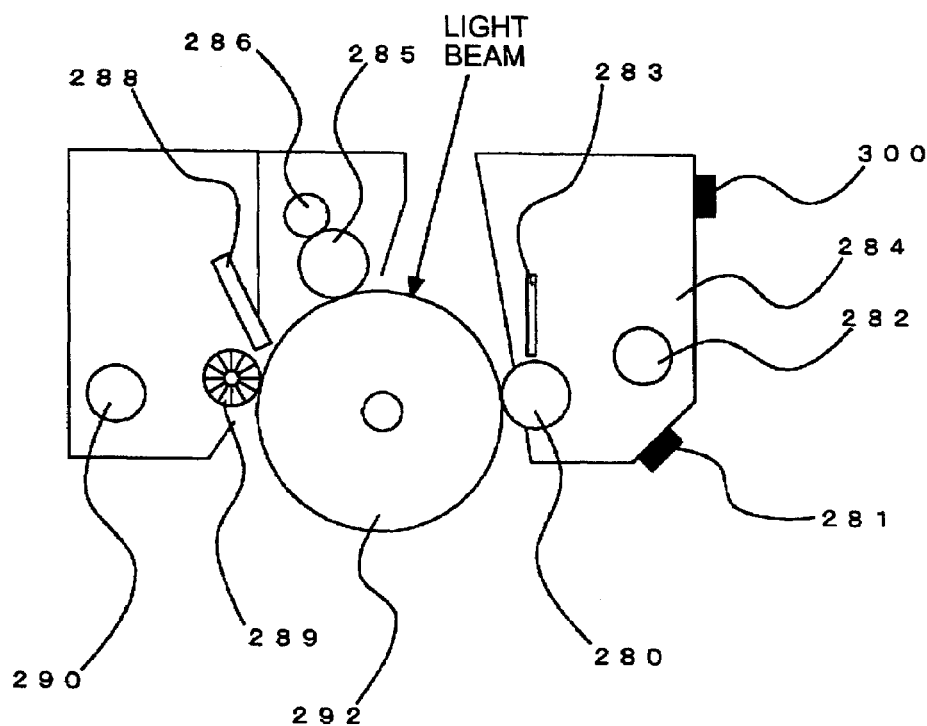
FIG. 20 illustrates a structure of a process cartridge according to an embodiment of the present invention.

Next, a structure of a process cartridge according to an embodiment of the present invention is described with reference to FIG. 20.

In such a process cartridge, the memory 300 is provided to the developing unit 284, for storing the result of image positional displacement correction.

Detection results regarding a color, of which the pattern for image positional displacement correction cannot be detected, are stored in the memory 300 of a corresponding developing unit 284. Thus, if the developing unit 284 has any error, its error record is valid even when the developing unit 284 is mounted on another apparatus.

If the developing unit 284 is replaced by another one, image positional displacement correction is performed again. If the pattern is detectable, a record indicating that printing is possible, is stored. Thus, the apparatus can resume normal operation.

Also, by storing a history of correction result, such as the number of NG times, it is possible to determine whether correction is possible, based on the number NG.

Next, a structure of a process cartridge according to an embodiment of the present invention is described with reference to FIG. 21.

Figure 21:
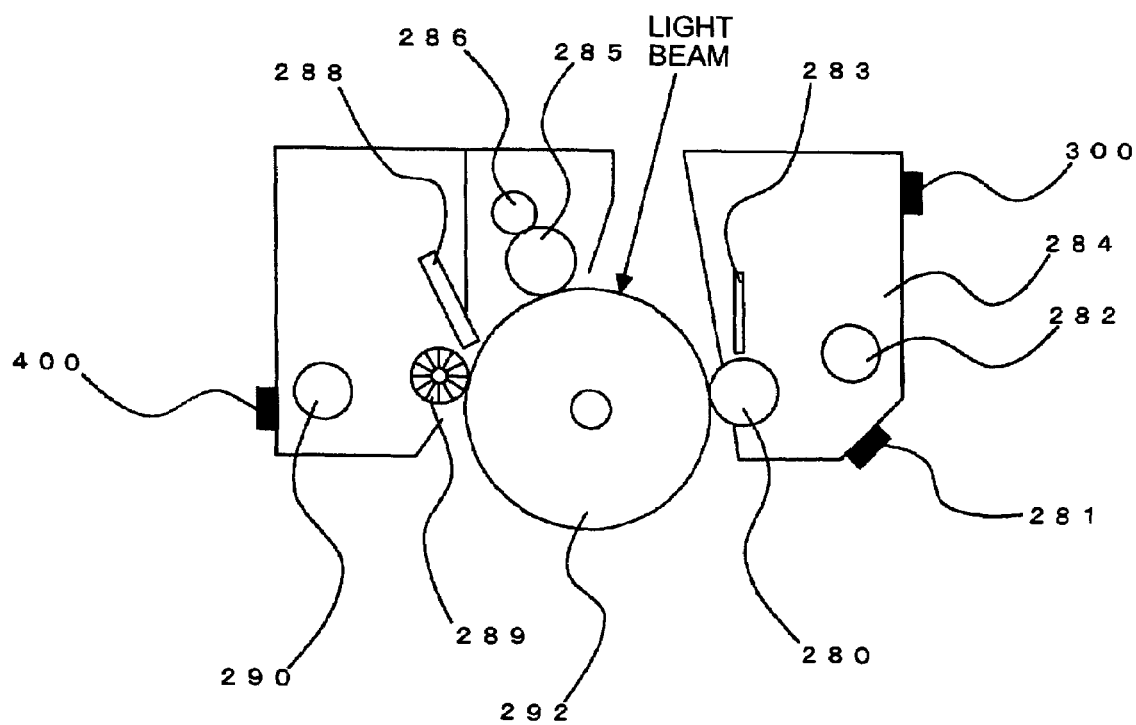
FIG. 21 illustrates a structure of a process cartridge according to an embodiment of the present invention.

In FIG. 21, the memory 300 and the memory 400 are provided to the photosensitive unit and the developing unit, respectively, for storing the result of image positional displacement correction.

Detection results regarding a color, of which the pattern for image positional displacement correction cannot be detected, are stored in corresponding photosensitive unit and developing unit 284. With this, if both of the photosensitive unit and the developing unit 284 have any error, their error record is valid even when they are mounted on another apparatus.

Also, if either one of them has a cause of error, when the photosensitive unit or the developing unit 284 is replaced by another one, image positional displacement correction is performed again. If the pattern is detectable, the replaced unit has a high possibility of generating the NG. If the pattern is yet undetectable, a unit not replaced has a high possibility of causing the NG. If the pattern is detectable by replacing either one or both of the units, a record indicating that printing is possible, is stored. Thus, the apparatus can resume normal operation.

Also, by storing a history of correction result, such as the number of NG times, it is possible to determine whether correction is possible, based on the number NG.

Various embodiments of the present invention are described based on FIGS. 22 to 32. As an example, a color image forming apparatus is applied to a direct-transfer-type full-color laser printer adopting electro-photography.

First, the basic structure of such a color image forming apparatus (color laser printer) is described with reference to FIGS. 22 and 23.

Figure 22:
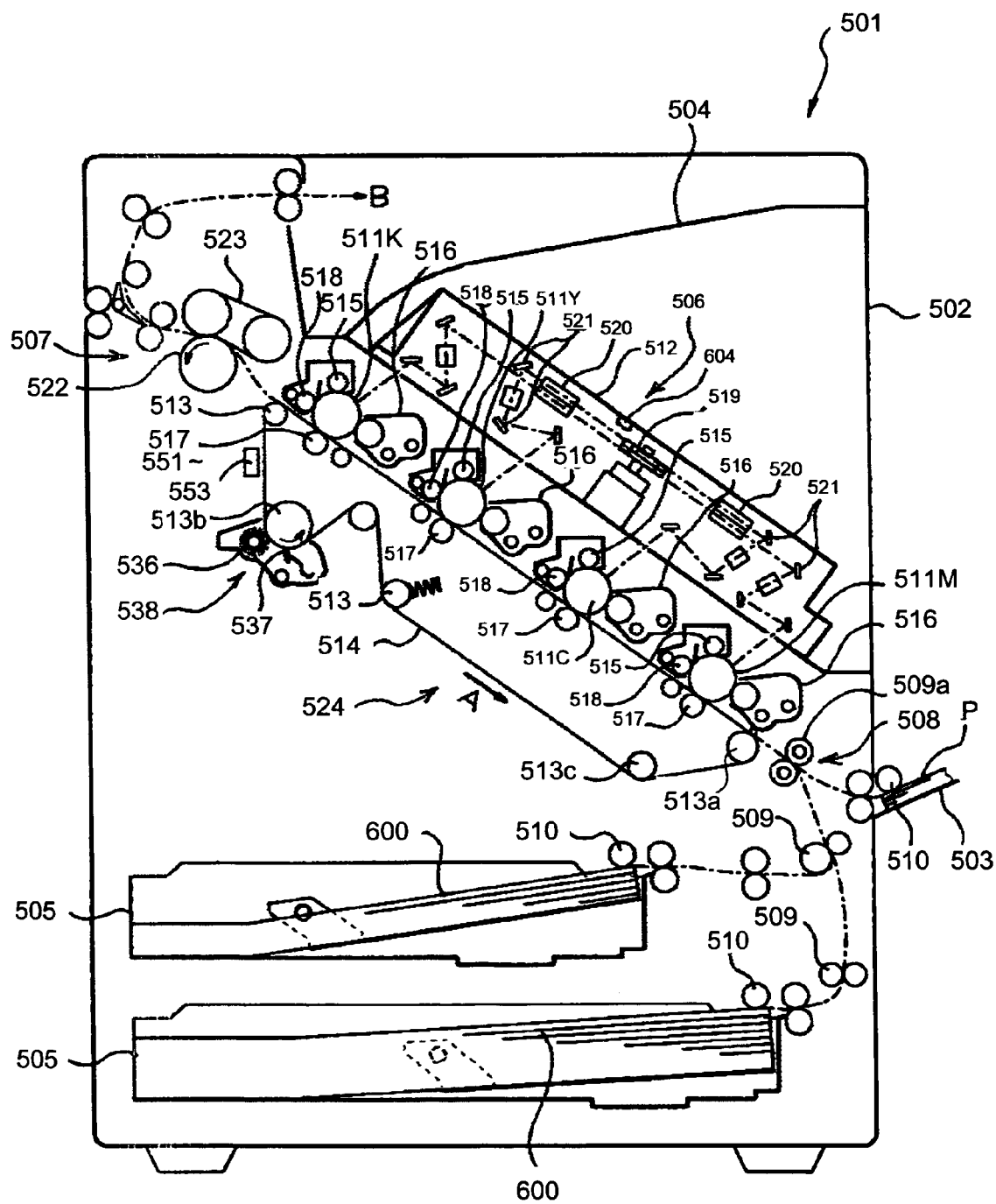
FIG. 22 is a vertical-section side view of a color image forming apparatus (color laser printer) according to an embodiment of the present invention.

FIG. 22 is a vertical-section side view of the color image forming apparatus (color laser printer) according to an embodiment of the present invention. A color laser printer 501 according to the present invention includes a paper feeding tray 503, provided on one side of a printer housing 502, for stacking and holding transfer paper 600 that is a transfer medium. A delivered paper stacker unit 504 is provided on the upper surface of the printer housing 502, to stack the transfer paper 600 after printing. The upper portion of the printer housing 502 includes an operating unit (not shown) that accepts an operation instruction from an operator, and a displaying unit that displays various information (not shown).

The printer housing 502 has incorporated therein, two paper feeding cassettes 505 in which the transfer paper 600 is stacked. Inside the printer housing 502, a transfer paper guiding path 508 is formed, along which the transfer paper 600 supplied from paper feeding cassettes 505 or from the paper feeding tray 503 is guided to an image processing unit 506, a fixing unit 507, and other components, and finally onto the delivered paper stacker unit 504. A plurality of pairs of conveyer rollers 509, provided on the transfer paper guiding path 508, apply a conveyance force to the transfer paper 600. The conveyer rollers 509 are driven for rotation by a conveyor motor (not shown) to convey the transfer paper 600 along the transfer paper guiding path 508 in a desired direction. Of these conveyor rollers 509, resist rollers 509a are disposed at a position on the immediately-upstream side of the image processing unit 506 in a direction of guiding the transfer paper 600 on the transfer paper guiding path 508. Also, a paper feeding mechanism 510 is provided at an entrance of each of the paper feeding cassettes 505 and the paper feeding tray 503. The paper feeding mechanism 510 feeds the transfer paper 600 stacked on any of the paper feeding cassettes 505 or the paper feeding tray 503 to the transfer paper guiding path 508.

The image processing unit 506 includes a plurality of photosensitive members 511 (511M, 511C, 511Y, and 511K) on which a toner image corresponding to any one of magenta (M), cyan (C), yellow (Y), and black (K) is formed. From right to left in FIG. 22, these photosensitive members 511 are disposed in the order of 511M, 511C, 511Y, and 511K. The surface of each of these photosensitive members 511 is scanned for exposure scanning by an optical writing unit 512 at the time of image formation.

A recording-medium conveyer belt 514 abuts on each of the photosensitive members 511M, 511C, 511Y, and 511K. The recording-medium conveyer belt 514 is an endless belt wound around a plurality of rollers 513, and rotatable in one direction. The recording-medium conveyer belt 514 conveys the transfer paper 600 by rotating following the rotation of the rollers 513, and presses the conveyed transfer paper 600 onto each of the photosensitive members 511 (511M, 511C, 511Y, and 511K).

The following components are provided near each of the photosensitive members 511M, 511C, 511Y, and 511K: a charging device 515 that uniformly charges the surface of the corresponding photosensitive member 511; an optical writing unit 512 serving as an exposing device that exposes and scans the corresponding photosensitive member 511, to form a latent image on the surface of the corresponding photosensitive member 511; a developing device 516 that causes toner to adhere to each latent image to form a toner image of a given color; a transfer device 517 that applies a transfer bias via the recording-medium conveyer belt 514, and thereby causes the toner image formed on the surface of the corresponding photosensitive member 511 to be transferred to the transfer paper 600; a cleaner 518 that sweeps charges on the surface of the corresponding photosensitive member 511 to remove residual toner on the surface of corresponding photosensitive member 511, and other components.

Here, the optical writing unit 512 includes a light source that emits a light beam (not shown), a polygon mirror 519, an f-θ lens 520, reflecting mirrors 521, and other components. Based on image data, the optical writing unit 512 scans the surface of the photosensitive members 511M, 511C, 511Y, and 511K, with emitted laser light. Also, a temperature sensor, such as a thermistor 604 is provided at an appropriate position in the optical writing unit 512, to detect the temperature inside the optical writing unit 512 as an environment temperature inside the color laser printer 501.

The fixing unit 507 includes a fixing belt 523 that presses a pressure roller 522. The fixing unit 507 presses and heats the transfer paper 600 passing there through, so that a toner image is fixed to the transfer paper 600.

Figure 23:
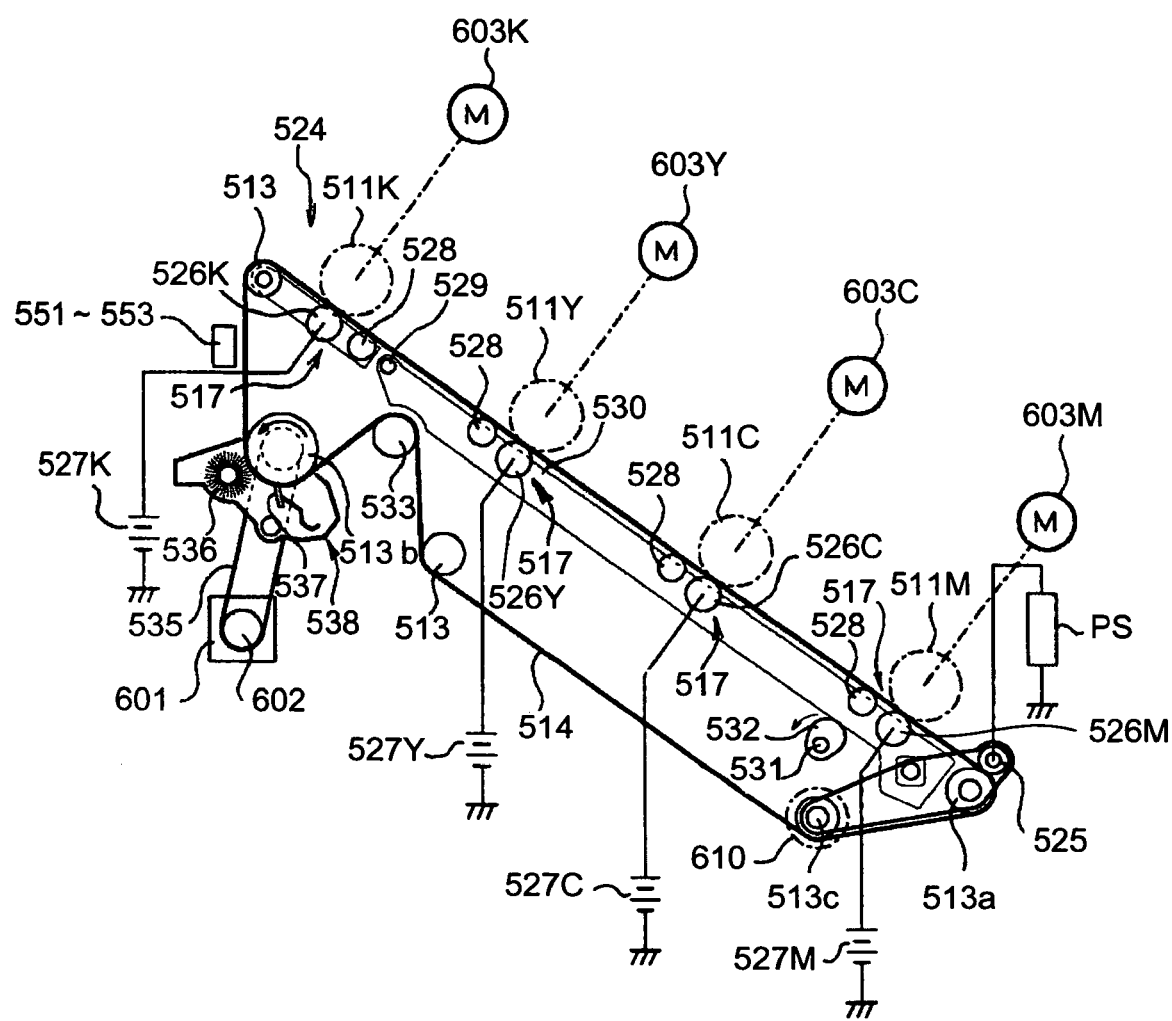
FIG. 23 is an enlarged side view of the general structure of the transfer unit of FIG. 22.

FIG. 23 is an enlarged side view of the general structure of the transfer unit according to an embodiment of the present invention. The transfer unit 524 includes the recording-medium conveyer belt 514 described above, and the rollers 513 that rotatably hold the recording-medium conveyer belt 514. The recording-medium conveyer belt 514 is an endless single-layer belt having a high volume resistivity of $10^9$ Ωcm to $10^{11}$ Ωcm, and is made of e.g., polyvinylidene fluoride (PVDF). The recording-medium conveyer belt 514 is wound around the rollers 513, and passes through each transfer position opposite to and in contact with the photosensitive members 511M, 511C, 511Y, and 511K of the image processing unit 506.

Of these rollers 513, an entrance roller 513a at the upstream side in the conveying direction of the transfer paper 600 is provided with an electrostatic charging roller 525, which is applied with a an appropriate voltage from a power supply PS. The electrostatic charging roller 525 is disposed on the circumferential surface of the recording-medium conveyer belt 514, opposite to the entrance roller 513a. The transfer paper 600 passing between the entrance roller 513a and the electrostatic charging roller 525 is electrostatically attached on the recording-medium conveyer belt 514.

The transfer device 517 forms a transfer electric field at each transfer position. That is, transfer rollers 526M, 526C, 526Y, and 526K serving as transfer bias applying members are disposed at positions opposite to the photosensitive members 511M, 511C, 511Y, and 511K, respectively, so as to make contact with the rear surface of the recording-medium conveyer belt 514. These transfer rollers 526M, 526C, 526Y, and 526K are bias rollers, each provided with a sponge or the like, on its circumference. A transfer bias is applied from transfer bias power supplies 527M, 527C, 527Y, and 527K to roller mandrels of the transfer rollers 526M, 526C, 526Y, and 526K, respectively. By applying the transfer bias, a transfer charge is provided to the recording-medium conveyer belt 514, thereby forming a transfer electric field having a an appropriate strength at each transfer position between the recording-medium conveyer belt 514 and the surface of the corresponding photosensitive member 511. Further, the transfer device 517 is provided with a plurality of back-up rollers 528 to keep an appropriate contact at an area where transfer is performed between the transfer paper 600 and the corresponding photosensitive member 511, and to obtain the best transfer nip. Here, in the photosensitive members 511M, 511C, 511Y, and 511K of FIG. 23, an exposing position for latent image formation and a transfer position on the transfer paper 600 are set at positions 180 degrees out of phase (positions different from each other by exactly half the cycle).

In the transfer device 517, the transfer rollers 526M, 526C and 526Y and the back-up rollers 528 provided near the transfer rollers are integrally rotatably held by a rocking bracket 530 that can freely rotate about a rotational shaft 529. The rocking bracket 530 rocks clockwise, with a cam 532 that is fixed to a cam shaft 531 rotating in direction indicated by an arrow, thereby releasing the abutment of the transfer rollers 526M, 526C, and 526Y to the photosensitive members 511M, 511C, and 511Y, respectively, via the recording-medium conveyer belt 514. Such a mechanism avoids a contact between the photosensitive members 511M, 511C, and 511Y and the recording-medium conveyer belt 514, at the time of image formation only with black.

Here, the recording-medium conveyer belt 514 performs a rotational operation with a driving roller 513b, which is one of the rollers 513 being driven by a stepping motor 601, which is a driving source. As a power transmission structure for this purpose, in FIG. 23, a power transmission belt 535 is wound around a rotational shaft 602 of the stepping motor 601 and a rotational shaft 534 of the driving roller 513b. Further, a pressure roller 533 is provided near the driving roller 513b at the downstream side of the driving roller 513b in the conveying direction of the recording-medium conveyer belt 514. The pressure roller 533 pushes the recording-medium conveyer belt 514 from its circumferential surface. This pressure roller 533 ensures a contact angle of the recording-medium conveyer belt 514 to the driving roller 513b, and increases a friction force of the driving roller 513b to the recording-medium conveyer belt 514.

Furthermore, a cleaning device 538 including a brush roller 536 and a cleaning blade 537, is disposed in contact with the circumferential surface of the recording-medium conveyer belt 514 wound around the driving roller 513b. The cleaning device 538 removes foreign matter attached on the surface of the recording-medium conveyer belt 514.

Stepping motors 603M, 603C, 603Y, and 603K are connected to the photosensitive members 511M, 511C, 511Y, and 511K, respectively, and are driving sources each of which separately drives the corresponding photosensitive member for rotation (refer to FIG. 23).

In such a structure, the transfer paper 600 is fed to the transfer paper guiding path 508 by the paper feeding mechanism 510 from any one of the paper feeding cassettes 505 or the paper feeding tray 503, and is guided by a conveyor guide (not shown) to the conveyer roller 509, and is then temporarily stopped at a temporary stop position, where the resist roller 509a is disposed. Then, the temporarily-stopped transfer paper 600 is sent to the image processing unit 506 at an appropriate timing by the resist roller 509a, carried by the recording-medium conveyer belt 514, and is then conveyed to the photosensitive members 511M, 511C, 511Y, and 511K. During this time, in each of the photosensitive members 511M, 511C, 511Y, and 511K, the charging device 515 performs uniform charging, the optical writing unit 512 forms a latent image of the relevant color, and the developing device 516 forms a toner image by adhering toner to the latent image. Therefore, when the transfer paper 600 reaches a transfer nip between the photosensitive members 511M, 511C, 511Y, and 511K and the transfer rollers 526M, 526C, 526Y, and 526K, respectively, a toner image is transferred to the transfer paper 600 in each transfer nip portion, by applying the transfer electric field and a nip pressure. At this time, toner images of the respective colors formed on the photosensitive members 511M, 511C, 511Y, and 511K, are sequentially overlaid on one another on the transfer paper 600, thereby forming a full-color image on the transfer paper 600.

The surface of each of the photosensitive members 511M, 511C, 511Y, and 511K after the toner image is transferred, is cleaned by the cleaner 518 in preparation for the next latent image formation.

In the color laser printer 501 having the structure as described above, the toner images of the respective colors may not be overlaid on one another at a position where the toner images were supposed to be overlaid, thereby causing a positional displacement among the colors. Such a problem occurs due to, for example, an error in distance between the shafts of the photosensitive members 511M, 511C, 511Y, and 511K, an error in degree of parallelism of the photosensitive members 511M, 511C, 511Y, and 511K, an installation error of various mirrors or the like in the optical writing unit 512, an error in timing of writing a latent image to the photosensitive members 511M, 511C, 511Y, and 511K.

To get around this problem in the color laser printer 501, for the purpose of correcting a positional displacement of the toner images, e.g., three sensors 551, 552, and 553 are disposed near the driving roller 513b (the cleaning device 538) and at the upstream side of the driving roller 513b (the cleaning device 538) in the moving direction of the recording-medium conveyer belt 514, in a direction (main-scanning direction) orthogonal to the moving direction of the recording-medium conveyer belt 514 (sub-scanning direction). These sensors 551, 552, and 553 detect a pattern for positional displacement detection P1 where the toner images formed at the photosensitive members 511M, 511C, 511Y, and 511K of the image processing unit 506 are transferred on the recording-medium conveyer belt 514. The pattern for positional displacement detection P1 detected is used for measuring a skew with respect to the reference color (for example, K (black)), a sub-scanning registration displacement, a main-scanning registration displacement, and a main-scanning scaling error. From the measurement results, various displacement amounts and correction amounts are calculated, thereby allowing correction of each displacement component.

Next, an example of the schematic structure of the control system of the color image forming apparatus (color laser printer) is described with reference to a schematic block diagram shown in FIG. 24 according to an embodiment of the present invention. The control system includes a ROM 611, a RAM 612, and a CPU 613 including a microcomputer. According to a driving control program stored in the ROM 611, the CPU 613 performs a control of the entire color laser printer 501. This control includes a driving control of the stepping motor 601 for the recording-medium conveyer belt 514 and the stepping motors 603M, 603C, 603Y, and 603K for the photosensitive members 511M, 511C, 511Y, and 511K, respectively. The RAM 612 is used as a working area in which, data required for various processes is temporarily stored. Further, various programs are stored in the ROM 611, the programs including a program for calculating various displacement amounts, and a program for at least improving (if not optimizing) image forming conditions.

Input and output devices required for controlling the color laser printer 501, including the stepping motors 601, 603M, 603C, 603Y, and 603K, are connected to one another via an I/O interface 614. The CPU 613, the ROM 611, the RAM 612, and the I/O interface 614 are connected to an address bus 615 for address specification and to a data bus 616 for input and output of data.

Furthermore, the sensors 551, 552, and 553 each include a light-emitting element (not shown) and a light-receiving element (not shown), and are controlled by a light-emission-amount controlling unit 617 connected to the CPU 613 via the I/O interface 614. Also, outputs from the light-receiving elements of the sensors 551, 552, and 553 are coupled to the I/O interface 614 via an amplifier (AMP) 618, a filter 619, and an analog-to-digital (A/D) converter 620, and a first-in first-out (FIFO) memory 621. The AMP 618 amplifies detection signals obtained from the sensors 551, 552, and 553. Then, the filter 619 cuts frequency components larger than a required frequency. Then, the A/D converter 620 performs analog to digital conversion. Data sampling is controlled by a sampling controlling unit 622 connected to the CPU 613 via the I/O interface 614. In FIG. 24, a sampling rate is 100 kilohertz. The sampled data is sequentially stored in the FIFO memory 621.

After the pattern detection is over, the data sequentially stored in the FIFO memory 621 is loaded to the CPU 613 and the RAM 612 via the I/O interface 614. Then, a calculating process for calculating various displacement amounts and a calculating process for at least improving (if not optimizing) the image forming conditions are performed.

The CPU 613 monitors signals from the sensors 551, 552, and 553 at an appropriate timing according to the program stored in the ROM 611. To reliably detect a deterioration, if any, of any of the recording-medium conveyer belt 514 and the light-emitting element of the sensors 551, 552, and 553, the light emission amount is controlled by the light-emission-amount controlling unit 617, so that the level of the light-receiving signal from any of the light-receiving elements of the sensors 551, 552, and 553 is kept constant.

Also, according to the program stored in the ROM 611, to change the main and sub-registration changes, and to correct a skew based on the correction amount calculated from the detection results of the patterns for positional displacement detection P1, and to change the frequency based on the scaling error, the CPU 613 sets a write control substrate 623 connected to the CPU 613 via the I/O interface 614. The write control substrate 623 includes, for each color including the reference color, a clock generator using a device such as a voltage controlled oscillator (VCO) that is capable of setting an output frequency extremely finely. An output from such a device is used as an image clock.

The program for calculating various displacement amounts and the program for at least improving (if not optimizing) the image forming conditions are stored in the ROM 611, and cause the CPU 613 to execute various functions. Out of those functions, featured functions of the color laser printer are described below.

First, a process of detecting a positional displacement at the time of continuous printing is described with reference to a flowchart shown in FIG. 25 according to an embodiment of the present invention. As shown in FIG. 25, at the time of continuous printing, if the number of sheets at continuous printing exceeds a registration executing number of sheets, that is, a reference number of sheets, or if the amount of change in environmental temperature in the color laser printer 501 exceeds a registration effective temperature, which is a reference amount of change, then upon reception of a signal indicating the start of a positional displacement detecting process (Yes at step SS1), the CPU 613 controls each of the photosensitive members 511M, 511C, 511Y, and 511K and each of the transfer rollers 526M, 526C, 526Y, and 526K of the image processing unit 506 and others to form three patterns for positional displacement detection P1 on the recording-medium conveyor belt 514 in its width direction (main-scanning direction) (step SS2).

Each pattern for positional displacement detection P1 is formed on a position opposite to a corresponding sensor 551, 552, and 553 on the recording-medium conveyor belt 514. As shown in FIG. 26 according to an embodiment of the present invention, line marks in parallel with the main-scanning direction (straight-line marks) and line marks inclined with respect to the straight-line marks (oblique-line marks) are formed corresponding to M (magenta), C (cyan), Y (yellow), and K (black).

FIG. 27 is a timing chart of a process of forming the pattern for positional displacement detection P1 during continuous printing according to an embodiment of the present invention. XFGATE_M, XFGATE_C, XFGATE_Y, and XFGATE_K are signals indicating image areas of the respective colors in the sub-scanning direction. Writing is enabled at an L level. At the timing of the L level, image formation is performed on the transfer paper 600. XFGATE of each color is generated with a time difference approximately equal to a pitch between any two of the photosensitive members. Also, as shown in FIG. 27, an interval between any two of the pages indicates a pattern forming section P, during which the pattern for positional displacement detection P1 is formed, and each section of each color has the same length. Therefore, the pattern for positional displacement detection P1 is formed during continuous printing without changing the interval of conveying the transfer paper 600. That is, a timing of forming the pattern for positional displacement detection P1 during continuous printing (execution timing A), is identical to a timing of forming the pattern for positional displacement detection P1 at the time of start, menu selection, etc (execution timing B). In FIG. 27, eight patterns for positional displacement detection P1 are transferred from each of the photosensitive members 511M, 511C, 511Y, and 511K to the recording-medium conveyer belt 514. The eight patterns for positional displacement detection P1 are formed to coincide with a phase of positional fluctuations due to fluctuations in driving rate, such as a belt running speed in the sub-scanning direction, and are formed in consideration with such a phase so that an error at the time of detection is as low as possible. By determining the correction amount from an average of the detection results, a high-quality image with few positional displacements in color can be formed.

After formation of the patterns for positional displacement detection P1 on the recording-medium conveyer belt 514 (step SS2 in FIG. 25), the sensors 551, 552, and 553 detect the patterns for positional displacement detection P1 formed on the recording-medium conveyer belt 514 (step SS3).

The CPU 613 calculates a positional displacement amount based on the detection results of the sensors 551, 552, and 553 (step SS4), and compares the positional displacement amount with a reference positional displacement amount previously stored in the ROM 611 or the RAM 612, to check whether the positional displacement amount is within the range of the reference positional displacement amount (step SS5).

Figure 28:
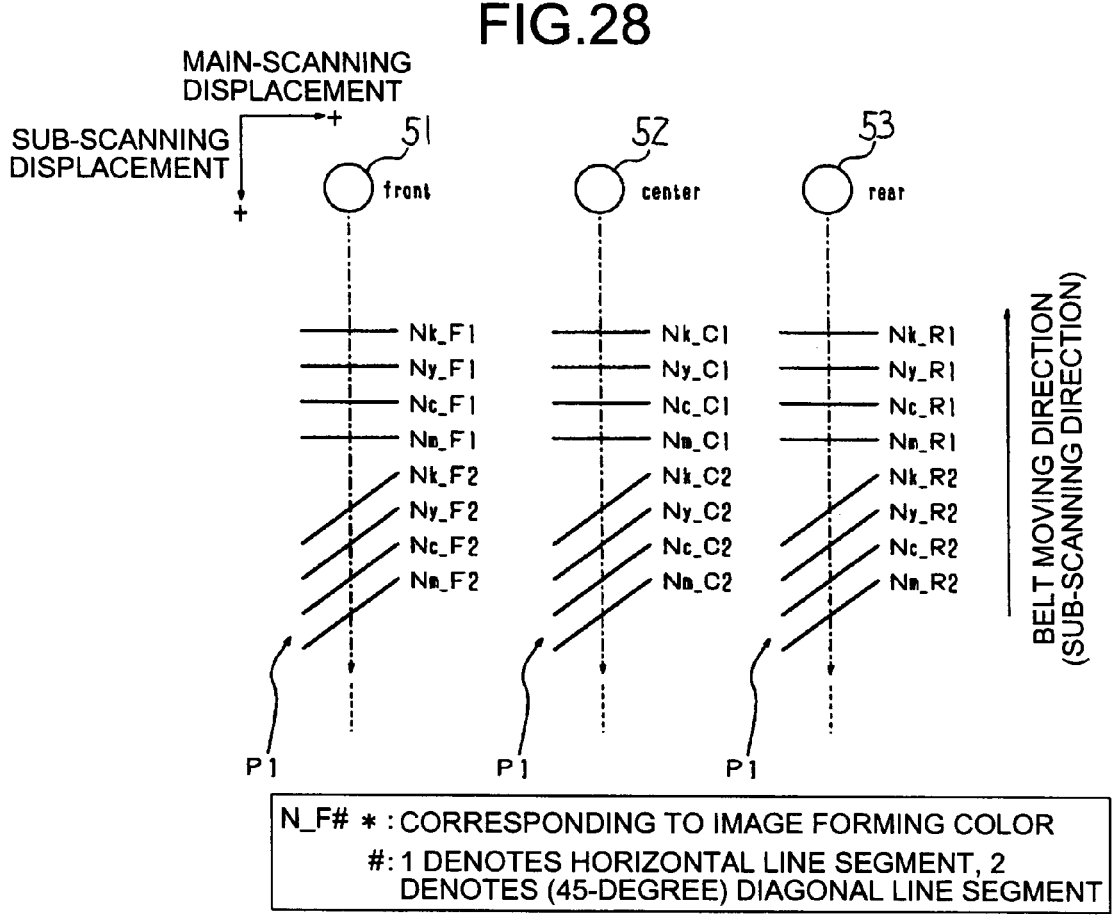
FIG. 28 is a drawing for explaining a relation in placement between each sensor and the pattern for positional displacement detection P1 according to an embodiment of the present invention.

Here, a method of calculating a positional displacement amount and a correction amount of various displacement components is briefly described, because such a method is well known. FIG. 28 is a drawing for explaining a relation in placement between each sensor and the pattern for positional displacement detection P1 according to an embodiment of the present invention.

Figure 29:
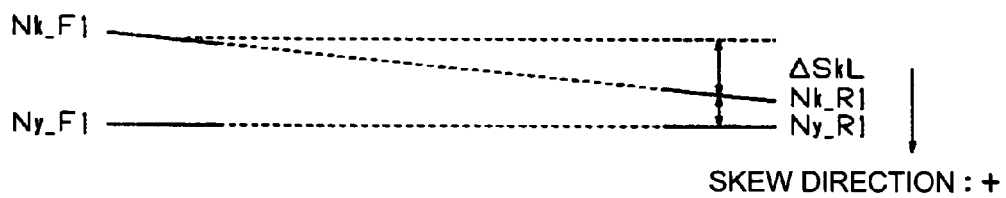
FIG. 29 is a drawing for explaining pattern forming of black with respect to yellow, and a skew concept according to an embodiment of the present invention.
Figure 30:
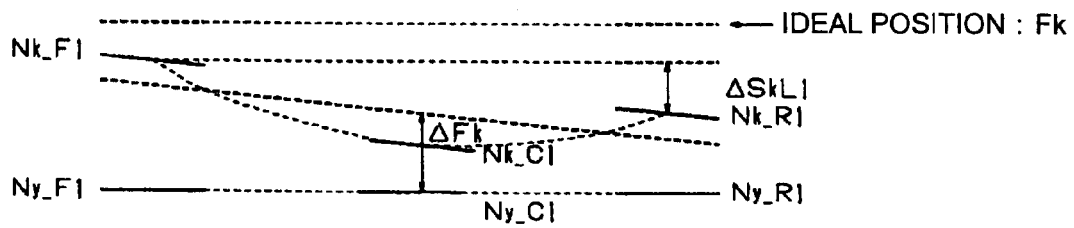
FIG. 30 is a drawing for explaining pattern forming of black with respect to ellow, and a concept of sub-scanning registration displacement according to an embodiment of the present invention.
Figure 31:
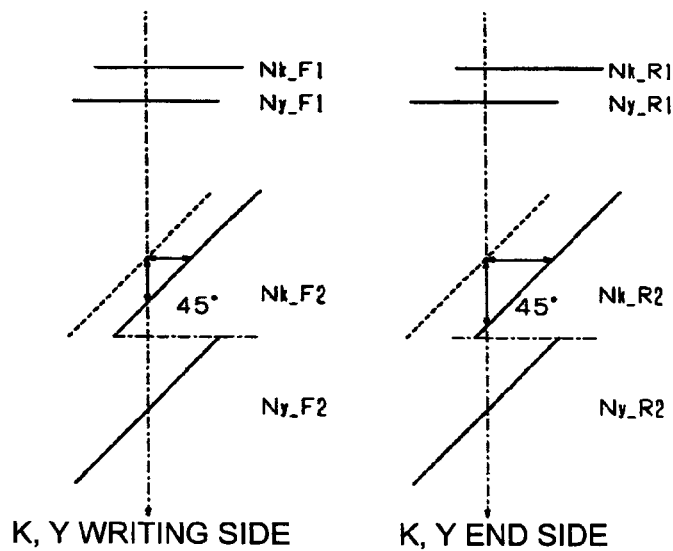
FIG. 31 is a drawing for explaining pattern forming of black with respect to yellow, and a concept of scaling error according to an embodiment of the present invention.
Figure 32:
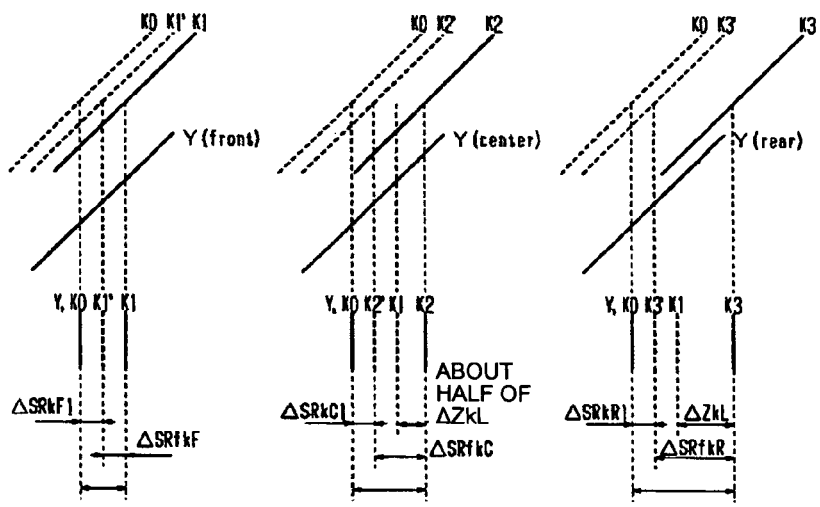
FIG. 32 is a drawing for explaining pattern forming of black with respect to yellow, and a concept of main-scanning registration displacement according to an embodiment of the present invention.

FIG. 29 is a drawing for explaining pattern forming of K (black) with respect to Y (yellow), and a skew concept according to an embodiment of the present invention. As shown in FIG. 29, a skew amount is measured between straight-line segments of the pattern for positional displacement detection P1 corresponding to the relevant color. FIG. 30 is a drawing for explaining pattern forming of K (black) with respect to Y (yellow), and a concept of sub-scanning registration displacement according to an embodiment of the present invention. As shown in FIG. 30, similar to the skew amount, a sub-scanning registration displacement amount is measured between straight-line segments of the pattern for positional displacement detection P1 corresponding to the relevant color. FIG. 31 is a drawing for explaining pattern forming of K (black) with respect to Y (yellow), and a concept of scaling error according to an embodiment of the present invention. As shown in FIG. 31, a deviation of a main-scanning scaling error is measured between patterns of horizontal-line segments and oblique-line segments of the pattern for positional displacement detection P1 corresponding to the relevant color. FIG. 32 is a drawing for explaining pattern forming of K (black) with respect to Y (yellow), and a concept of main-scanning registration displacement according to an embodiment of the present invention. As shown in FIG. 32, a main-scanning registration displacement amount is measured between patterns of oblique-line segments of the pattern for positional displacement detection P1 corresponding to the relevant color.

After determining that the detected positional displacement amount is within the reference positional displacement amount (Yes at step SS5 in FIG. 25), the CPU 613 regards positional displacement correction as being unnecessary, and then performs the subsequent printing process for continuous printing.

On the other hand, after determining that the detected positional displacement amount is outside the reference positional displacement amount (No at step SS5), the CPU 613 calculates a skew displacement amount, a main-scanning registration displacement amount, a main-scanning scaling displacement amount, a sub-scanning registration displacement amount, and a correction amount, changes the setting value of the control signals, such as a write clock and a write timing to each of the photosensitive members 511M, 511C, 511Y, and 511K (step SS6), corrects a positional displacement for each color (step SS7), and then ends the procedure. In the positional displacement correcting process for each color in step SS7, an image is shifted by half of a maximum positional displacement amount detected by each of the sensors 551, 552, and 553 in a direction reverse to the positional displacement direction, thereby allowing correction so that a displacement amount caused by a scaling deviation in the main-scanning direction is made inconspicuous.

After the sensors 551, 552, and 553 complete detection of the patterns for positional displacement detection P1, the cleaning device 538 removes the patterns for positional displacement detection P1.

That is, the sensors 551, 552, and 553 read the patterns for positional displacement detection P1 formed on the recording-medium conveyor belt 514 between sheets of the transfer paper 600 during continuous printing. Based on the reading results, an image displacement amount is calculated for each color, a correction amount for solving the displacement is calculated, and a positional displacement correcting process for each color is performed. Thus, the following are adjusted:

1. a skew displacement caused by varied tilts of the photosensitive members 511M, 511C, 511Y, and 511K in the main-scanning direction;
2. a sub-scanning registration displacement caused by an error in space between shafts of the photosensitive members 511M, 511C, 511Y, and 511K;
3. a main-scanning registration displacement caused by a displacement of an image writing position; and
4. a scaling error deviation displacement caused by a partial error in scaling in the main-scanning direction.

Thus, images can be registered after eliminating a displacement among images of the respective colors. Here, if only the positional displacements stated in 1 to 3 are to be adjusted, then as few as the two sensors 551 and 553 may be used.

Also, the skew displacement is caused by a tilt at the time of replacing the photosensitive member, for example. Therefore, once corrected, the skew displacement is changed little. Therefore, only the sub-scanning registration displacement, the main-scanning registration displacement, and the main-scanning scaling error may be detected for correction.

As described above, while image formation on the transfer paper 600 is continuously being performed, that is, during continuous printing, the patterns for positional displacement detection P1 are formed without changing a conveying interval of the transfer paper 600. Consequently, a paper conveying control and an electro-photographic process control do not have to be separately performed in timing, depending on whether the patterns are being formed. This reduces complexity in control and a positional displacement due to the difference in timing of controls, thereby achieving high image quality.

Also, positional displacements for all colors are collectively detected, thereby at least reducing (if not minimizing) a reduction in productivity as much as possible.

Figure 33:
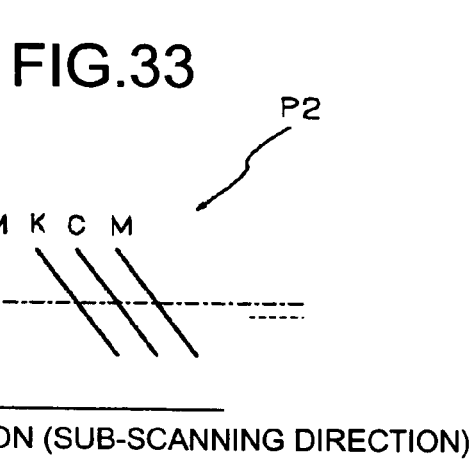
FIG. 33 is a drawing for explaining a pattern for positional displacement detection P2 formed in a process of detecting positional displacement at the time of continuous printing in a color laser printer according to an embodiment of the present invention.
Figure 34:
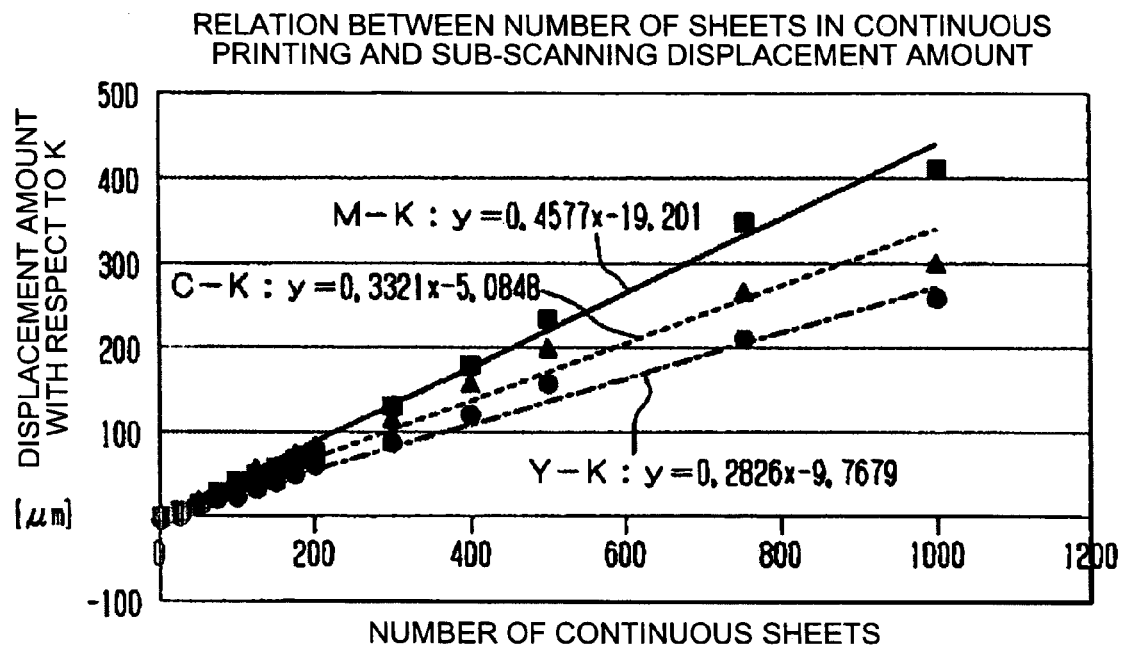
FIG. 34 illustrates characteristics in a relation between a number of sheets in continuous printing and a color displacement amount in a sub-scanning direction according to an embodiment of the present invention.
Figure 35:
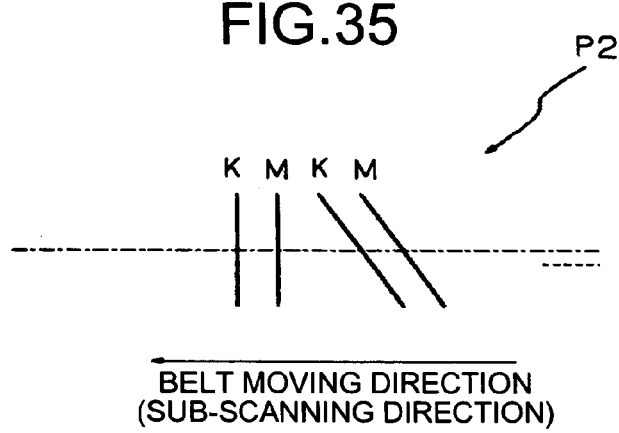
FIG. 35 is a drawing for explaining a modification example of the pattern for positional displacement detection P2 formed in the process of detecting positional displacement at the time of continuous printing according to an embodiment of the present invention.

Various embodiments according to the present invention are described based on FIGS. 33 to 35. Portions identical to those discussed above are provided with the same reference numerals, and are not described herein. In FIGS. 33-35, a pattern for positional displacement detection for use in a positional displacement detecting process at the time of continuous printing is different from that discussed above.

FIG. 33 is a drawing according to an embodiment of the present invention for explaining a pattern for positional displacement detection P2 formed on the recording-medium conveyor belt 514 in a positional displacement detecting process at the time of continuous printing. As shown in FIG. 33, the pattern for positional displacement detection P2 formed in a positional displacement detecting process at the time of continuous printing according to the present embodiment includes line marks in parallel with the main-scanning direction (straight-line marks) and line marks inclined with respect to the straight-line marks (oblique-line marks) with the corresponding one of M (magenta), C (cyan), and K (black). The reason why these three colors of M (magenta), C (cyan), and K (black) are used to form the pattern for positional displacement detection P2 is described below.

FIG. 34 illustrates characteristics in a relation between the number of sheets in continuous printing (for example, in terms of A4-size sheets) and a color displacement amount in a sub-scanning direction according to an embodiment of the present invention. A characteristic M-K represents a color displacement characteristic of magenta M with respect to black K, the reference color. A characteristic C-K represents a color displacement characteristic of cyan C with respect to black K, the reference color. A characteristic Y-K represents a color displacement characteristic of yellow Y with respect to black K, the reference color. Such color displacement amounts in the sub-scanning direction are caused by a combination of various factors, such as influences of positional fluctuations of the f-θ lens 520 and the reflecting mirrors 521 in the optical writing unit 512, for example; speed fluctuations of the recording-medium conveyor belt 514; and extraction and contraction of the printer housing 502 itself. Characteristics indicate that there is a correlation between the number of sheets in continuous printing and the color displacement amount, and that the positional displacement is larger in the order of M–K>C–K>Y–K. Although not shown, a displacement amount caused by fluctuations in environment temperature has a similar tendency. Therefore, in FIG. 34, positional displacement detection is not performed on all colors (MCYK) that are used for forming images. For Y (yellow), whose positional displacement amount is small, formation of a pattern for positional displacement detection, detection of a positional detection amount, and correction of a positional displacement are not performed.

With this, compared to the case where patterns for detection are formed for all colors (MCYK) that are used for forming images, a toner consumption amount for at least Y (yellow) can be suppressed.

As a modification example, formation of a pattern for positional displacement detection, detection of a positional detection amount, and correction of a positional displacement may not be performed also for C (cyan), whose positional displacement amount is the second smallest after Y (yellow). In this case, the pattern for positional displacement detection P2 for use in a positional displacement detecting process includes, as shown in FIG. 35 (according to an embodiment of the present invention), line marks in parallel with the main-scanning direction (straight-line marks) and line marks inclined with respect to the straight-line marks (oblique-line marks) with the corresponding one of two colors, that is, M (magenta) and K (black).

As described above, in FIG. 33, the pattern for positional displacement detection P2 is formed with part of the image forming colors used by the image processing unit 506. For example, because the positional displacement amount of Y (yellow) in the sub-scanning direction is small, if the pattern is formed with image forming colors except Y (yellow), the detection of the positional displacement amount and the correction of the positional displacement are not performed for Y (yellow). Thus, if the pattern is formed with part of the image forming colors used by the image processing unit 506, the pattern can be made small. Therefore, an interval of conveying the transfer paper 600 can be shortened, thereby achieving high-speed image formation. Also, compared with the case where patterns for detection are formed for all colors (MCYK) that are used for forming images, a toner consumption amount for at least Y (yellow) can be suppressed.

Figure 36:
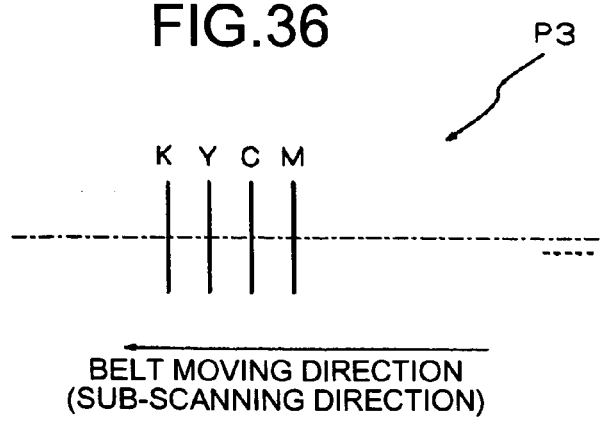
FIG. 36 is a drawing for explaining a pattern for positional displacement detection P3 formed in a process of detecting positional displacement at the time of continuous printing in a color laser printer according to an embodiment of the present invention.

A embodiment according to an embodiment of the present invention is described based on FIG. 36. Portions identical to those discussed above are provided with the same reference numerals, and are not described herein. In FIG. 33, a pattern for positional displacement detection for use in a positional displacement detecting process at the time of continuous printing is different from that according to what is discussed above.

FIG. 36 is a drawing for explaining a pattern for positional displacement detection P3 formed on the recording-medium conveyor belt 514 in a positional displacement detecting process at the time of continuous printing. As shown in FIG. 36, the pattern for positional displacement detection P3 formed in a positional displacement detecting process at the time of continuous printing includes line marks in parallel with the main-scanning direction (straight-line marks) with the corresponding one of M (magenta), C (cyan), Y (yellow), and K (black). The reason why only the line marks in parallel with the main-scanning direction (straight-line marks) are used to form the pattern for positional displacement detection P3 is described below.

Of various positional displacement components from among the skew displacement, the main-scanning registration displacement, the main-scanning scaling displacement, and the sub-scanning registration displacement, the sub-scanning registration displacement is a sudden and large displacement. This is because the lens and the mirror in the optical writing unit 512 are prone to receive influences due to changes in temperature, thereby causing changes in lens reflective index and mirror position. Another reason is that the diameter of the roller 513 that drives the recording-medium conveyor belt 514 changes with temperature, thereby causing a change in conveying speed and also causing a positional displacement. To solve these problems, in FIG. 36, positional displacement detection is not performed on all positional displacement components from among the skew displacement, the main-scanning registration displacement, the main-scanning scaling displacement, and the sub-scanning registration displacement, but only on the sub-scanning registration displacement by using the pattern for detection P3 formed only with the line marks in parallel with the main-scanning direction (straight-line marks), and then positional displacement correction is performed.

With this, the operating process of the CPU 613 during intervals between the transfer paper 600 during continuous printing can be saved without interrupting the printing operation, thereby at least reducing (if not minimizing) a reduction in productivity as much as possible.

As described above, according to FIG. 36, when only the sub-scanning registration displacement amount is detected for positional displacement correction, the pattern for positional displacement detection P3 formed only with the straight-line marks orthogonal to the conveying direction of the transfer medium and in parallel with the main-scanning direction is used. Consequently, the pattern can be made small. Therefore, an interval of conveying the transfer paper 600 can be shortened, thereby achieving high-speed image formation.

Figure 37:
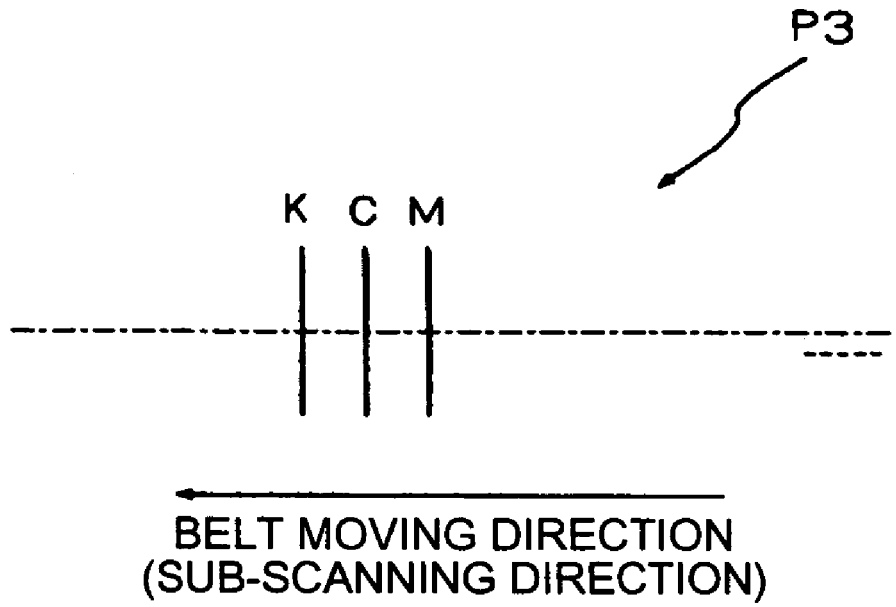
FIG. 37 is a drawing for explaining a modification example of the pattern for positional displacement detection P3 formed in a process of detecting positional displacement at the time of continuous printing according to an embodiment of the present invention.
Figure 38:
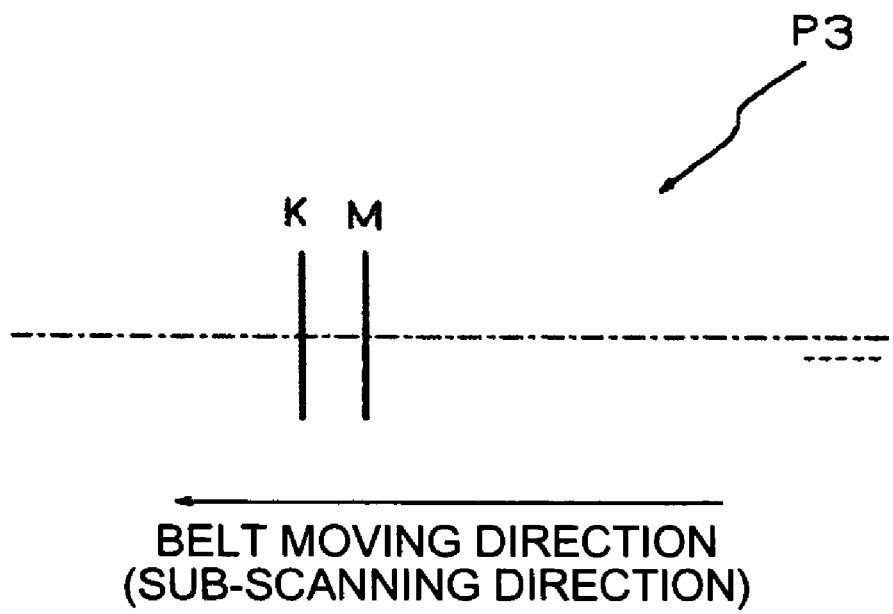
FIG. 38 is a drawing for explaining another modification example of the pattern for positional displacement detection P3 formed in the process of detecting positional displacement at the time of continuous printing according to an embodiment of the present invention.

Also, the pattern for positional displacement detection P3 may be formed with three colors of M (magenta), C (cyan), and K (black) (refer to FIG. 37) or two colors of M (magenta) and K (black) (refer to FIG. 38). Consequently, the pattern can be further made small. Therefore, an interval of conveying the transfer paper 600 can be shortened, thereby achieving high-speed image formation.

Furthermore, although not particularly shown, when positional displacement correction is performed by detecting only the main-scanning registration displacement amount, the pattern for positional displacement detection may be formed to include as little as only oblique-line marks orthogonal to the conveying direction of the transfer paper 600 and inclined with respect to the main-scanning direction.

Various embodiments of the present invention are described based on FIGS. 39 to 44, respectively. Portions identical to those discussed above are provided with the same reference numerals, and are not described herein. In the discussion above, the pattern formed at the pattern forming timing during continuous printing (execution timing A) is identical to the pattern form at the pattern forming timing at the time of start, menu selection, etc (execution timing B). By contrast, in FIGS. 39-44, the pattern formed at the execution timing A is different from the pattern formed at the execution timing B. The pattern formed at the execution timing B is shown in FIG. 26.

Figure 39:
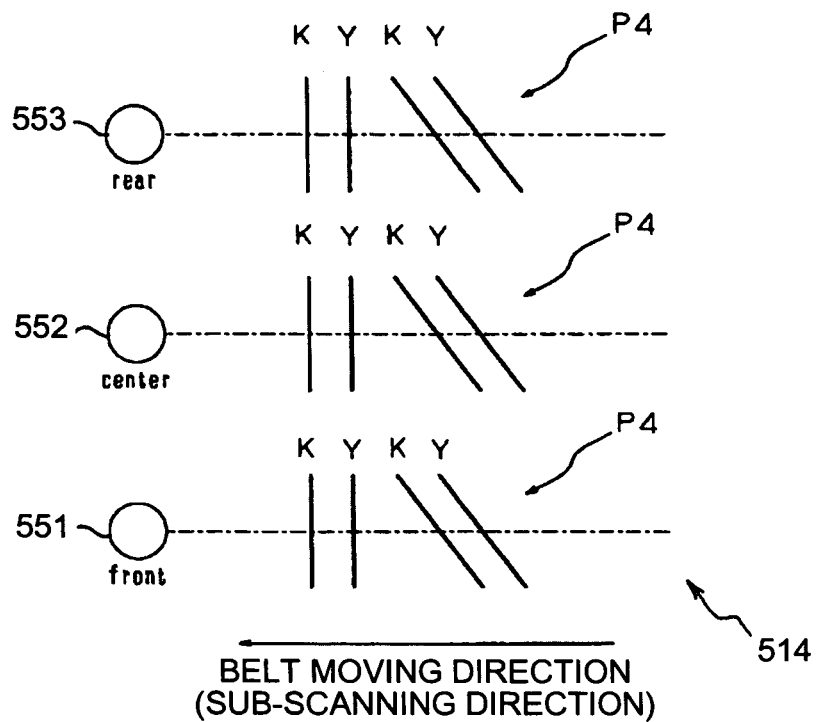
FIG. 39 is a drawing for explaining a pattern for positional displacement detection P4 formed in a process of detecting positional displacement at the time of continuous printing in a color laser printer according to an embodiment of the present invention.
Figure 40:
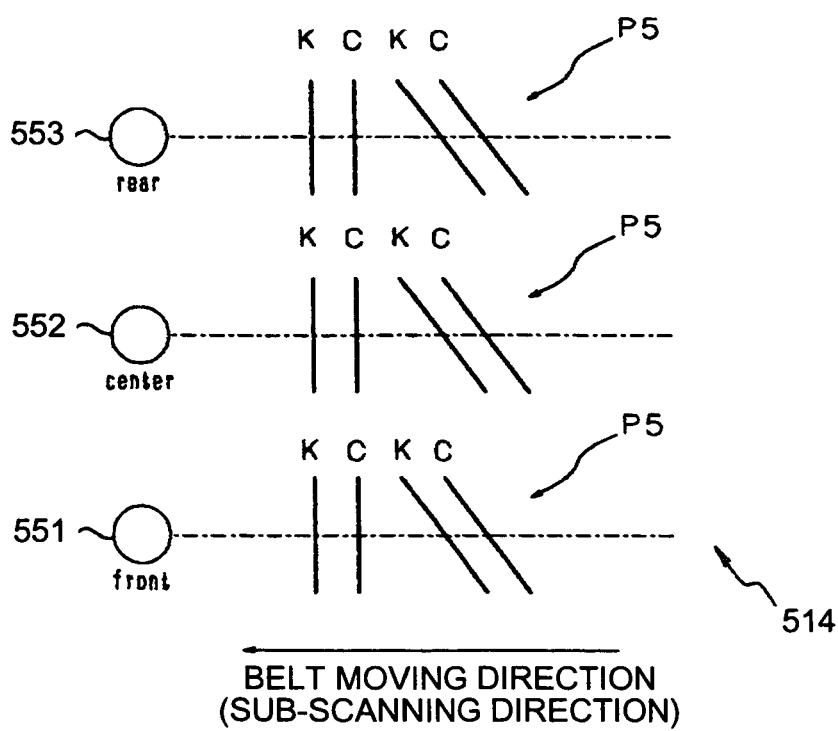
FIG. 40 is a drawing for explaining a pattern for positional displacement detection P5 formed in a process of detecting positional displacement at the time of continuous printing according to an embodiment of the present invention.
Figure 41:
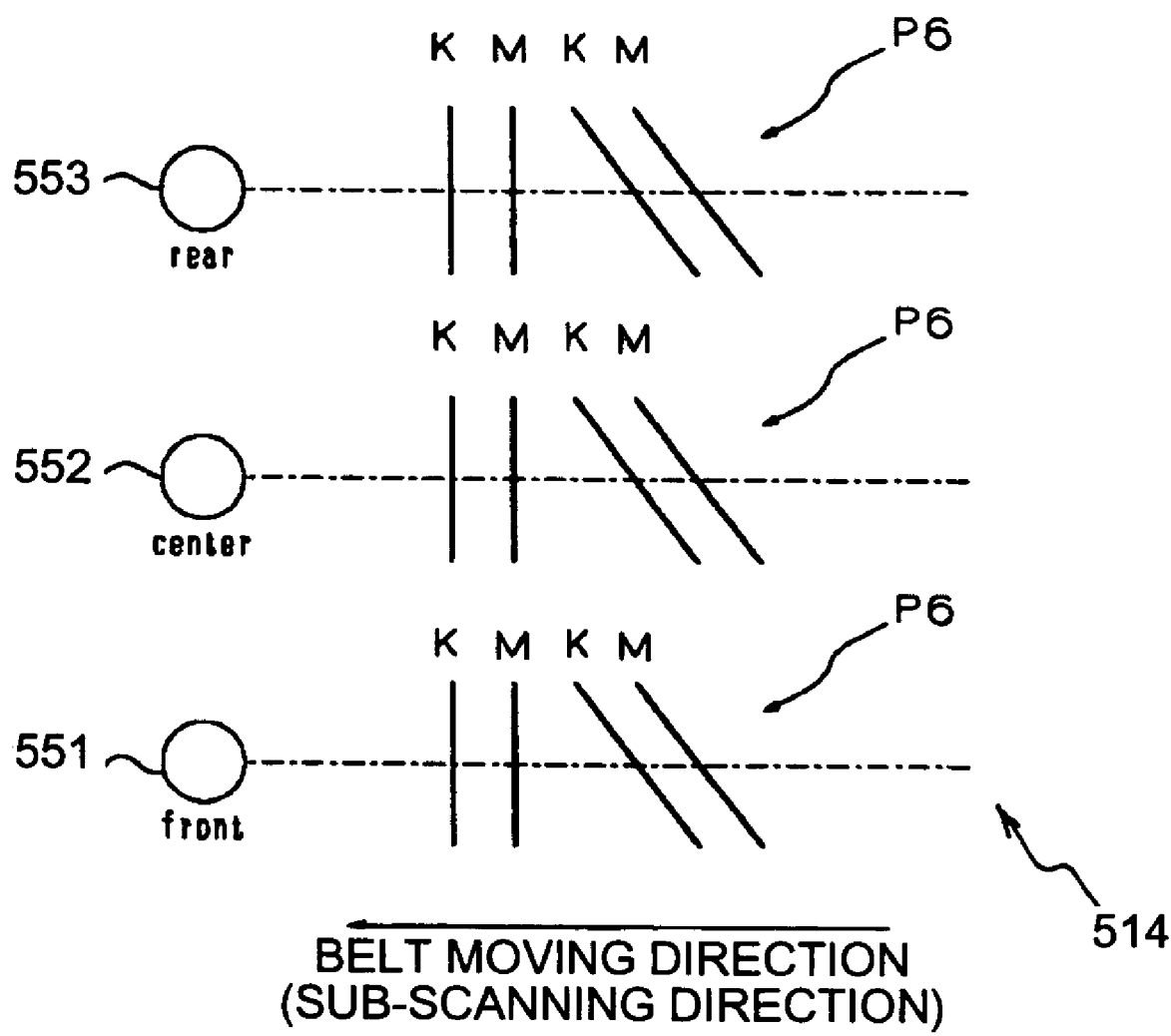
FIG. 41 is a drawing for explaining a pattern for positional displacement detection P6 formed in a process of detecting positional displacement at the time of continuous printing according to an embodiment of the present invention.

FIGS. 39 to 41 are drawings for explaining patterns for positional displacement detection P4 to P6 formed on the recording-medium conveyer belt 514 in a detecting positional displacement process at the time of continuous printing. FIGS. 39 to 41 illustrate examples when the reference color for image formation is K (black). The patterns for positional displacement detection P4 to P6, for use in a detecting positional displacement process at the time of continuous printing, each include line marks in parallel with the main-scanning direction (straight-line marks) and line marks inclined with respect to the straight-line marks (oblique-line marks) with two colors. FIG. 39 illustrates the pattern for positional displacement detection P4 formed with two colors of K (black) and Y (yellow). FIG. 40 illustrates the pattern for positional displacement detection P5 formed with two colors of K (black) and C (cyan). FIG. 41 illustrates the pattern for positional displacement detection P6 formed with two colors of K (black) and M (magenta).

Figure 42:
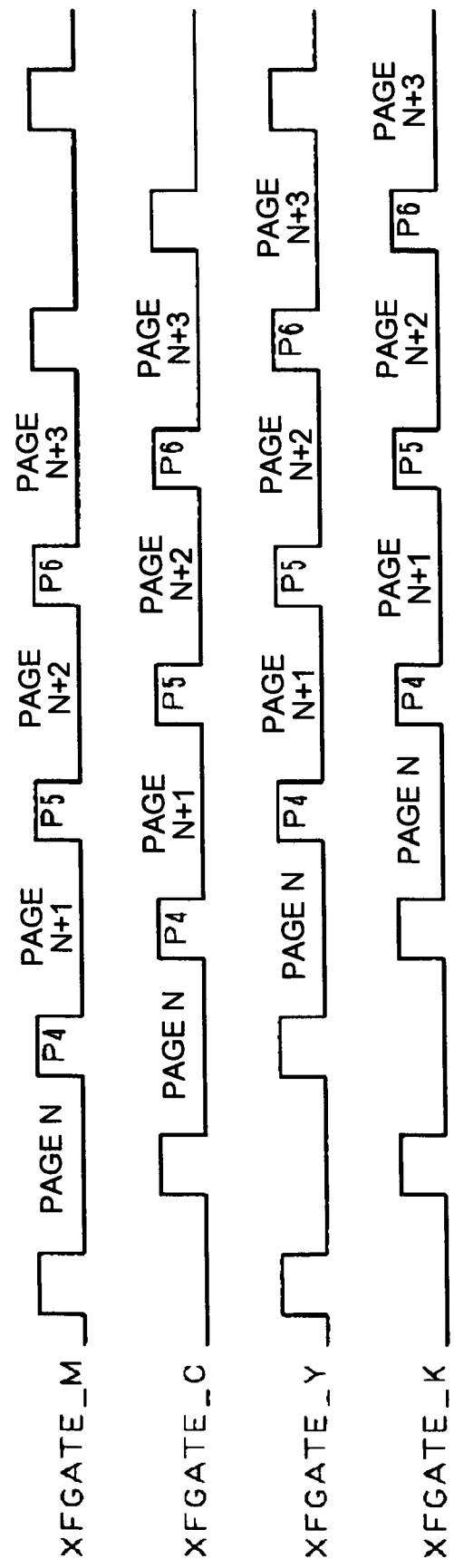
FIG. 42 is a timing chart of a process of forming any of the patterns for positional displacement detection P4 to P6 during continuous printing according to an embodiment of the present invention.

In pattern formation between sheets of the transfer paper 600 according to FIGS. 39-41, any one of the three patterns for positional displacement detection P4 to P6 is first formed. Then, in intervals of three pages, pattern formation for all four colors is completed, which is taken as a set of pattern formation. FIG. 42 is a timing chart of a process of forming any of the patterns for positional displacement detection P4 to P6 during continuous printing according to an embodiment of the present invention. XFGATE_M, XFGATE_C, XFGATE_Y, and XFGATE_K are signals indicating image areas of the respective colors in the sub-scanning direction. Writing is enabled at an L level. At the timing of the L level, image formation is performed on the transfer paper 600. XFGATE of each color is generated with a time difference approximately equal to a pitch between any two of the photosensitive members. Also, as shown in FIG. 42, an interval between any two of the pages indicates a pattern forming section during which any of the pattern for positional displacement detection P4 to P6 is formed, and each section of each color has the same length. Therefore, any of the patterns for positional displacement detection P4 to P6 is formed during continuous printing without changing the interval of conveying the transfer paper 600. Thus, registration with high accuracy is possible without degrading detection accuracy. Also, a reduction in productivity at least can be reduced (if not minimized).

Figure 43:
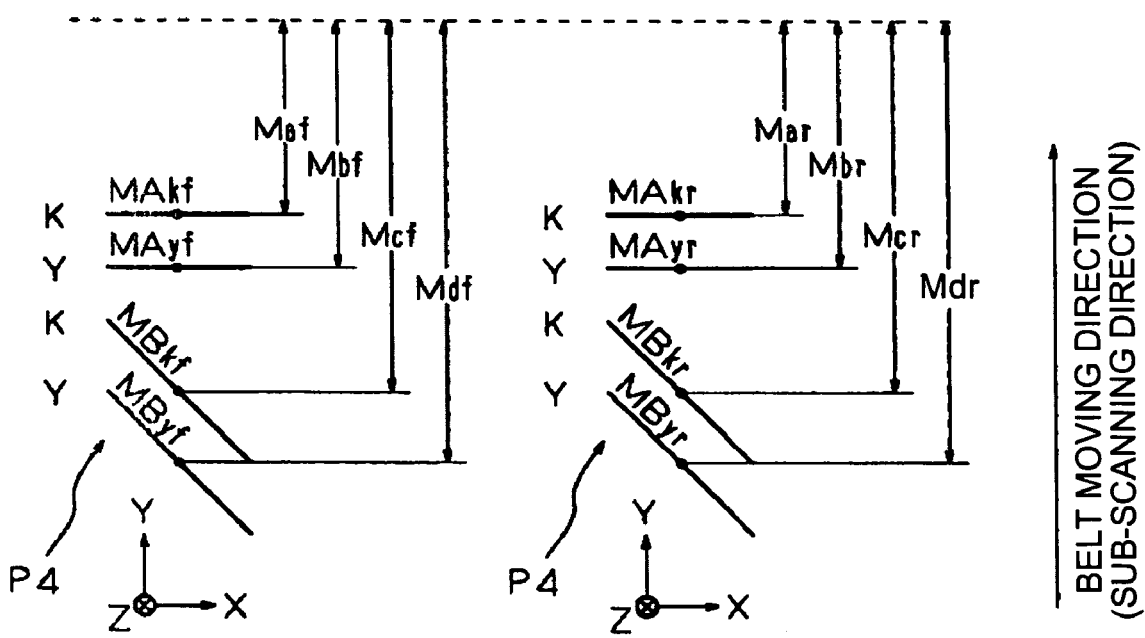
FIG. 43 is a drawing for explaining a scheme of calculating a displacement amount from a reference position in a sub-scanning direction, a displacement amount in a main-scanning direction, a displacement amount of an effective line length, and a skew on a main-scanning line for the formed image of each color according to an embodiment of the present invention.

Next, a method (according to an embodiment of the present invention) of calculating, for each color, a displacement amount dy from a reference position in a sub-scanning direction y (belt moving direction), a displacement amount dx in a main-scanning direction x (belt width direction), a displacement amount dLx of an effective line length of a main-scanning line, and a skew dSq of the main-scanning line is described below with reference to FIG. 43, by taking the pattern for positional displacement detection P4 formed with two colors of K (black) and Y (yellow) shown in FIG. 43 as an example. In FIG. 43, for simplification of description, only two patterns for positional displacement detection P4 are shown, that is, front and rear.

A first mark set of the rear pattern for positional displacement detection P4 includes an orthogonal mark group parallel to the main-scanning direction x (direction of the width of the recording-medium conveyor belt 514) including a first orthogonal mark MAkr with K (black) and a second orthogonal mark MAyr with Y (yellow), and an oblique mark group forming 45 degrees with respect to the main-scanning direction x including a first oblique mark MBkr with K (black) and a second oblique mark MByr with Y (yellow). Patterns formed on other intervals with a combination of other colors have a similar mark set as above. A pattern that is similar to the rear pattern for positional displacement detection P4 is simultaneously formed at front. Of reference characters provided to each mark included in these patterns, a suffix r represents a rear side, while a suffix f represents a front side.

A specific example of calculation of an image formation displacement amount for Y (yellow) with K (black) as a reference color, is described below.

First, a sub-scanning displacement amount (dyy) is described. The sub-scanning displacement amount (dyy) is a displacement amount of a difference (Mbr-Mar) between the center point position of the K-color orthogonal mark MAkr and that of the Y-color orthogonal mark MAyr, at a rear side r with respect to the reference mark d (refer to FIG. 34). That is, the sub-scanning displacement amount is represented by $$dyy=(Mbr-Mar)-d.$$

Next, a main-scanning displacement amount (dxy) is described. The main-scanning displacement amount (dxy) indicates an average value of a displacement amount (dxyr=(Mdr-Mbr)-2d) of a difference (Mdr-Mbr) between the center point position of the Y-color orthogonal mark MAyr and that of the Y-color oblique mark MByr at the rear side r with respect to a reference value 2d and a displacement amount (dxyf=(Mdf-Mbf)-2d) of a difference (Mdf-Mbf) between the center point position of a Y-color orthogonal mark MAyf and that of a Y-color oblique mark MByf at the front side f with respect to the reference value 2d. That is, the main-scanning displacement amount (dxy) is represented by $$dxy = (dxyr + dxyf)/2$$
$$= (Mdr - Mbr + Mdf - Mbf - 4d)/2.$$

Next, a skew (dsqy) is described. The skew (dsqy) indicates a difference between the center point position of the Y-color orthogonal mark MAyr at the rear side r and that of the Y-color orthogonal mark MAyf at the front side. That is, the skew (dsqy) is represented by $$dSqy=(Mbf-Mbr).$$

Finally, a displacement amount of a main-scanning line length (dLxy) is described. The displacement amount of the main-scanning line length (dLxy) indicates a value by subtracting the skew (dSqy=Mbf-Mbr) from a difference (Mdf-Mdr) between the center point position of the Y-color oblique mark MByr at the rear side r and that of the Y-color oblique mark MByf at the front side. That is, the displacement amount of the main-scanning line length (dLxy) is represented by $$dLxy = (Mdf - Mdr) - dSqy$$
$$= (Mdf - Mdr) - (Mbf - Mbr).$$

Other image formation displacement amount for C (cyan) and M (magenta) are calculated in a manner similar to the manner of calculation for Y (yellow) described above. Also, for K (black), a manner generally similar to the manner described above is taken. However, in FIG. 43, color matching in the sub-scanning direction y is performed with K (black) as a reference. Therefore, for K (black), a positional displacement amount dyk in the sub-scanning direction is not calculated.

As described above, relative to FIG. 43, the pattern formed while image formation is continuously being performed on the transfer paper 600 (execution timing A) is different from the pattern formed other than at the time of image formation, such as at the time of start or menu selection (execution timing B). For example, if the pattern formed at the execution timing A is smaller than the pattern formed at the execution timing B, the interval of conveying the transfer paper 600 can be shortened. Thus, high-speed image formation can be achieved.

Also, as shown in FIG. 34, it is evident that there is a correlation between the number of sheets in continuous printing and the color displacement amount, and the positional displacement is larger in the order of M–K>C–K>Y–K. Although not shown, a displacement amount caused by fluctuations in environment temperature has a similar tendency. Here, if the patterns for image positional displacement detection P4 to P6 shown in FIGS. 39 to 41 are formed across three intervals of the transfer paper 600, toner consumption increases. To at least reduce (if not prevent) such problem, as an exemplary embodiment, for Y (yellow), whose positional displacement amount is small, formation of a pattern for positional displacement detection, detection of a positional detection amount, and correction of a positional displacement may not be performed.

Figure 44:
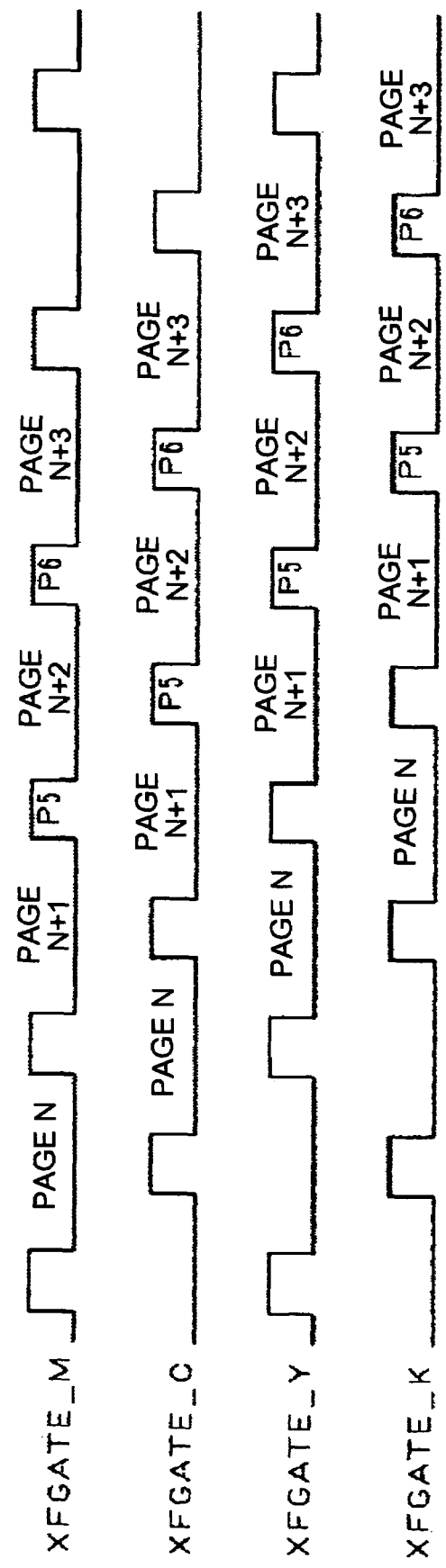
FIG. 44 is a timing chart for forming any of the patterns for positional displacement detection P5 and P6 during continuous printing according to an embodiment of the present invention.

FIG. 44 is a timing chart according to an embodiment of the present invention in which, at the time of pattern formation shown in FIG. 42, formation of a pattern, detection of a positional displacement amount, and correction of a positional displacement are not performed for Y (yellow). In FIG. 42, the pattern for image positional displacement detection P4 for Y (yellow) shown in FIG. 39 is formed during an interval (P4) between a page N and a page N+1. By contrast, in FIG. 44, at that timing, the pattern for image positional displacement detection P4 is not formed during the interval between the page N and the page N+1.

Although not shown, formation of a pattern for positional displacement detection, detection of a positional detection amount, and correction of a positional displacement may not be performed also for C (cyan), whose positional displacement amount is the second smallest after Y (yellow).

Figure 45:
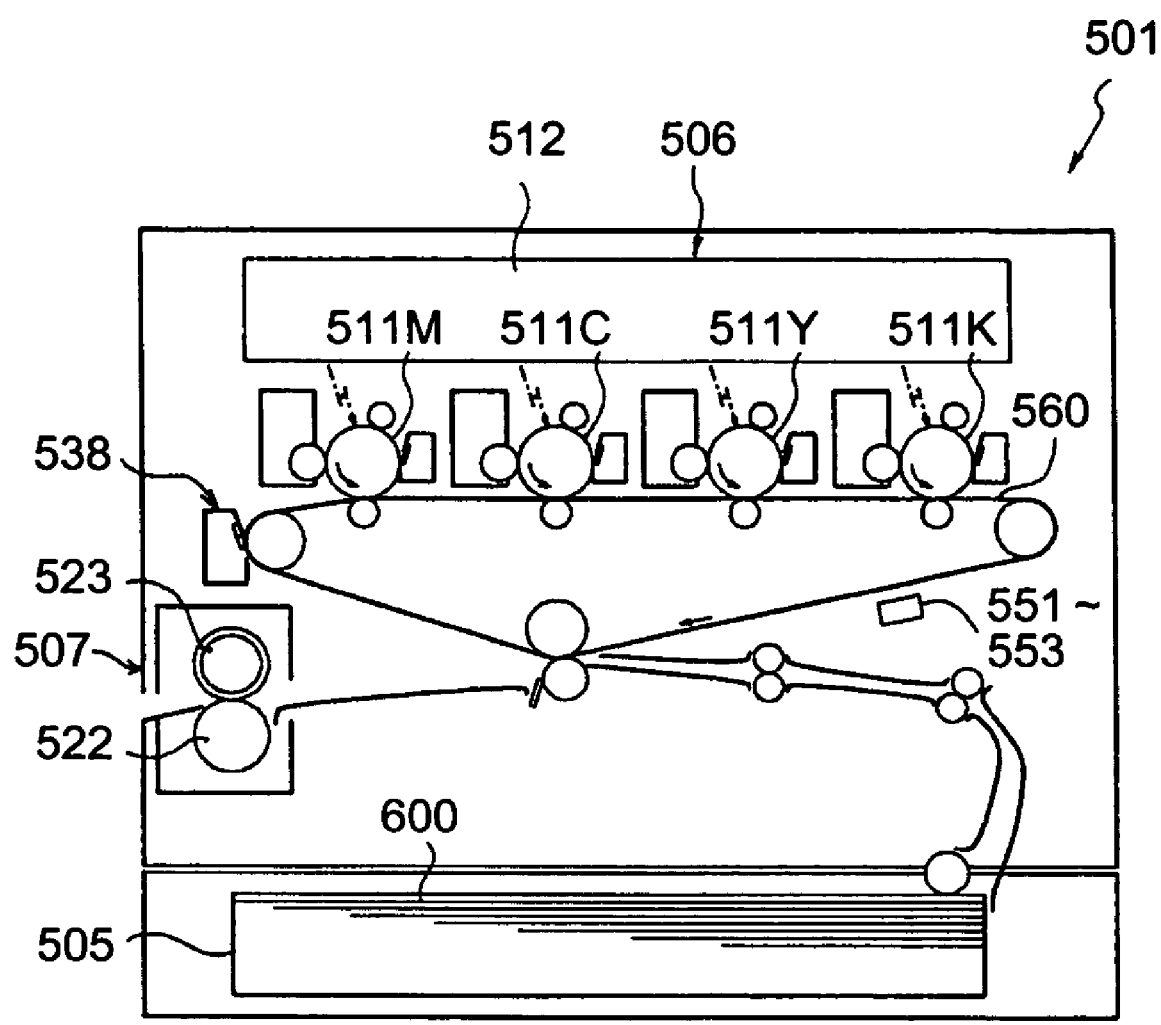
FIG. 45 is a vertical-section side view of an exemplary color image forming apparatus (color laser printer) including an intermediate transfer belt according to an embodiment of the present invention.

In FIG. 44, an example set of circumstances has been described, where a pattern for image positional displacement detection is formed on the recording-medium conveyer belt 514 that conveys the transfer paper 600. However, this is not meant to be restrictive. For example, as shown in FIG. 45 (according to an embodiment of the present invention), a pattern for image positional displacement detection may be formed on the intermediate transfer belt 560, which is an intermediate transfer member, during continuous printing, and then be detected by the sensors 551 to 553. That is, while image formation is continuously being performed on the transfer sheet 600, a pattern for image positional displacement detection is formed on the intermediate transfer belt 560 positioned between each sheet of the transfer paper 600 and each of the transfer color images, without changing an interval of the transfer paper 600 continuously conveyed to a transfer position on the intermediate transfer belt 560. Also, the intermediate transfer member is not restricted to the intermediate transfer belt 560, but may be, for example, a transfer drum, an intermediate transfer drum, or an intermediate transfer roller.

Figure 46:
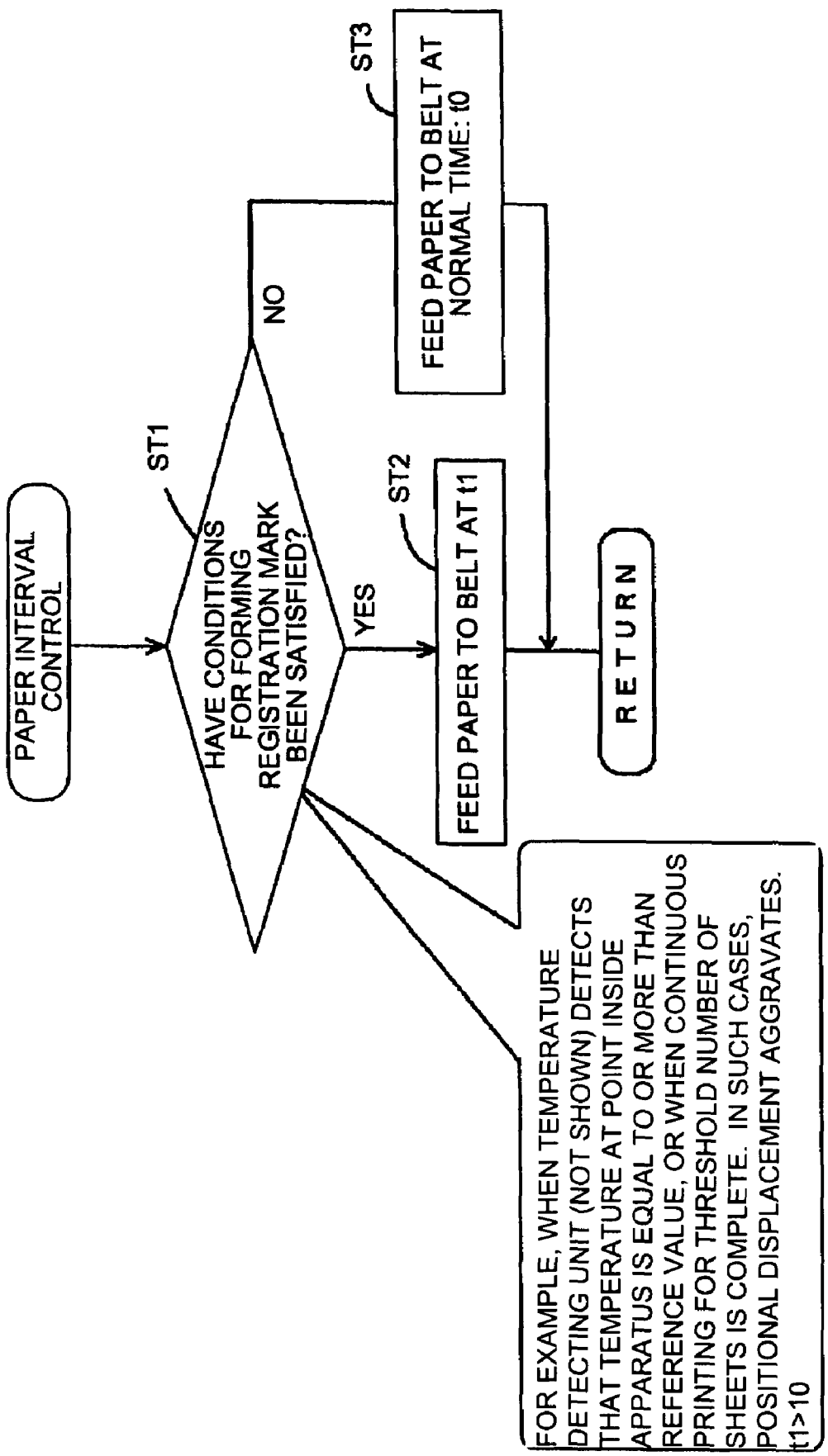
FIG. 46 is a flowchart of a color image forming method according to an embodiment of the present invention.
Figure 47:
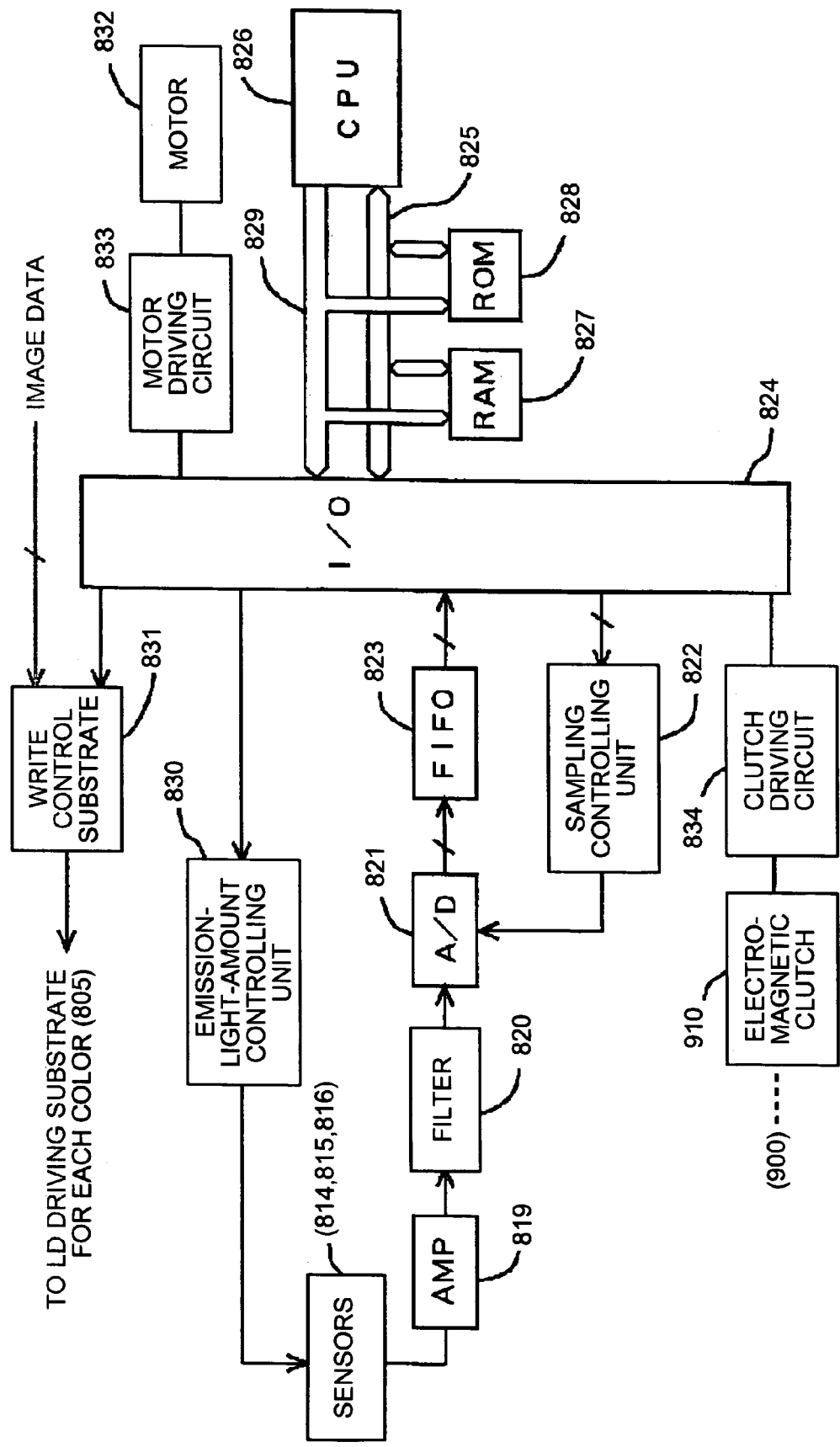
FIG. 47 is a block diagram of a color image forming apparatus to which the color image forming method according to an embodiment of the present invention.

FIG. 46 is a flowchart of a color image forming method according to an embodiment of the present invention. FIG. 47 is a block diagram of a color image forming apparatus according to an embodiment of the present invention to which such a color image forming method is applied.

In FIG. 47, a CPU 826, a RAM 827, a ROM 828, and an Input/Output (I/O) port 824 are connected to one another via bus lines 825 and 829. The I/O port 824 has connected thereto a motor driving circuit 833 that controls a motor 832 that drives a driving roller 803 for rotation, a write control substrate 831 that drives LD driving substrate for each color 805, a clutch driving circuit 834, an emission-light-amount controlling unit 830, a First-In First-Out memory (FIFO) 823, and a sampling controlling unit 822.

The CPU 826 performs centralized control over the color image forming apparatus, and may be implemented by a microcomputer.

The write control substrate 831 is supplied with image data and also a control signal from the I/O port 824. Based on these image data and control signal, each not-yet-fixed color image forming unit forms a not-yet-fixed color image.

A sensor 814 (815, 816) connected to the emission-light-amount controlling unit 830 includes a light-emitting unit (for example, a light-emitting diode) and a light-receiving unit (for example, a phototransistor). The emission-light-amount controlling unit 830 controls an amount of the emission light emitted from the light-emitting unit. The light-receiving unit of the sensor 814 (815, 816) is connected to an amplifier (AMP) 819. The amplifier (AMP) 819 is connected to a filter 820, an analog-to-digital converter (A/D) 821, and the FIFO memory 823. An output from the sampling controlling unit 822 is coupled to the A/D 821.

Next, the function of each member of the color image forming apparatus shown in FIG. 47 is described.

The sensor 814 (815, 816) converts reflected light of light radiated to a toner mark row for positional displacement detection (a mark row for positional displacement detection or a mark row) formed on the conveyer belt (or transfer belt, for example) 802, to an electrical signal. In the color image forming apparatus body, at least one sensor for positional displacement detection 814 (815, 816) is provided in a direction orthogonal to a conveying direction of the conveyer belt 802, which serves as a conveying member, to detect and calculate a positional displacement amount of the mark for positional displacement detection, thereby correcting the position of the not-yet-fixed color image.

Here, for example, a calculating process is one such as that disclosed in any one of Japanese Patent Laid-Open Publication No. 11-65208, Japanese Patent Laid-Open Publication No. 2002-160398, and Japanese Patent Laid-Open Publication No. 2002-207337. The amplifier AMP 819 amplifies the signal obtained by the sensor 814 (815, 816). Then, the filter (low-pass filter) 820 cuts frequency components larger than a required frequency (for example, several hundred hertz).

The A/D 821 converts the signal from analog data to digital data. Data sampling is controlled by the sampling controlling unit 822 (in FIG. 47, a sampling rate is 100 kilohertz, for example). The sampled data is sequentially stored in the FIFO memory 823. Here, the structure with only one sensor 814 is described. The structure with other sensors 815 and 816 is identical to the structure described above, and is therefore omitted.

After detection of patterns of the mark row for positional displacement detection 817 is complete, the data stored in the ROM 828 is loaded to the CPU 826 and the RAM 827, via the I/O port 824 through the data bus line 825. Then, the CPU 826 calculates various displacement amounts and a calculating process for at least improving (if not optimizing) the image forming conditions.

On the other hand, in the ROM 828, various programs are stored, the programs including a program for calculating various displacement amounts and a program for at least improving (if not optimizing) image forming conditions.

Here, a ROM address, a RAM address, and various input and output devices are specified with the address bus line 829. Also, the CPU 826 monitors a detection signal from the detection sensor 814 (815, 816) at an appropriate timing. The emission-light-amount controlling unit 830 controls the emission light amount to ensure detection, even if deterioration in the conveyer belt 802 (refer to FIG. 53) or the light-emitting unit of the sensor 814 (815, 816) occurs, so that the level of the light-receiving signal from the light-receiving unit is kept constant.

The CPU 826 sets the write control substrate 831 to change the main and sub-registration and correct a skew based on the correction amount calculated from the detection results of the pattern of the mark row for positional displacement detection 817, and to change each frequency based on the scaling error. For each color including the reference color, the write control substrate 831 is previously provided with a clock generator or the like using a device capable of extremely finely setting an output frequency, such as a voltage controlled oscillator (VCO). An output from such a device is used as an image clock.

The color image forming apparatus of FIG. 47 has a feature of detecting a positional displacement with high accuracy even during continuous printing.

Figure 53:
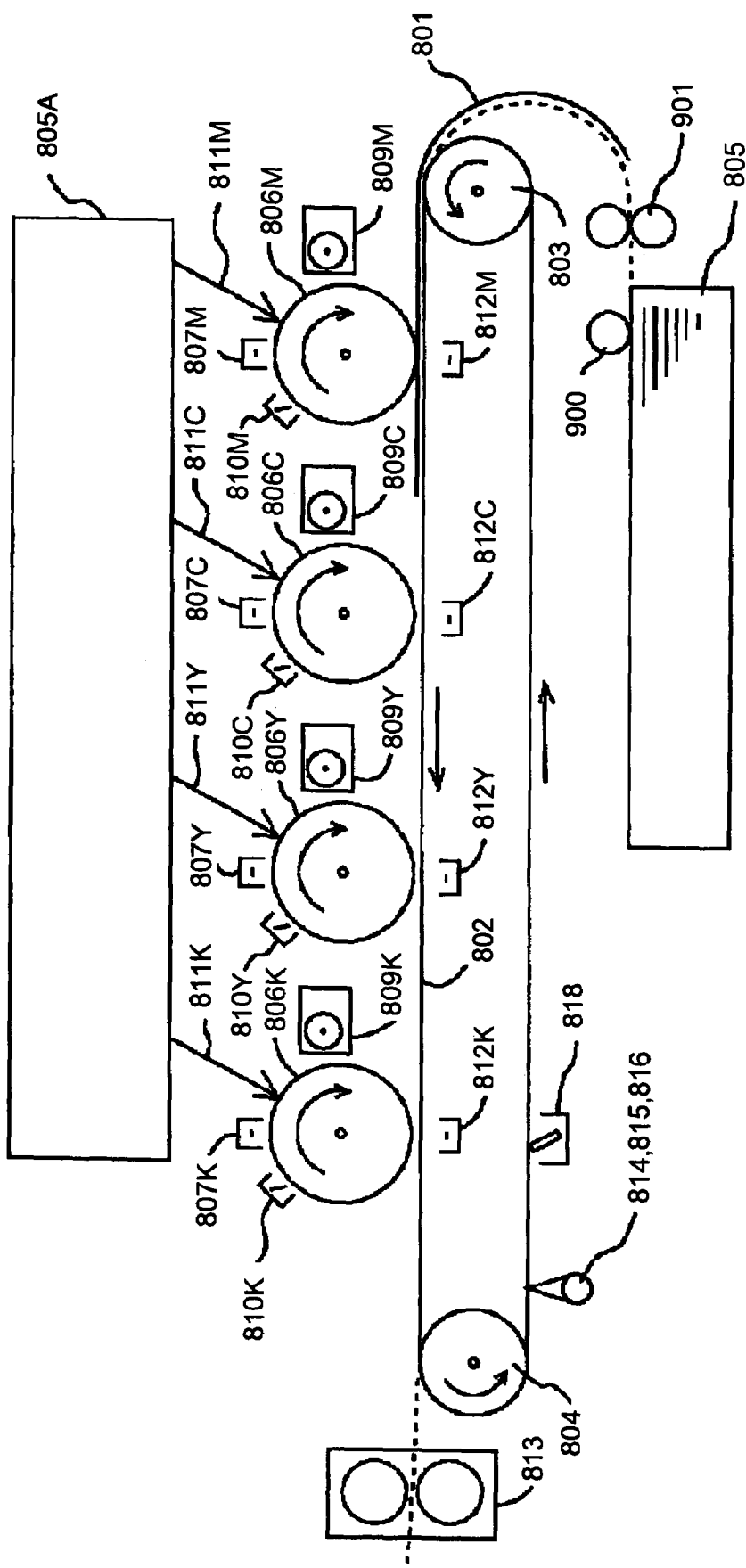
FIG. 53 illustrates a structure of a tandem-type color image forming apparatus in which image forming units are aligned along a conveyor belt according to an embodiment of the present invention.

First, each of the photosensitive drums 806M, 806C, 806Y, and 806K are charged, while being rotated, by the charging units 807M, 807C, 807Y, and 807K (see FIG. 53). With exposure from the laser light source 805A to each of the charged photosensitive drums 806M, 806C, 806Y, and 806K, a latent image is formed on each of the photosensitive drums 806M, 806C, 806Y, and 806K. The latent image is developed by the corresponding one of the developing units 809M, 809C, 809Y, and 809K to form a not-yet-fixed color image. The not-yet-fixed color images are sequentially transferred by the transfer units 812M, 812C, 812Y, and 812K to be overlaid on a sheet of transfer paper 801. After being conveyed by the conveyer belt 802 to the fixing unit 813, the not-yet-fixed color images are fixed by the fixing unit 813 to form a color image on the transfer paper 801. Upon transfer of the not-yet-fixed color images from the photosensitive drums 806M, 806C, 806Y, and 806K to the transfer sheet 801, the photosensitive cleaners 810M, 810C, 810Y, and 810K remove residual toner from the photosensitive drums 806M, 806C, 806Y, and 806K, respectively, and then the next latent image is formed.

This is a normal operation of forming a color image.

Here, the conveyer belt 802 as a conveying unit, conveys the transfer paper 801. For intermediate transfer, an intermediate transfer member is provided, and the not-yet-fixed color images of the respective colors are first overlaid on the intermediate transfer member, and then are collectively transferred.

Next, formation and detection of the mark row for positional displacement detection 817 are described with reference to FIG. 54 according to an embodiment of the present invention.

When the mark row for positional displacement detection 817 is formed in the conveying direction of the conveyer belt 802, an interval (paper interval) of the transfer paper 801 has to be widened by the length of the mark row for positional displacement detection 817 in the conveying direction. The mark row for positional displacement detection 817 is formed and detected, and positional displacement is corrected, after a color image has been formed on a threshold number of sheets (for example, 5000 sheets) or upon instruction from the user in circumstances such as when a component is replaced. Thus, when an instruction for positional displacement correction is input to the CPU 826, the CPU 826 pauses conveyance of the transfer paper 801 on the conveyer belt 802, for the length of the mark row for positional displacement detection 817. While waiting of the transfer sheet 801, the CPU 826 also causes a latent image of the mark row for positional displacement detection 817 to be formed on each of the photosensitive drums 806M, 806C, 806Y, and 806K. The mark row for positional displacement detection 817 is stored in advance in the ROM 828. Each latent image is developed by the corresponding one of the developing units 809M, 809C, 809Y, and 809K, as described above, and is then directly transferred to the conveyer belt 802 by the corresponding one of the transfer units 812M, 812C, 812Y, and 812K. However, unlike the color images, the patterns of the mark row for positional displacement detection 817 are formed so as not to be overlaid one another. The sensors 814, 815, and 816 read the mark rows for positional displacement detection 817 transferred on the conveyer belt 802. Based on signals from the sensors 814, 815, and 816, the CPU 826 performs positional correction. The cleaning unit 810 removes the mark row for positional displacement detection 817. After positional displacement correction, the apparatus returns to a normal operation of forming a color image.

A color image forming method is explained next, with reference to a flowchart in FIG. 46. When a paper interval control starts, the CPU 826 determines whether conditions for forming a registration mark (mark row for positional displacement detection) have been satisfied (step ST1). If it is determined that the conditions have been satisfied (Yes at step ST1), the paper feeding roller 900 and the paired resist rollers 901 (see FIG. 53) are driven to feed a sheet of paper (transfer paper 801) to the conveyer belt 802 at a time t1 (step ST2). If it is determined that the conditions have not yet been satisfied (No at step ST1), the transfer paper 801 is fed to the conveyer belt 802 at a normal time t0 (t1>t0) (step ST3).

Here, the color image forming apparatus has at least two execution timings A and B regarding registration control. The execution timing A is a timing when the color image forming apparatus automatically performs correction after having formed images upon a reference number of print sheets (mode A). The executing timing B is a timing of performing correction upon instruction from the user (mode B). The mode A is a mode for correction during continuous printing.

An arrangement for correction includes an interval adjusting unit that makes the conveying interval of the transfer paper 801 larger than an interval during normal printing, and narrower than the elapse of time corresponding to traversal of the circumference of each of the photosensitive drums 806M, 806C, 806Y, and 806K, a mark row forming unit that forms the mark row for positional displacement detection 817 in an extra area made by widening on the conveyer belt 802 (or the intermediate transfer member), a registration sensor that detects the mark row, and a controlling unit that performs positional displacement correction of the not-yet-fixed color images through calculation based on an output from the sensor.

The conveyer interval adjusting unit includes the CPU 826, the electromagnetic clutch 910, the paper feeding roller 900, and the paired resist rollers 901. The conveyer interval adjusting unit may be controlled by a paper feeding control disclosed in, for example, Japanese Patent Laid-Open Publication No. 2000-305337. The mark row forming unit includes the not-yet-fixed color image forming units, the conveyer belt 802, the CPU 826, and the ROM 828. The controlling unit includes the CPU 826.

The conveying unit includes the loop-shaped conveyer belt 802 that conveys the transfer paper 801 so that the not-yet-fixed image is transferred in proximity to each of the not-yet-fixed color image forming units, and a rotational driving unit that drives the conveyer belt 802 for rotation. The rotational driving unit includes the driving roller 803 (refer to FIG. 47), the motor 832, and a motor driving circuit 833.

The intermediate transfer member includes a loop-shaped transfer belt (not shown) onto which the not-yet-fixed color images and marks from the not-yet-fixed color image forming units are transferred, and a rotational driving unit (not shown) that drives the transfer belt for rotation.

Alternatively, the intermediate transfer member may include a transfer drum onto which the not-yet-fixed color images and marks from the not-yet-fixed color image forming units are transferred, and a rotating unit (not shown) that rotates the transfer drum.

As described above, the mark row forming unit also serves as the not-yet-fixed color image forming unit to form a not-yet-fixed pattern of the mark row during an interval of forming a not-yet-fixed pattern. The controlling unit delays a timing of forming the not-yet-fixed color image, so that the not-yet-fixed color image forming unit can form a mark. The conveying interval adjusting unit delays a timing of conveying the transfer paper by the length of the mark row in the conveying direction, and is implemented by the CPU 826.

The length of the mark row for positional displacement detection in the conveying direction of the transfer paper 801 is can be a length allowing positional displacement detection with high accuracy (for example, a length of eight sets of four straight lines and four oblique lines).

In the above structure, during continuous printing with reference page intervals, a page interval (paper interval) of the transfer paper 801 is made wider than a page interval during a normal printing operation, and the mark row for positional displacement detection is formed during the extended time of the page interval and then detected. With this, the mark row for positional displacement detection extending along the conveying direction can be formed. Thus, a positional displacement can be detected with high accuracy, thereby achieving high image quality.

Figure 48:
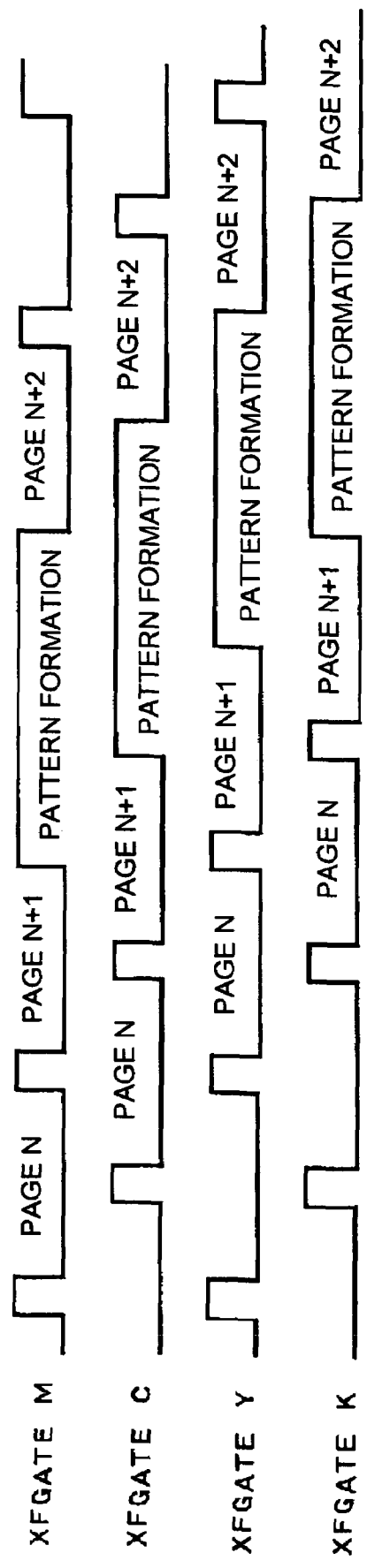
FIG. 48 is a timing chart of forming a pattern of mark rows for positional displacement detection during continuous printing according to an embodiment of the present invention.

FIG. 48 is a timing chart of forming a pattern of mark rows for positional displacement detection during continuous printing according to an embodiment of the present invention. In the drawing, the horizontal axis represents time, while the vertical axis represents a gate signal voltage.

The gate signals XFGATE_M, XFGATE_C, XFGATE_Y, and XFGATE_K indicate image areas of the respective colors in the sub-scanning direction. Upon reception of the corresponding one of these gate signals XFGATE_M, XFGATE_C, XFGATE_Y, and XFGATE_K, the not-yet-fixed color image forming unit forms an image (transfers a not-yet-fixed image) on the transfer paper when the relevant signal is at an L level. The gate signals XFGATE of the respective colors are sent form the CPU 826 via the bus lines 825 and 829, and the I/O port 824 to the write control substrate 831 (see FIG. 47). Each of the not-yet-fixed color image forming units connected to the write control substrate 831 forms a not-yet-fixed color image with a time difference approximately equal to a pitch between any two of the photosensitive members (the length of the circumference of the photosensitive member). Also, the electromagnetic clutch 910 is operated in synchronization with any one of the gate signals, thereby feeding the transfer paper 801. Here, the timing of L levels of the gate signals XFGATE are shifted in the order of M, C, Y, and then K, because the not-yet-fixed color image forming units are positioned in the order of M, C, Y, and then K.

In FIG. 48, a paper interval between a page N+1 and a page N+2 is made wider than the interval during a normal printing operation, and the mark row for positional displacement detection is formed during the widened interval, at the time of an L level. The patterns of the formed mark row for positional displacement detection pass above the sensors 814, 815, and 816 fixed inside the color image forming apparatus and are detected. An example is explained with reference to FIG. 54. When the sensor 814 detects in the pattern of the mark row for positional displacement detection 817, that a straight line of K in a first set and a straight line of K in a second set (not shown) are positionally displaced, then a positional displacement in the sub-scanning direction (in a direction of an arrow 890) has been detected. Moreover, when the sensor 814 detects in the pattern of the mark row for positional displacement detection 817, that an oblique line of K in a first set and an oblique line of K in a second set (not shown) are positionally displaced, then a positional displacement in the main-scanning direction (in a direction orthogonal to the direction of the arrow 890) has been detected (the execution timing A).

An embodiment according to the present invention is described next with reference to FIG. 54. The eighteenth embodiment has a feature of detecting a positional displacement with high accuracy even during continuous printing. The basic structure is similar to that according to what is described above, and therefore only different portions are described herein. Such an embodiment is different then what is described above in that the color image forming apparatus automatically performs correction after having formed images upon a reference number of print sheets, or upon instruction from the user.

That is, when the color image forming apparatus performs correction, irrespective of automatic correction by the apparatus itself (execution timing A), or correction upon instruction from the user (execution timing B), the mark row including the same pattern is used for performing correction at the timing shown in FIG. 48. Therefore, a positional displacement can be corrected with high accuracy, and high image quality can be achieved. This is because the mark row allowing detection with high accuracy has a long length in the conveying direction, and therefore the paper conveying interval has to be extended.

Here, the pattern of the mark row for positional displacement detection formed at the execution timing A is identical to the pattern of the mark row for positional displacement detection formed at the execution timing B. That is, the pattern is as described with reference to FIG. 54. Therefore, registration can be made with high accuracy without degrading detection accuracy. Also, because positional displacement detection is performed for all colors at one time, the number of times of extending the paper interval can be reduced, thereby at least reducing (if not minimizing) a reduction in productivity as much as possible.

Another embodiment of the present invention is described next. It has a feature in which the mark row has all image forming colors. The basic structure is similar to that according to FIG. 46. In such an embodiment, the mark has all image forming colors, and positional displacement detection is performed for all image forming colors at one time in the widened paper interval. Therefore, the paper interval needs to be extended only once, thereby at least reducing (if not minimizing) a reduction in productivity related to a correcting process, as much as possible.

Another embodiment of the present invention is described next. It has a feature in which the mark row has two colors for two of the not-yet-fixed color image forming units located farthest away from each other. If the mark row is formed with the patterns of a color with a large positional displacement and also a color with a small positional displacement, correction has to be performed for the pattern of the color with a large positional displacement, thereby consuming and wasting too much toner. To get around this problem, the mark row is formed to have two colors for two of the not-yet-fixed color image forming units located farthest away from each other, thereby at least reducing (if not preventing) formation of the mark row with a color having a small positional displacement. This makes it possible at least to reduce (if not minimize) toner consumption.

Another embodiment of the present invention is described next. It has a feature in which the mark row has two colors for two of the not-yet-fixed color image forming units, which form not-yet-fixed color images with a large positional displacement, out of combinations of not-yet-fixed color images. Thus, forming the mark row with a color having a small positional displacement is at least reduced (if not prevented). This makes it possible at least to reduce (if not minimize) toner consumption.

Figure 49:
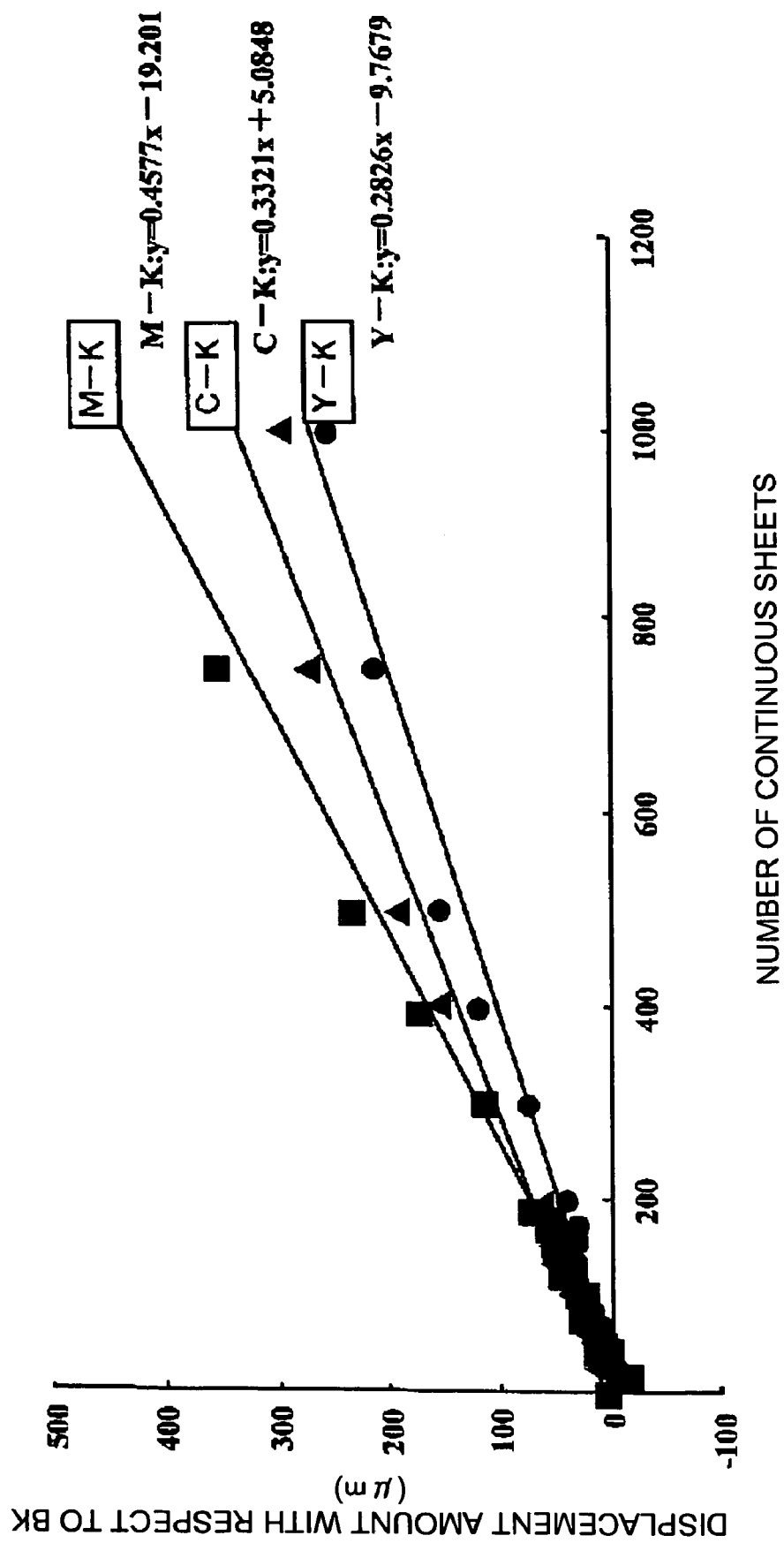
FIG. 49 illustrates a relation between a number of sheets in continuous printing and a displacement amount in a sub-scanning direction, with respect to black according to an embodiment of the present invention.

FIG. 49 illustrates a relation between the number of sheets in continuous printing and a displacement amount in a sub-scanning direction, with respect to BK according to an embodiment of the present invention. In the drawing, the horizontal axis represents the number of continuous sheets (the number of print sheets), while the vertical axis represents the displacement amount with respect to BK.

As is evident from the drawing, the positional displacement is larger in the order of M–K (magenta with respect to black)>C–K (cyan with respect to black)>Y–K (yellow with respect to black). Also, a displacement amount caused by fluctuations in environment temperature has a similar tendency. Here, if the pattern as shown in FIG. 54 is formed for all colors, toner consumption increases. To get around this problem, the positional displacement of Y may be neglected, and pattern formation, detection, and correction may not be performed for Y, because Y has a small displacement amount. Furthermore, positional displacement for C may be neglected. In other words, formation and detection of the mark for positional displacement detection and correction may be performed only for part of colors with a large displacement.

Another embodiment of the present invention is described next. It has a feature in which at least any one of components causing a positional displacement is detected. The mark row is used to detect at least any one of a main-scanning registration component, a main-scanning scaling error component, a sub-scanning registration component, a skew component. Thus, it is possible to form a pattern allowing detection of a displacement component, which is to be detected in the interval of transfer paper, thereby achieving high image quality.

Next, another embodiment of the present invention is described. It has a feature in which only the main-scanning scaling error component is detected with the mark row. Thus, only a component with a large positional displacement fluctuation is detected, thereby reducing a calculation processing load. With the reduction in calculation, a reduction in productivity at least can reduced (if not minimized).

Here, two preceding embodiments, of various positional displacement components, fluctuations in main-scanning scaling are abrupt and large. This is because the lens and the mirror in the exposing unit 808 are prone to receive influences due to changes in temperature, thereby causing changes in lens reflective index and mirror position. To avoid this, only the scaling displacement is detected with the pattern formed during the paper-conveying interval. Thus, the computation of the CPU to be performed during the paper-conveying interval can be saved, and interruptions in the printing operation can at least be reduced (if not prevented). Thus, a reduction in productivity at least can be reduced (if not minimized).

Another embodiment of the present invention is described next. It has a feature in which only the sub-scanning registration component is detected with the mark row. With this, the computation can be saved, and a reduction in productivity at least can be reduced (if not minimized).

Here, in the two preceding embodiments, of various positional displacement components, a fluctuation in sub-scanning registration is abrupt and large. This is because the lens and the mirror in the exposing unit 808 are prone to receive influences due to changes in temperature, thereby causing changes in lens reflective index and mirror position. Another reason is that the diameter of the driving roller 804 that drives the recording-medium conveyor belt 802 changes with temperature, thereby causing a change in conveying speed and also causing a positional displacement. To avoid this, only the sub-scanning registration displacement is detected with the pattern formed on the paper interval. Thus, in the pattern shown in FIG. 54, detection can be made only with straight lines. Thus, the computation of the CPU to be performed on the paper interval can be saved, and interruptions in the printing operation at least can be reduced (if not prevented). Thus, a reduction in productivity at least can be reduced (if not minimized).

Another embodiment of the present invention is described next. It has a feature in which the main-scanning registration component, the main-scanning scaling error component, and the sub-scanning registration component are detected with the mark row. That is, the skew component, which is rarely present in practice, is not detected, and therefore computation can be saved.

Also, in such an embodiment, of various positional displacement components, a fluctuation in skew displacement is small. This is because a skew displacement is caused, once after being corrected, by a tilt at the time of replacing the photosensitive member, for example. Therefore, only the main-scanning registration displacement, the main-scanning scaling error, and the sub-scanning registration displacement are detected for correction. That is, displacement components other than skew displacement are all detectable and correctable, thereby achieving high-quality image formation. The pattern for use in this case may be as shown in FIG. 54 or FIG. 55.

Another embodiment of the present invention is described next. The twenty-sixth embodiment has a feature in which the pattern of the mark row includes a line shape orthogonal to the direction of conveying the transfer paper.

With the pattern of the mark row including a line shape orthogonal to the direction of conveying the transfer paper, at least a displacement component in the sub-scanning direction can be detected, thereby achieving high image quality.

Also, in such an embodiment, when a displacement in the sub-scanning direction is detected, a line shape orthogonal to the conveying direction should be included. In the patterns shown in FIGS. 54 and 55, such a line shape orthogonal to the conveying direction is included.

Another embodiment of the present invention is described next. It has a feature in which a detection sensor that detects the mark row is implemented by an optical element using fluctuations in light amount of either one of regular reflection light and transmission light, and a pattern of the mark row includes an oblique-line shape having an angle inclined a reference amount to the relative direction of conveying the transfer paper.

The detection sensor that detects the mark row is implemented by an optical element using fluctuations in light amount of either one of regular reflection light and transmission light, and the pattern of the mark row includes the oblique-line shape included at the reference angle to the direction of conveying the transfer paper. Therefore, at least a displacement component in the main-scanning direction can be detected, thereby achieving high image quality.

Figure 54:
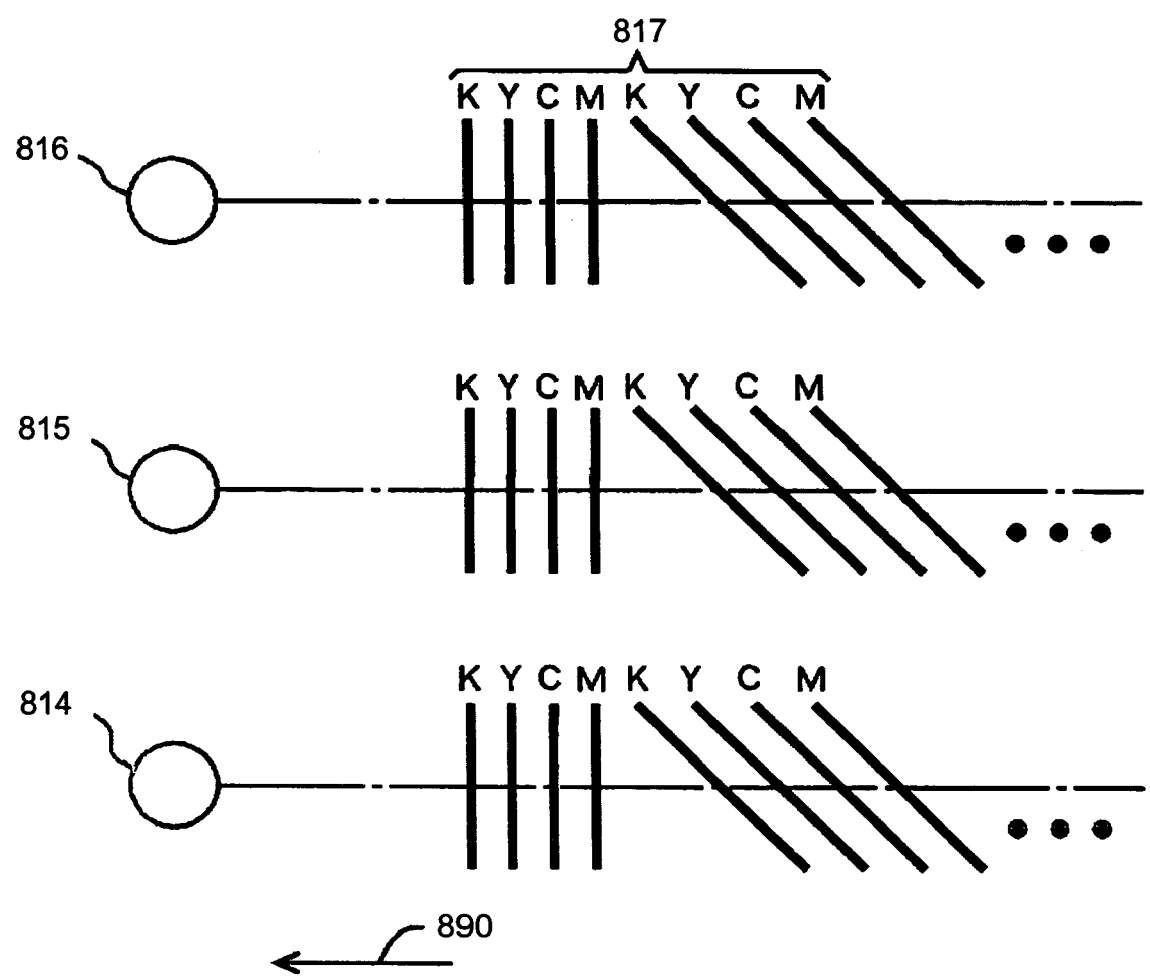
FIG. 54 is a drawing of part of a toner mark row according to an embodiment of the present invention useful for positional displacement detection formed on a conveyor belt of the color image forming apparatus FIG. 53.
Figure 55:
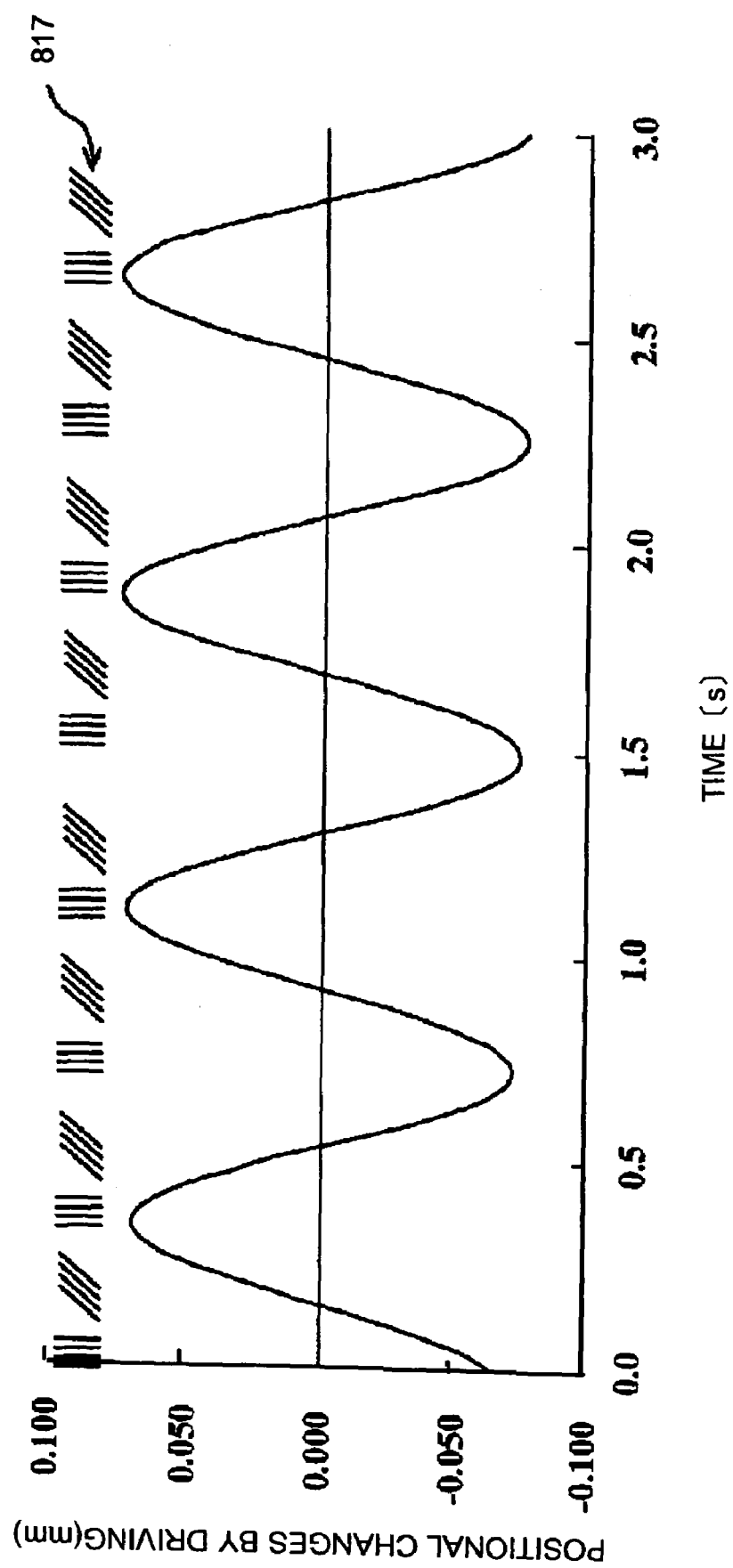
FIG. 55 illustrates positional fluctuations by driving of the conveyer belt of the color image forming apparatus shown in FIG. 53.

Also, in such an embodiment, when the detection sensors 814, 815, and 816 use fluctuations in light amount of either one of regular reflection light and transmission light, the pattern to be formed should always include an oblique-line segment having inclined at a reference angle with respect to the conveying direction, as shown in FIGS. 54 and 55, to detect scaling and registration displacements in the main-scanning direction. In FIGS. 54 and 55, oblique lines have an angle of 45 degrees with respect to the conveying direction.

Another embodiment of the present invention is described next. It has a feature in which a detection sensor that detects the mark row is implemented by an optical element using fluctuations in an amount of diffused light, and a pattern of the mark row includes a line shape either in parallel with or orthogonal to the direction of conveying the transfer paper.

The detection sensor that detects the mark row is implemented by an optical element using fluctuations in an amount of diffused light, and the pattern of the mark row includes a line shape in parallel with the direction of conveying the transfer paper. Therefore, at least a displacement in the main-scanning direction can be detected, thereby achieving high image quality.

Figure 50:
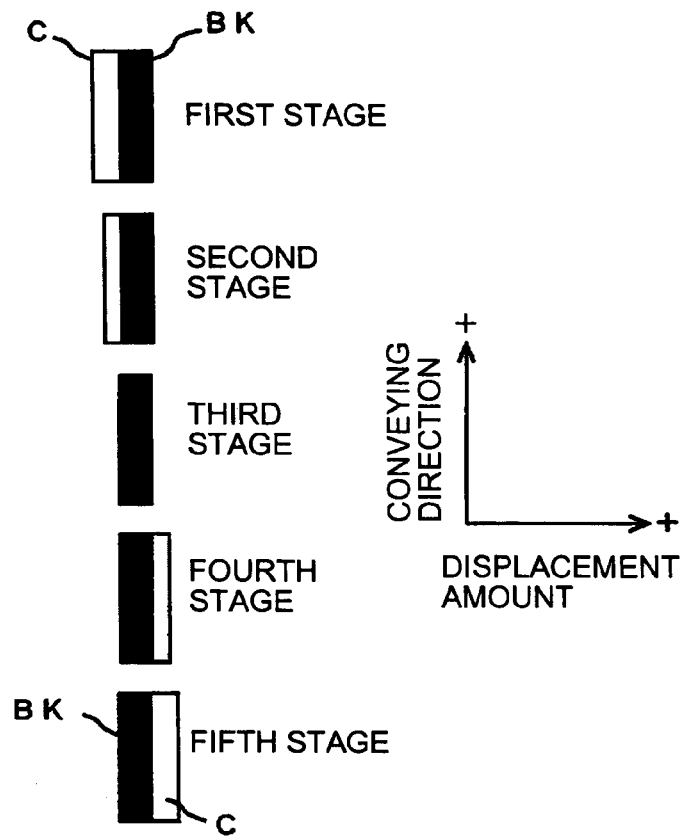
FIG. 50 is a drawing of another example of mark rows useful for positional displacement detection according to an embodiment of the present invention.

Also, in such an embodiment, when the detection sensors 814, 815, and 816 use fluctuations in an amount of diffused light, the pattern to be formed should include a straight-line segment in parallel with the conveying direction, as shown in FIG. 50, to detect scaling and registration displacements in the main-scanning direction.

FIG. 50 is a drawing according to an embodiment of the present invention of other mark rows for positional displacement detection to which the color image forming method according to an embodiment of the present invention is applied.

These mark rows for positional displacement detection include a plurality of (five in the drawing, but is not restrictive) rectangular reference patterns formed at reference intervals on and in parallel to the conveyer belt along the conveying direction, and comparison patterns each having the same shape as that of each of the reference patterns but different in color there from. The comparison patterns are formed to be gradually shifted by a reference length in a direction orthogonal to the conveying direction toward the respective reference patterns.

For example, consider the case of detecting a main-scanning displacement of comparison patterns of color C with respect to reference patterns of color BK (C–BK). As shown in FIG. 50, patterns with C being gradually shifted toward BK (to an extent that the sensor can identify) are formed. From top, patterns are referred to as a first stage, a second stage, a third stage, a fourth stage, and a fifth stage.

That is, at the first stage, the comparison pattern is formed at the left side of the reference pattern with a size approximately the same as the size of the reference pattern. At the second stage, the comparison pattern is formed at the left side of the reference pattern with a width approximately half the width of the reference pattern. At the third stage, only the reference pattern is present. At the fourth stage, the comparison pattern is formed at the right side of the reference pattern with a width approximately half the width of the reference pattern. At the fifth stage, the comparison pattern is formed at the right side of the reference pattern with a size approximately the same as the size of the reference pattern.

Figure 51:
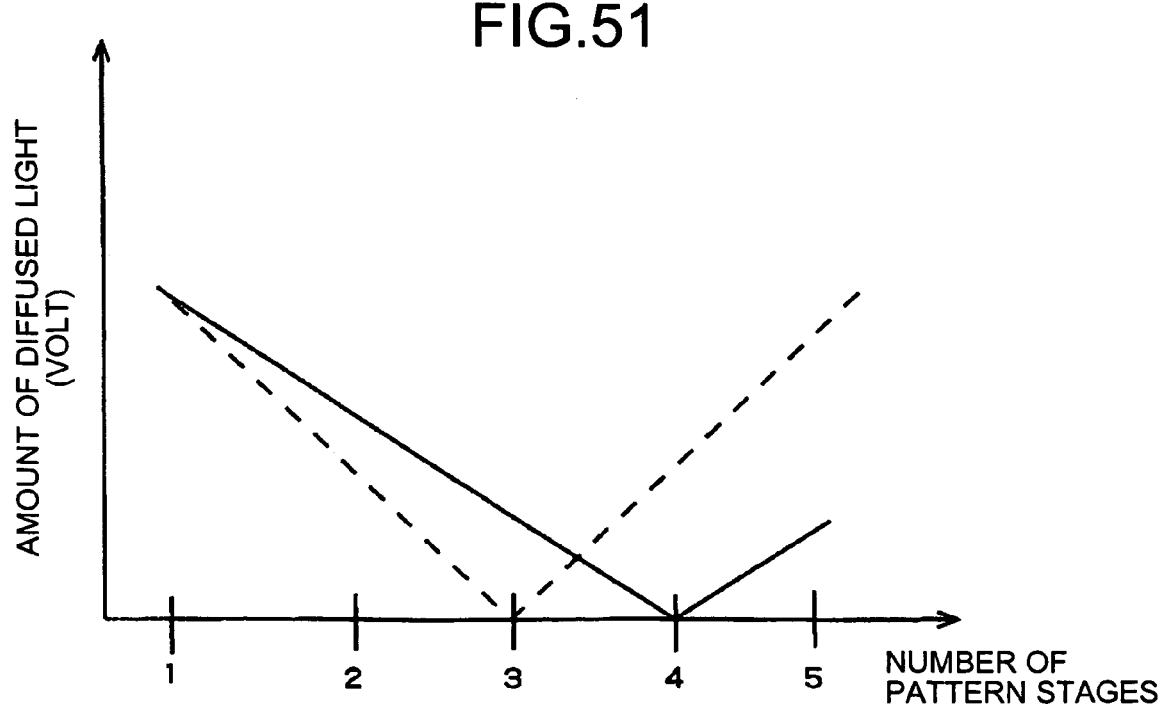
FIG. 51 illustrates a relation between an amount of diffused light and a number of pattern stages when a sensor detects the mark rows of FIG. 50 according to an embodiment of the present invention.

FIG. 51 illustrates a relation according to an embodiment of the present invention between an amount of diffused light and a number of pattern stages when a sensor detects the mark rows for positional displacement detection shown in FIG. 50. In FIG. 51, the horizontal axis represents the number of pattern stages, while the vertical axis represents an amount of diffused light (voltage value).

When these reference patterns and comparison patterns are formed on the conveyer belt, fluctuations in an amount of diffused light (voltage value) as denoted by a broken line in the graph of FIG. 51 are observed. At the third stage, the light receiving amount becomes approximately zero. This is because, while BK has a characteristic of absorbing light, other colors C (Y, M) has a characteristic of reflecting light.

However, when marks for positional displacement detection are formed on the conveyer belt, if C is shifted to a minus direction, fluctuations in an amount of diffused light (voltage value) as denoted by a solid line are observed. In this case, at the fourth stage of the mark for positional displacement detection, the light receiving amount becomes approximately zero, which is most suitable. Therefore, the correction amount can be determined if it can be known at which pattern stage the light receiving amount becomes minimum.

Figure 52:
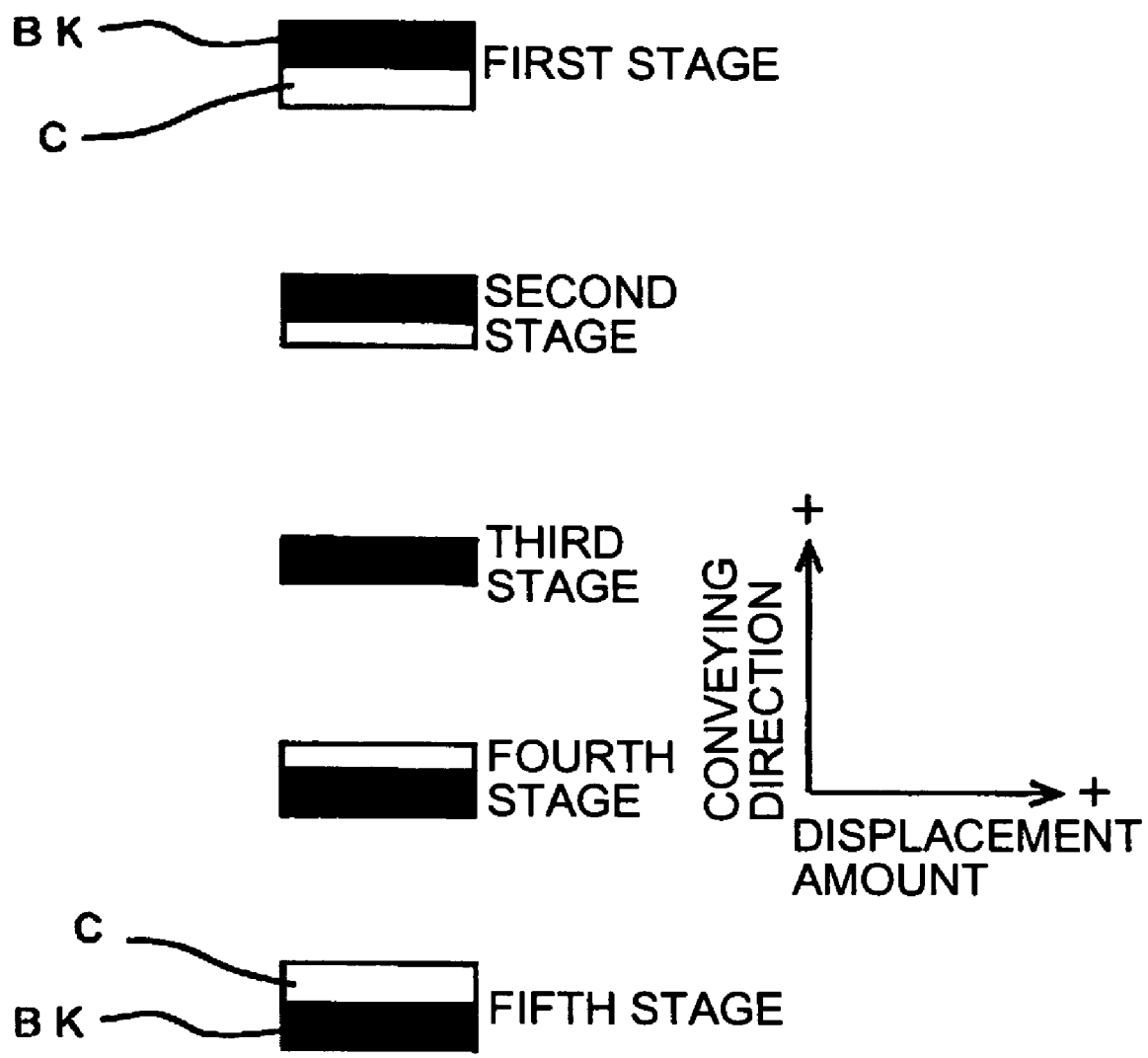
FIG. 52 illustrates a modification example of the mark rows shown in FIG. 51 according to an embodiment of the present invention.

FIG. 52 illustrates according to an embodiment of the present invention a modification example of the mark rows shown in FIG. 51.

The mark rows for positional displacement detection shown in FIG. 52 are different from that shown in FIG. 50 in that, the reference patterns and the comparison patterns are both orthogonal to the conveying direction.

These mark rows for positional displacement detection shown in FIG. 52 include a plurality of (e.g., five in the drawing, but this is not limiting) rectangular reference patterns formed at reference intervals and that are orthogonal to the conveying direction on the conveyer belt along the conveying direction, and comparison patterns each having the same shape as that of each of the reference patterns but different in color there from. The comparison patterns are formed gradually shifted by a given length in a direction in parallel to the conveying direction toward the respective reference patterns.

Using these mark rows for positional displacement detection, effects similar to those achieved by the mark rows for positional displacement detection shown in FIG. 50 can be achieved.

Another embodiment of the present invention is described next. It is directed to a color image forming method of forming a latent image on a photosensitive member through exposure, developing the latent image to form a not-yet-fixed color image on recording paper, forming a mark row for not-yet-fixed registration on a conveying unit of the recording paper or an intermediate transfer member, and detecting and calculating a positional displacement amount of the mark row, thereby correcting a positional displacement of the not-yet-fixed color image, in which, based on an output from a sensor, an interval of conveying the transfer paper is made wider than an interval at normal printing, a plurality of mark rows are formed during the widened interval, on the conveying unit or the intermediate transfer member, and detection of the mark row and positional displacement correction is performed during continuous printing.

With the interval of conveying the transfer paper being made (larger) than the normal interval, and at least one mark row formed during the extended interval on the conveying unit or the intermediate transfer member, the apparatus is not required to be stopped. By detecting the mark row formed in the interval of the transfer paper (by averaging the detection results of the mark row), influences of fluctuations in speed in the conveying direction of the conveying means or the intermediate transfer member can be cancelled, thereby improving the accuracy in positional displacement correction.

Another embodiment of the present invention is described next. It has a feature of causing the controlling unit to perform: developing a latent image formed on a photosensitive member through exposure to form a not-yet-fixed color image; transferring the not-yet-fixed color image to an intermediate transfer member and then to the transfer paper or transferring the not-yet-fixed color image directly to the transfer paper; conveying the transfer paper to a transfer unit; making an interval of conveying the transfer paper wider than a normal interval and forming at least one mark row during the extended interval, on either one of the conveying unit and the intermediate transfer member; and detecting the mark row and performing positional displacement correction during continuous printing.

With the interval of conveying the transfer paper being made wider than the normal interval and at least one mark row formed during the extended interval, on the conveying unit or the intermediate transfer member, the apparatus is not required to be stopped. By detecting the mark row formed during the interval of the transfer paper (by averaging the detection results of the mark row), influences of fluctuations in speed in the conveying direction of the conveying unit or the intermediate transfer member can be cancelled, thereby improving the accuracy in positional displacement correction.

Another embodiment of the present invention is described next. The It is directed to a machine-readable medium having instructions recorded thereon, execution of which by a machine that causes the controlling unit to perform: developing a latent image formed on a photosensitive member through exposure to form a not-yet-fixed color image; transferring the not-yet-fixed color image to an intermediate transfer member and then to the transfer paper or transferring the not-yet-fixed color image directly to the transfer paper; conveying the transfer paper to a transfer unit; making an interval of conveying the transfer paper wider than a normal interval and forming at least one mark row during the extended interval on either one of the conveying unit and the intermediate transfer member; and detecting the mark row and performing positional displacement correction during continuous printing.

Here, examples of the machine-readable include magnetic recording devices, such as a hard disk driver (HDD), a flexible disk, CD-ROM, and MO, and a semiconductor memory.

With the interval of conveying the transfer paper being made wider than the normal interval and at least one mark row formed during the extended interval on the conveying unit or the intermediate transfer member, the apparatus is not required to be stopped. By detecting the mark row formed during the interval of the transfer paper (by averaging the detection results of the mark row), influences of fluctuations in speed in the conveying direction of the conveying unit or the intermediate transfer member can be cancelled, thereby improving the accuracy in positional displacement correction.

In the foregoing description, a scheme in which a pattern or patch is formed on the conveyer belt 802 for registration has been described. The conveyor belt is not restricted to that described above and, for example, an intermediate transfer belt may be used. Also, not only a belt but also a transfer drum, an intermediate transfer drum, an intermediate transfer roller, or the like can be used.

Now, demands from the industry require that downtime due to positional displacement detection be reduced.

Therefore, the inventors have suggested a color image forming apparatus, a color image forming program, and a machine-readable medium allowing positional displacement correction with high accuracy during continuous printing, and reducing (if not minimizing) downtime due to positional displacement detection.

An embodiment of an image according to the present invention can include forming method of forming a latent image on a photosensitive member through exposure, developing the latent image to form a not-yet-fixed color image on recording paper, forming a mark row for not-yet-fixed registration on a conveying unit of the recording paper or an intermediate transfer member, and detecting and calculating a positional displacement amount of the mark row, thereby correcting a positional displacement of the not-yet-fixed color image, in which, based on an output from a sensor, an interval of conveying the recording paper is made wider than an interval at normal printing, a plurality of mark rows are formed during the extended interval on the conveying unit or the intermediate transfer member, detection of the mark row is performed and positional displacement correction is performed during continuous printing, and when the positional displacement correction is automatically performed, a mark row having a length shorter than a length of a mark row for use in correction upon instruction from a user is used.

Figure 56:
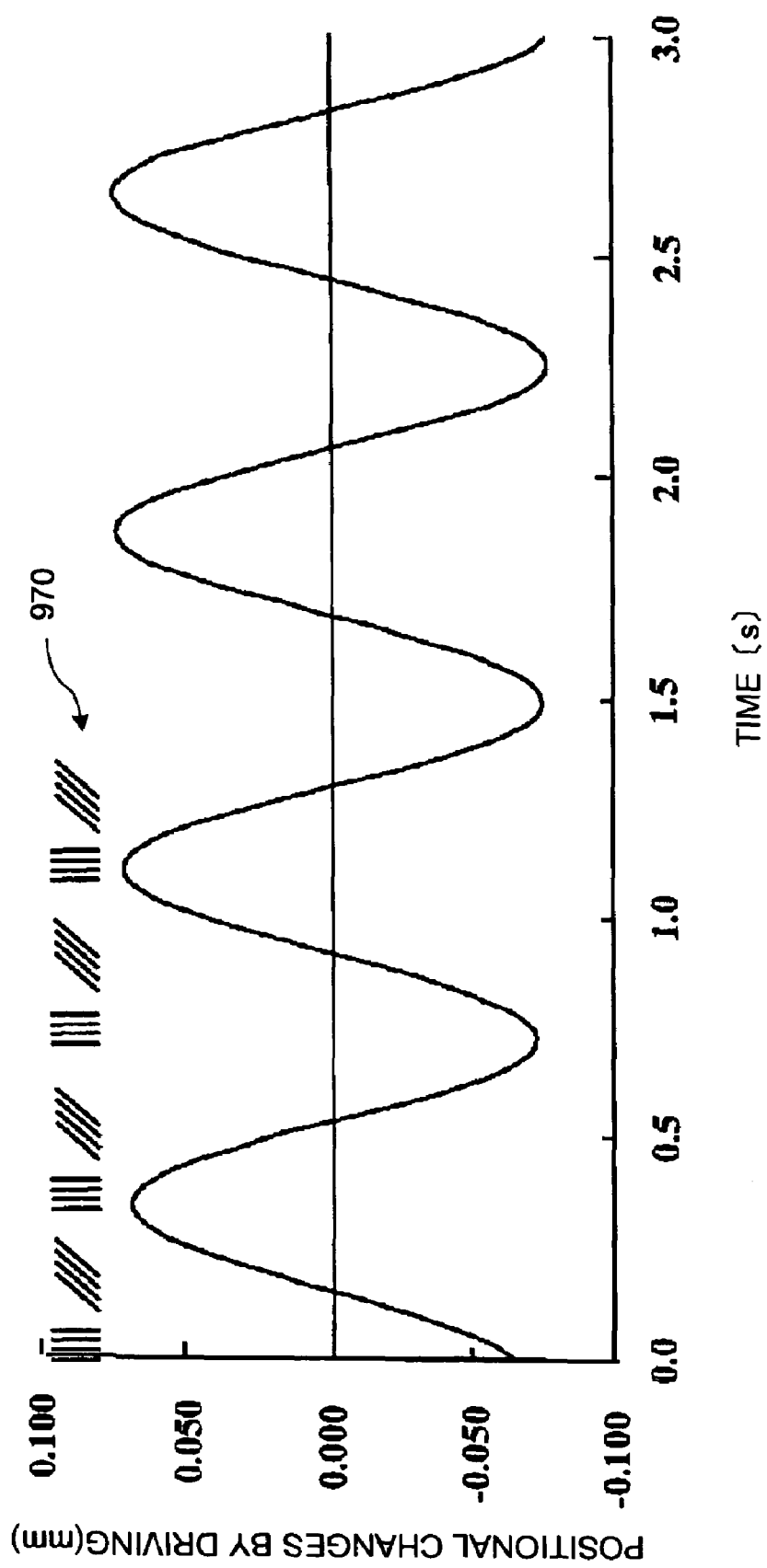
FIG. 56 illustrates positional fluctuations by driving of the conveyer belt of the color image forming apparatus shown in FIG. 53.
Figure 57:
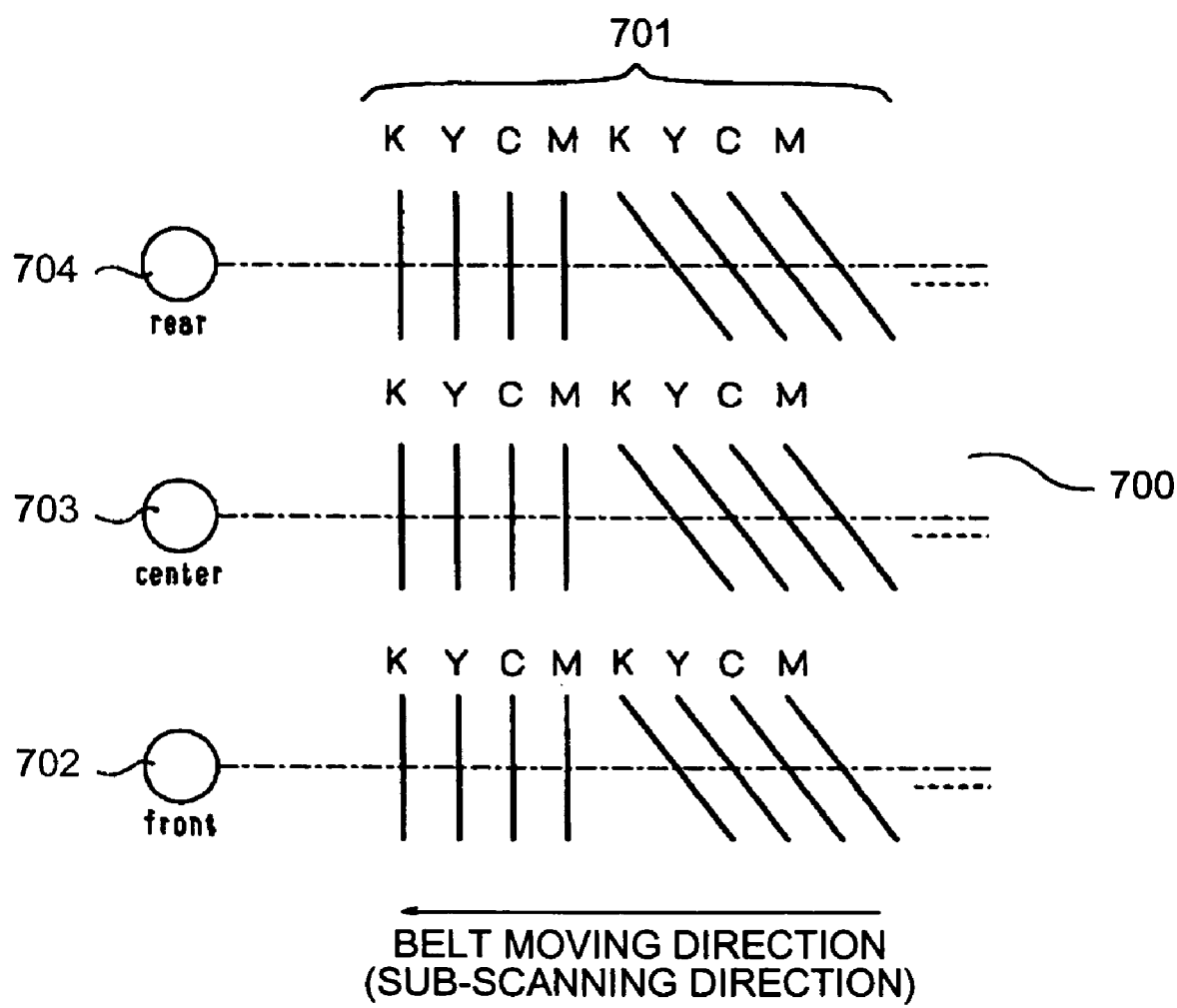
FIG. 57 is a plan view of an exemplary toner pattern useful for color matching (for positional displacement detection) formed on an endless belt according to an embodiment of the present invention.

FIG. 56 illustrates (according to an embodiment of the present invention) positional fluctuations by driving of the conveyer belt of the color image forming apparatus shown in FIG. 53. The horizontal axis represents time, while the vertical axis represents a positional change amount.

As evident from the drawing, a mark row 970 shown in FIG. 56 is shorter than the length of the mark row 817 shown in FIG. 55. The mark row 970 shown in FIG. 56 is formed by four sets of lines along the conveying direction, each set including four straight lines of colors K, Y, C, M (lines orthogonal to the conveying direction of the conveyer belt) and four oblique lines. The mark row 970 including four such sets of lines is positioned according to a positional fluctuation phase caused by driving speed fluctuations, such as those caused by the running of the belt in the sub-scanning direction (in a direction represented by an arrow 890). As shown in FIG. 56, the mark row 970 is formed in consideration of the phase, so that an error at the time of pattern formation and detection is as small as possible. By determining a correction amount from an average of the detection results, a high-quality image with less positional displacement in each color can be formed. Also, downtime due to positional displacement detection at least can be reduced (if not minimized).

In FIG. 56, the case where the mark row 970 has a length of four sets of marks has been described. However, this is not limiting. The mark row 970 may have any length as long as the length is shorter than the mark row 817. Also, the mark shapes in the mark row 970 can include lines orthogonal to the conveying direction of the conveyer belt, and oblique lines. However, this is not limiting. As long as a positional displacement can be detected, a combination of slash-like oblique lines and back-slash-like oblique lines may be used. Also, a combination of lines orthogonal to the conveying direction of the conveyer belt and lines in parallel with the conveying direction of the conveyer belt may be used. The shape of the pattern itself is not restricted to a straight line, but may be any of a wavy line, an ellipse, an oblong figure, a polygon, and a circle.

Another embodiment of the present invention is described next. It is directed to a color image forming method including forming a latent image on a photosensitive member through exposure, developing the latent image to form a not-yet-fixed color image on recording paper, forming a mark row for not-yet-fixed registration on a conveying unit of the recording paper or an intermediate transfer member, and detecting and calculating a positional displacement amount of the mark row, thereby correcting a positional displacement of the not-yet-fixed color image, in which, based on an output from a sensor, an interval of conveying the recording paper is made wider than an interval at normal printing, a plurality of mark rows are formed during the extended interval on the conveying unit or the intermediate transfer member, detection of the mark row is performed and positional displacement correction is performed during continuous printing, and when the positional displacement correction is automatically performed, a mark row having a length shorter than a length of a mark row for use in correction upon instruction from a user is used.

With such a structure, a high-quality image can be formed with a small positional displacement for each color, thereby at least reducing (if not minimizing) downtime due to positional displacement detection as much as possible.

Another embodiment of the present invention is described next. It has a feature of causing the controlling unit of the color image forming apparatus to execute: developing a latent image formed on a photosensitive member through exposure to form a not-yet-fixed color image; transferring the not-yet-fixed color image to an intermediate transfer member and then to the recording paper or transferring the not-yet-fixed color image directly to the recording paper; conveying the recording paper to a transfer unit; making an interval of conveying the recording paper wider than a normal interval and forming at least one mark row during the extended interval on either one of the conveying unit and the intermediate transfer member; and detecting the mark row and performing positional displacement correction during continuous printing, and when automatically performing the positional displacement correction, using a mark row having a length shorter than a length of a mark row for use in correction upon instruction from a user.

With such a structure, a high-quality image can be formed with a small positional displacement for each color, thereby at least reducing (if not minimizing) downtime due to positional displacement detection as much as possible.

Another embodiment of the present invention is described next. It has a feature in which a program is recorded on a machine-readable medium to cause the controlling unit of the color image forming apparatus to execute: developing a latent image formed on a photosensitive member through exposure to form a not-yet-fixed color image; transferring the not-yet-fixed color image to an intermediate transfer member and then to the recording paper or transferring the not-yet-fixed color image directly to the recording paper; conveying the recording paper to a transfer unit; making an interval of conveying the recording paper wider than a normal interval, and forming at least one mark row during the extended interval on either one of the conveying unit and the intermediate transfer member; and detecting the mark row and performing positional displacement correction during continuous printing, and when automatically performing the positional displacement correction, using a mark row having a length shorter than a length of a mark row for use in correction upon instruction from a user.

With such a structure, a high-quality image can be formed with a small positional displacement for each color, thereby at least reducing (if not minimizing) downtime due to positional displacement detection as much as possible.

Here, examples of the machine-readable recording medium include magnetic recording devices, such as a hard disk driver (HDD), a flexible disk, CD-ROM, and MO, and a semiconductor memory.

Thus, according to one or more embodiments of the present invention, if image positional displacement cannot be corrected, only a function of forming a monochrome image and corrects a correctable color is performed, and a plurality of colors including monochrome except non-correctable colors are used to form an image. Therefore, an image can be formed by using monochrome color and another color or more, by at least reducing (if not minimizing) the downtime of the apparatus.

Moreover, sheet conveying control and an electro-photographic process control do not have to be separately performed in timing, depending on whether the pattern is being formed. This reduces complexity in control and a positional displacement due to the difference in timing of controls, thereby achieving high image quality.

Furthermore, positional displacement correction with high accuracy is possible even during continuous printing.

The present invention being thus described, it will be obvious that the same may be varied in many ways. Such variations are not to be regarded as a departure from the spirit and scope of the present invention, and all such modifications are intended to be included within the scope of the present invention.

The invention claimed is:

1. An image forming apparatus comprising:
   at least two image forming units, each of which forms a monochrome image of a different color, wherein the image forming apparatus forms a multicolor image by overlaying the monochrome images of at least the two colors on one another;
   a pattern forming unit that forms a pattern useful for image positional displacement amelioration;
   a detecting unit that detects a displacement of the pattern;
   an ameliorating unit, provided for each color, that ameliorates an image positional displacement based on the pattern detected; and
   a notifying unit that notifies of amelioration results;
   wherein, if the pattern cannot be detected, then monochrome printing is enabled, and the notifying unit notifies that the amelioration is not possible.

2. The image forming apparatus according to claim 1, wherein
   if the ameliorating unit cannot ameliorate an image positional displacement, then an amount of the image light is adjusted, the pattern forming unit forms the pattern once again, and the detecting unit performs the detection.

3. The image forming apparatus according to claim 1, further comprising:
a toner concentration checking unit that checks a toner concentration before the pattern forming unit forms the pattern; and
a replenishing unit that replenishes toner, in a circumstance in which the toner concentration checking unit has determined that the toner concentration is less than a reference value.

4. The image forming apparatus according to claim 3, wherein
the replenishing unit replenishes the toner so that the toner concentration is higher than the reference value.

5. The image forming apparatus according to claim 1, wherein
the notifying unit notifies a color that cannot be detected.

6. The image forming apparatus according to claim 1, wherein
the detecting unit includes a count determining unit that counts a number of times that the pattern for image positional displacement amelioration cannot be detected, and
when the number counted is equal to or larger than a reference number, the notifying unit notifies that amelioration is not possible.

7. The image forming apparatus according to claim 6, wherein
when the pattern for image positional displacement amelioration cannot be successively detected for a number of times equal to or larger than the reference number, the count determining unit determines that amelioration is not possible.

8. An image forming apparatus comprising:
a plurality of image forming units, each forming a monochrome image on a recording medium, the image forming apparatus forming a multicolor image by overlaying, on the recording medium, the monochrome images formed by at least two of the image forming units;
a pattern forming unit that forms a pattern useful for image positional displacement amelioration;
a detecting unit that detects displacement of the pattern;
an ameliorating unit, provided for each color, that ameliorates an image positional displacement based on the pattern detected; and
a notifying unit that notifies of amelioration results;
wherein, if an undetectable color that cannot be detected by the detecting unit is present, then the ameliorating unit performs the amelioration only for a detectable color, monochrome printing and printing of a combination of a plurality of colors excluding the undetectable color are enabled, and the notifying unit notifies that only partial amelioration is possible.

9. The image forming apparatus according to claim 8, wherein
if the ameliorating unit cannot ameliorate an image positional displacement, then an amount of the image light is adjusted, the pattern forming unit forms the pattern once again, and the detecting unit performs the detection.

10. The image forming apparatus according to claim 8, further comprising:
a toner concentration checking unit that checks a toner concentration before the pattern forming unit forms the pattern; and
a replenishing unit that replenishes toner, in a circumstance in which the toner concentration checking unit has determined that the toner concentration is less than a reference value.

11. The image forming apparatus according to claim 10, wherein
the replenishing unit replenishes the toner so that the toner concentration is higher than the reference value.

12. The image forming apparatus according to claim 8, wherein
the notifying unit notifies a color that cannot be detected.

13. The image forming apparatus according to claim 8, wherein
the detecting unit includes a count determining unit that counts a number of times that the pattern for image positional displacement amelioration cannot be detected, and
when the number counted is equal to or larger than a reference number, the notifying unit notifies that amelioration is not possible.

14. The image forming apparatus according to claim 13, wherein
when the pattern for image positional displacement amelioration cannot be successively detected for a number of times equal to or larger than the reference number, the count determining unit determines that amelioration is not possible.

15. A control method for an image forming apparatus that includes at least two separate image forming units, each forming a monochrome image of a color, comprising:
forming a multicolor image by overlaying the monochrome images of at least the two colors on one another;
forming a pattern useful for image positional displacement amelioration;
detecting a displacement of the pattern;
ameliorating, for each color, an image positional displacement based on the pattern detected; and
notifying of amelioration results;
wherein, if the pattern cannot be detected, then enabling monochrome printing and notifying that correction is not possible.

16. The control method according to claim 15, wherein
if an image positional displacement cannot be ameliorated at the ameliorating, then adjusting an amount of the image light, and repeating the forming and the detecting.

17. The control method according to claim 15, further comprising:
checking a toner concentration before forming the pattern; and
replenishing toner when the checking has determined that the toner concentration is less than a reference value.

18. The control method according to claim 17, wherein
the replenishing includes replenishing the toner so that the toner concentration is higher than the reference value.

19. The control method according to claim 15, wherein
the notifying includes notifying that a color cannot be detected.

20. The control method according to claim 15, wherein
the detecting includes counting a number of times that the pattern for image positional displacement amelioration cannot be detected, and
when the number counted is equal to or larger than a reference number, the notifying includes notifying that the ameliorating is not possible.

21. The control method according to claim 20, wherein when the pattern for image positional displacement amelioration cannot be successively detected for a number of times equal to or larger than the reference number, it is determined that amelioration is not possible.

22. A control method for an image forming apparatus that includes a plurality of separate image forming units, each forming a monochrome image of a color on a recording medium, comprising:
forming a multicolor image by overlaying, on the recording medium, the monochrome images formed by at least two of the plurality of separate image forming units;
forming a pattern useful for image positional displacement amelioration;
detecting a displacement of the pattern for image positional displacement amelioration formed;
ameliorating, for each color, an image positional displacement based on the pattern detected; and
notifying of amelioration results;
wherein, if an undetectable color that cannot be detected at the detecting step is present, then the ameliorating step is performed only for a detectable color, monochrome printing and printing of a combination of a plurality of colors excluding the undetectable color are enabled, and the notifying step includes notifying that only partial correction is possible.

23. The control method according to claim 22, wherein if an image positional displacement cannot be ameliorated, then adjusting an amount of the image light, and repeating the forming and the detecting.

24. The control method according to claim 22, further comprising:
checking a toner concentration before forming the pattern; and
replenishing toner when the checking has determined that the toner concentration is less than a reference value.

25. The control method according to claim 24, wherein the replenishing includes replenishing the toner so that the toner concentration is higher than the reference value.

26. The control method according to claim 22, wherein the notifying includes notifying that a color cannot be detected.

27. The control method according to claim 22, wherein the detecting includes counting a number of times that the pattern for image positional displacement amelioration cannot be detected, and
when the number counted is equal to or larger than a reference number, the notifying includes notifying that ameliorating is not possible.

28. The control method according to claim 27, wherein when the pattern for image positional displacement amelioration cannot be successively detected for a number of times equal to or larger than the reference number, it is determined that amelioration is not possible.

29. A machine-readable medium having recorded thereon instructions execution of which by a machine controls operation of an image forming apparatus, the image forming apparatus including at least two separate image forming units, each forming a monochrome image of a color, the machine-readable instruction comprising:
a first forming segment to form a multicolor image by overlaying the monochrome images of at least the two colors on one another;
a second forming segment to form a pattern useful for image positional displacement amelioration;
a detecting segment to detect displacement of the pattern;
an ameliorating segment to ameliorate, for each color, an image positional displacement based on the pattern detected; and
a notifying segment to notify of amelioration results;
wherein, if the pattern cannot be detected, then monochrome printing is enabled, and the notifying segment notifies that ameliorating is not possible.

30. A machine-readable medium having recorded thereon instructions execution of which by a machine controls operation of an image forming apparatus, the image forming apparatus including a plurality of separate image forming units, each forming a monochrome image of a color on a recording medium, the machine-readable instructions comprising:
a first forming segment to form a multicolor image by overlaying, on the recording medium, the monochrome images formed by at least two of the plurality of separate image forming units;
a second forming segment to form a pattern useful for image positional displacement amelioration;
a detecting segment to detect displacement of the pattern for image positional displacement amelioration formed;
an ameliorating segment to ameliorate, for each color, an image positional displacement based on the pattern detected; and
a notifying segment to notify of amelioration results;
wherein, if an undetectable color that cannot be detected is present, then amelioration is performed only for a detectable color, monochrome printing and printing of a combination of a plurality of colors excluding the undetectable color are enabled, and the notifying segment notifies that only partial amelioration is possible.

31. A process cartridge, removably installed in an image forming apparatus body, comprising:
at least one of the following, a charging unit, a developing unit, and a cleaning unit; and
a storage unit that stores results of ameliorating a pattern useful for image positional displacement amelioration;
wherein the results of ameliorating stored in the storage unit are sufficient for a determination of any one of a printable color and a combination of printable colors.

32. The process cartridge according to claim 31, wherein the results of the ameliorating stored in the storage unit are updated when amelioration is performed.

33. A process cartridge comprising:
a photosensitive unit including at least one of a charging unit and a cleaning unit; and
a developing unit having a development section, the developing unit being removably installed in the image forming apparatus body;
wherein at least one of the photosensitive unit and the developing unit includes a storage unit that stores results of ameliorating a pattern for image positional displacement amelioration; and
wherein the results of ameliorating stored in the storage unit are sufficient for a determination of any one of a printable color and a combination of printable colors.

34. The process cartridge according to claim 33, wherein the results of the ameliorating stored in the storage unit are updated when amelioration is performed.

* * * * *